United States Patent
Tanaka et al.

(10) Patent No.: US 7,630,282 B2
(45) Date of Patent: Dec. 8, 2009

(54) DISK FOR AUDIO DATA, REPRODUCTION APPARATUS, AND METHOD OF RECORDING/REPRODUCING AUDIO DATA

(75) Inventors: Yoshiaki Tanaka, Fujisawa (JP); Norihiko Fuchigami, Kamakura (JP); Toshio Kuroiwa, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 878 days.

(21) Appl. No.: 10/951,653

(22) Filed: Sep. 29, 2004

(65) Prior Publication Data

US 2005/0068876 A1 Mar. 31, 2005

(30) Foreign Application Priority Data

Sep. 30, 2003 (JP) ............................. 2003-341254
Jun. 30, 2004 (JP) ............................. 2004-192926

(51) Int. Cl.
*G11B 7/004* (2006.01)
(52) U.S. Cl. ............ 369/47.16; 369/59.25; 369/124.06; 704/503
(58) Field of Classification Search ............... 369/59.25, 369/47.15, 59.21, 47.21, 47.16, 124.01, 124.06; 704/501, 502, 503, 500, 504; 700/94
See application file for complete search history.

(56) References Cited

U.S. PATENT DOCUMENTS

| | | | | |
|---|---|---|---|---|
| 4,833,549 A | * | 5/1989 | Yoshimoto et al. | 386/100 |
| 5,648,948 A | * | 7/1997 | Itoh et al. | 369/47.2 |
| 5,706,262 A | * | 1/1998 | Yokota et al. | 369/30.09 |
| 6,130,870 A | * | 10/2000 | Yokota et al. | 369/59.25 |
| 6,370,090 B1 | * | 4/2002 | Verbakel et al. | 369/30.04 |
| 6,416,410 B1 | * | 7/2002 | Abou-Samra et al. | 463/31 |
| 6,658,160 B1 | * | 12/2003 | Winter et al. | 382/245 |
| 6,661,762 B1 | * | 12/2003 | Verbakel et al. | 369/59.25 |
| 7,006,758 B1 | * | 2/2006 | Yamamoto et al. | 386/95 |
| 7,328,150 B2 | * | 2/2008 | Chen et al. | 704/219 |
| 2003/0220801 A1 | * | 11/2003 | Spurrier | 704/503 |

FOREIGN PATENT DOCUMENTS

| | | |
|---|---|---|
| JP | 11-185450 | 7/1999 |
| JP | 2002-184114 | 6/2002 |
| JP | 2002-358732 | 12/2002 |
| JP | 2003-188950 | 7/2003 |
| JP | 2003-196958 | 7/2003 |

\* cited by examiner

*Primary Examiner*—Wayne R Young
*Assistant Examiner*—Thomas D Alunkal
(74) *Attorney, Agent, or Firm*—Louis Woo

(57) ABSTRACT

An audio disk has a first audio zone and a second audio zone. In the first audio zone, both of a plurality of tracks each including a single piece of music and a first management information including first control information for allowing each track to be reproduced are recorded. The music is composed of audio data produced from either a linear PCM signal or a signal produced by applying lossless compression to the linear PCM signal. In the second audio zone, music composed of audio signal produced under lossy compression, a plurality of files each storing a signal of a single piece of music subjected to the lossy compression, and second management information including second control information for allowing each file to be reproduced are recorded. Each piece of music stored in each file corresponds to the music included in any one of the tracks in the first audio zone.

4 Claims, 56 Drawing Sheets

FIG. 1A  DVD-Video
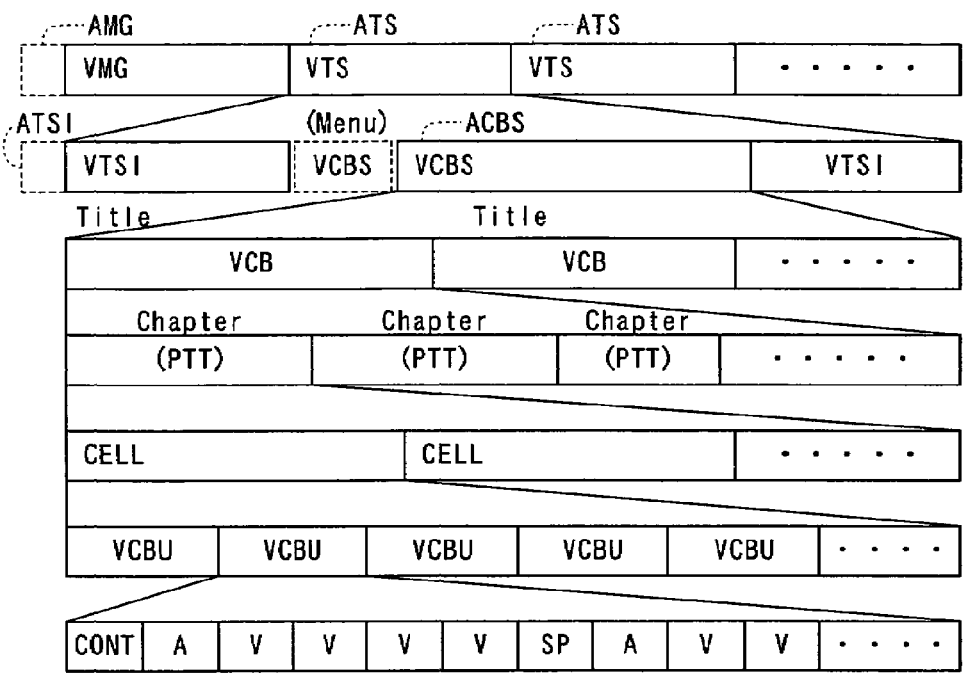
FIG. 1B  DVD-Audio
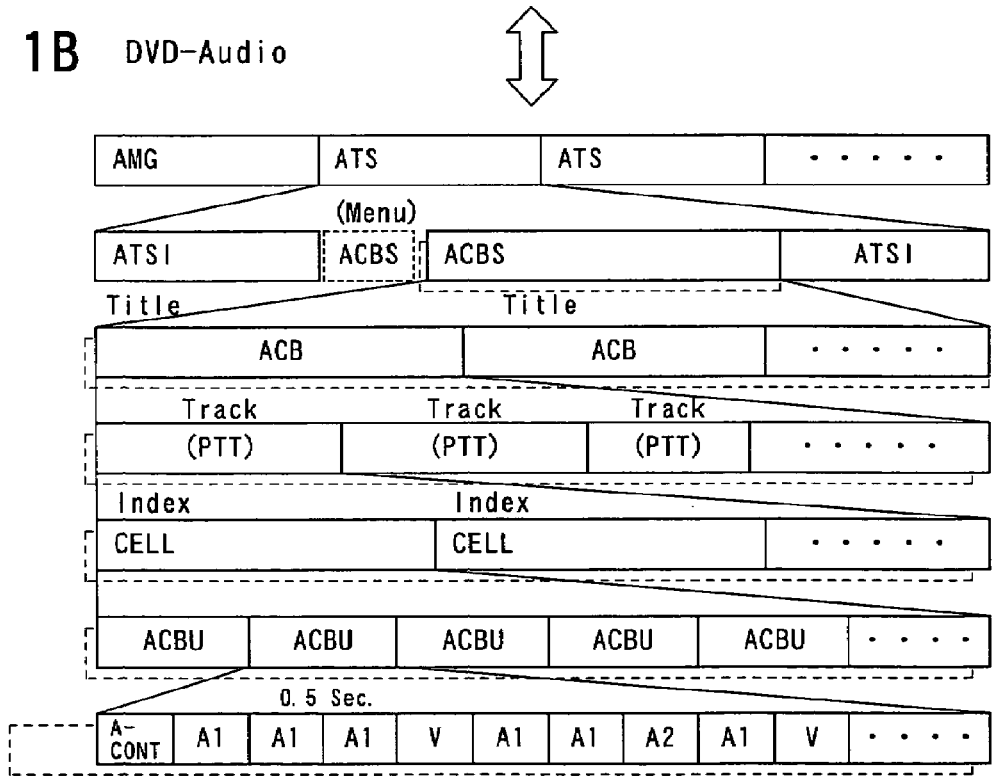

[DVD]

ACD (636 bytes)

| General Information | 48 bytes | |
|---|---|---|
| | [1] | [2] |
| Name Space | 93 bytes | 93 bytes |
| Free Space 1 | 93 bytes | 93 bytes |
| Free Space 2 | 93 bytes | 93 bytes |
| Data Pointer | 15 bytes | 15 bytes |
| Total | (294) bytes | (294) bytes |

FIRST LANGUAGE — SECOND LANGUAGE

FIG. 5

ASD (1000 bytes)

| | | |
|---|---|---|
| General | | 16 bytes |
| Current No. | | 8 bytes |
| Current Time | | 16 bytes |
| Title Set Search | | 8 bytes |
| Title Search | | 8 bytes |
| Track Search | | 404 bytes |
| Index Search | | 408 bytes |
| Highlight Search | | 80 bytes |
| Reserved | | 52 bytes |

FIG. 7

ACD (636 bytes)

| | | |
|---|---|---|
| General Information | | 48 bytes |
| Name Space | | 93 bytes |
| Free Space 1 | | 93 bytes |
| Free Space 2 | | 93 bytes |
| Data Pointer | | 15 bytes |
| Audio Reproduction Control Information | | 294 bytes |

FIG. 10

ASD (1000 bytes)

| | | |
|---|---|---|
| General | | 16 bytes |
| Title Set Search | | 8 bytes |
| Title Search | | 8 bytes |
| Track Search | | 404 bytes |
| Index Search | | 408 bytes |
| Highlight Search | | 80 bytes |
| Reserved | | 76 bytes |

FIG. 11

PCI DATA

|  | CONTENTS | NUMBER OF BYTES |
|---|---|---|
| PCI_GI | PCI General Information | 60 bytes |
| NSML_AGLI | Non-seamless Angle Information | 36 bytes |
| HLI | Highlight Information | 694 bytes |
| RECI | Recoding Information | 189 bytes |
|  | Total | 979 bytes |

FIG. 13

PCI GENERAL INFORMATION (PCI GI)

|  | CONTENTS | NUMBER OF BYTES |
|---|---|---|
| (1) NV_PCK_LBN | LBN of Navigation Pack | 4 bytes |
| (2) VOBU_CAT | Category of VOBU | 2 bytes |
| Reserved | Reserved | 2 bytes |
| (3) VOBU_UOP_CTL | User Operation Control for VOBU | 4 bytes |
| (4) VOBU_S_PTM | Start PTM of VOBU | 4 bytes |
| (5) VOBU_E_PTM | End PTM of VOBU | 4 bytes |
| (6) VOBU_SE_E_PTM | End PTM of Sequence End in VOBU | 4 bytes |
| (7) C_ELTM | Elapse Time in Cell | 4 bytes |
| Reserved | Reserved | 32 bytes |
|  | Total | 60 bytes |

FIG. 14

RECORDING INFORMATION (RECI)

| | CONTENTS | NUMBER OF BYTES |
|---|---|---|
| ISRC_V | ISRC of video data in video streams | 10 bytes |
| ISRC_A0 | ISRC of audio data in decoding audio stream #0 | 10 bytes |
| ISRC_A1 | ISRC of audio data in decoding audio stream #1 | 10 bytes |
| ISRC_A2 | ISRC of audio data in decoding audio stream #2 | 10 bytes |
| ISRC_A3 | ISRC of audio data in decoding audio stream #3 | 10 bytes |
| ISRC_A4 | ISRC of audio data in decoding audio stream #4 | 10 bytes |
| ISRC_A5 | ISRC of audio data in decoding audio stream #5 | 10 bytes |
| ISRC_A6 | ISRC of audio data in decoding audio stream #6 | 10 bytes |
| ISRC_A7 | ISRC of audio data in decoding audio stream #7 | 10 bytes |
| ISRC_SP0 | ISRC of SP data in decoding SP stream #0, #8, #16 or #24 | 10 bytes |
| ISRC_SP1 | ISRC of SP data in decoding SP stream #1, #9, #17 or #25 | 10 bytes |
| ISRC_SP2 | ISRC of SP data in decoding SP stream #2, #10, #18 or #26 | 10 bytes |
| ISRC_SP3 | ISRC of SP data in decoding SP stream #3, #11, #19 or #27 | 10 bytes |
| ISRC_SP4 | ISRC of SP data in decoding SP stream #4, #12, #20 or #28 | 10 bytes |
| ISRC_SP5 | ISRC of SP data in decoding SP stream #5, #13, #21 or #29 | 10 bytes |
| ISRC_SP6 | ISRC of SP data in decoding SP stream #6, #14, #22 or #30 | 10 bytes |
| ISRC_SP7 | ISRC of SP data in decoding SP stream #7, #15, #23 or #31 | 10 bytes |
| ISRC_SP_SEL | Group of SP streams selected for ISRC | 1 bytes |
| Reserved | Reserved | 18 bytes |

FIG. 15

DATA SEARCH INFORMATION (DSI)

|  | CONTENTS | NUMBER OF BYTES |
|---|---|---|
| DSI_GI | DSI General Information | 32 bytes |
| SML_PBI | Seamless Reproducing Information | 148 bytes |
| SML_AGLI | Seamless-reproduction Angle Information | 54 bytes |
| VOBU_SRI | VOBU Search Information | 168 bytes |
| SYNCI | Synchronizing Information | 144 bytes |
| Reserved | Reserved | 471 bytes |
|  | Total | 1017 bytes |

FIG. 16

DSI GENERAL INFORMATION (DSI GI)

| | CONTENTS | NUMBER OF BYTES |
|---|---|---|
| (1) NV_PCK_SCR | SCR base of NV_PCK | 4 bytes |
| (2) NV_PCK_LBN | LBN of NV_PCK | 4 bytes |
| (3) VOBU_EA | End address of VOBU | 4 bytes |
| (4) VOBU_1STREF_EA | End address of the first reference picture of VOBU | 4 bytes |
| (5) VOBU_2NDREF_EA | End address of the second reference picture of VOBU | 4 bytes |
| (6) VOBU_3RDREF_EA | End address of the third reference picture of VOBU | 4 bytes |
| (7) VOBU_VOB_IDN | VOB ID number of VOBU | 2 bytes |
| Reserved | | 1 bytes |
| (8) VOBU_C_IDN | Cell ID number of VOBU | 1 bytes |
| (9) C_ELTM | Cell elapse time | 4 bytes |
| | Total | 32 bytes |

FIG. 17

SEAMLESS REPRODUCING INFORMATION (SML PBI)

| | CONTENTS | NUMBER OF BYTES |
|---|---|---|
| (1) VOBU_SML_CAT | Category of seamless VOBU | 2 bytes |
| (2) ILVU_EA | End address of interleaved unit | 4 bytes |
| (3) NXT_ILVU_SA | Start address of the next interleaved unit | 4 bytes |
| (4) NXT_ILVU_SZ | Size of the next interleaved unit | 2 bytes |
| (5) VOB_V_S_PTM | Start PTM of video in VOB | 4 bytes |
| (6) VOB_V_E_PTM | End PTM of video in VOBU | 4 bytes |
| (7) VOB_A_STP_PTM | End PTM of audio in VOBU | 8 bytes × 8 |
| (8) VOB_A_GAP_LEN | Gap length of audio in VOBU | 8 bytes × 8 |
| | Total | 148 bytes |

FIG. 18

| | CONTENTS | NUMBER OF BYTES |
|---|---|---|
| FWDI Video | Lead-off address of the next VOBU having video data | 4 bytes |
| FWDI 240 | Headmost address of +240 VOBU and video-existence indicating flag | 4 bytes |
| FWDI 120 | Headmost address of +120 VOBU and video-existence indicating flag | 4 bytes |
| FWDI 60 | Headmost address of +60 VOBU and video-existence indicating flag | 4 bytes |
| FWDI 20 | Headmost address of +20 VOBU and video-existence indicating flag | 4 bytes |
| FWDI 15 | Headmost address of +15 VOBU and video-existence indicating flag | 4 bytes |
| FWDI 14 | Headmost address of +14 VOBU and video-existence indicating flag | 4 bytes |
| FWDI 13 | Headmost address of +13 VOBU and video-existence indicating flag | 4 bytes |
| FWDI 12 | Headmost address of +12 VOBU and video-existence indicating flag | 4 bytes |
| FWDI 11 | Headmost address of +11 VOBU and video-existence indicating flag | 4 bytes |
| FWDI 10 | Headmost address of +10 VOBU and video-existence indicating flag | 4 bytes |
| FWDI 9 | Headmost address of +9 VOBU and video-existence indicating flag | 4 bytes |
| FWDI 8 | Headmost address of +8 VOBU and video-existence indicating flag | 4 bytes |
| FWDI 7 | Headmost address of +7 VOBU and video-existence indicating flag | 4 bytes |
| FWDI 6 | Headmost address of +6 VOBU and video-existence indicating flag | 4 bytes |
| FWDI 5 | Headmost address of +5 VOBU and video-existence indicating flag | 4 bytes |
| FWDI 4 | Headmost address of +4 VOBU and video-existence indicating flag | 4 bytes |
| FWDI 3 | Headmost address of +3 VOBU and video-existence indicating flag | 4 bytes |
| FWDI 2 | Headmost address of +2 VOBU and video-existence indicating flag | 4 bytes |
| FWDI 1 | Headmost address of +1 VOBU and video-existence indicating flag | 4 bytes |
| FWDI Next | Headmost address of the next VOBU and video-existence indicating flag | 4 bytes |
| BWDI Prev | Headmost address of the previous VOBU and video-existence indicating flag | 4 bytes |
| BWDI 1 | Headmost address of -1 VOBU and video-existence indicating flag | 4 bytes |
| BWDI 2 | Headmost address of -2 VOBU and video-existence indicating flag | 4 bytes |
| BWDI 3 | Headmost address of -3 VOBU and video-existence indicating flag | 4 bytes |
| BWDI 4 | Headmost address of -4 VOBU and video-existence indicating flag | 4 bytes |
| BWDI 5 | Headmost address of -5 VOBU and video-existence indicating flag | 4 bytes |
| BWDI 6 | Headmost address of -6 VOBU and video-existence indicating flag | 4 bytes |
| BWDI 7 | Headmost address of -7 VOBU and video-existence indicating flag | 4 bytes |
| BWDI 8 | Headmost address of -8 VOBU and video-existence indicating flag | 4 bytes |
| BWDI 9 | Headmost address of -9 VOBU and video-existence indicating flag | 4 bytes |
| BWDI 10 | Headmost address of -10 VOBU and video-existence indicating flag | 4 bytes |
| BWDI 11 | Headmost address of -11 VOBU and video-existence indicating flag | 4 bytes |
| BWDI 12 | Headmost address of -12 VOBU and video-existence indicating flag | 4 bytes |
| BWDI 13 | Headmost address of -10 VOBU and video-existence indicating flag | 4 bytes |
| BWDI 14 | Headmost address of -14 VOBU and video-existence indicating flag | 4 bytes |
| BWDI 15 | Headmost address of -15 VOBU and video-existence indicating flag | 4 bytes |
| BWDI 20 | Headmost address of -20 VOBU and video-existence indicating flag | 4 bytes |
| BWDI 60 | Headmost address of -60 VOBU and video-existence indicating flag | 4 bytes |
| BWDI 120 | Headmost address of -120 VOBU and video-existence indicating flag | 4 bytes |
| BWDI 240 | Headmost address of -240 VOBU and video-existence indicating flag | 4 bytes |
| BWDI Video | Lead-off address of the previous VOBU having video data | 4 bytes |
| | Total | 168 bytes |

FIG. 21

SYNCHRONIZING INFORMATION (SYNCI)

|  | CONTENTS | NUMBER OF BYTES |
|---|---|---|
| (1) A_SYNCA 0 to 7 | Address of audio pack (A_PCK) to be reproduced | 2 bytes×8 |
| (2) SP_SYNCA 0 to 31 | Headmost address of VOBU for sub-picture pack (SP_PCK) to be reproduced | 4 bytes×32 |
|  | Total | 144 bytes |

PHYSICAL FORMAT INFORMATION (2048 bytes)

| BYTE | CONTENTS | NUMBER OF BYTES |
|---|---|---|
| 0 | Book type, Part version | 1 |
| 1 | Disk size, Minimum Read-out rate | 1 |
| 2 | Disk structure | 1 |
| 3 | Recording density | 1 |
| 4~15 | Data area allocation (Start address: 030000h / End address: xxxxxx) | 12 |
| 16~2047 | | 2032 |

| |
|---|
| Simple audio play pointer table information (SAPP TI)     16 bytes |
| Simple audio play pointers #1 (SAPP #1)     48 bytes |
| ⋮ |
| Simple audio play pointers #n (SAPP #n)     48 bytes |

FIG. 26

| | |
|---|---|
| Title number of SAPP | (1 byte) |
| Track number of SAPP | (1 byte) |
| Start presentation time of the first cell of track specified by SAPP | (4 bytes) |
| Playback time of track specified by SAPP | (4 bytes) |
| Pose time of track specified by SAPP | (4 bytes) |
| Attributes (SAPP-ATR) of track specified by SAPP | (4 bytes) |
| Reserved | (18 bytes) |
| Start address of track specified by SAPP | (4 bytes) |
| Start address of the first cell of track specified by SAPP | (4 bytes) |
| End address of track specified by SAPP | (4 bytes) |

FIG. 27

FIG. 31A DVD-Video
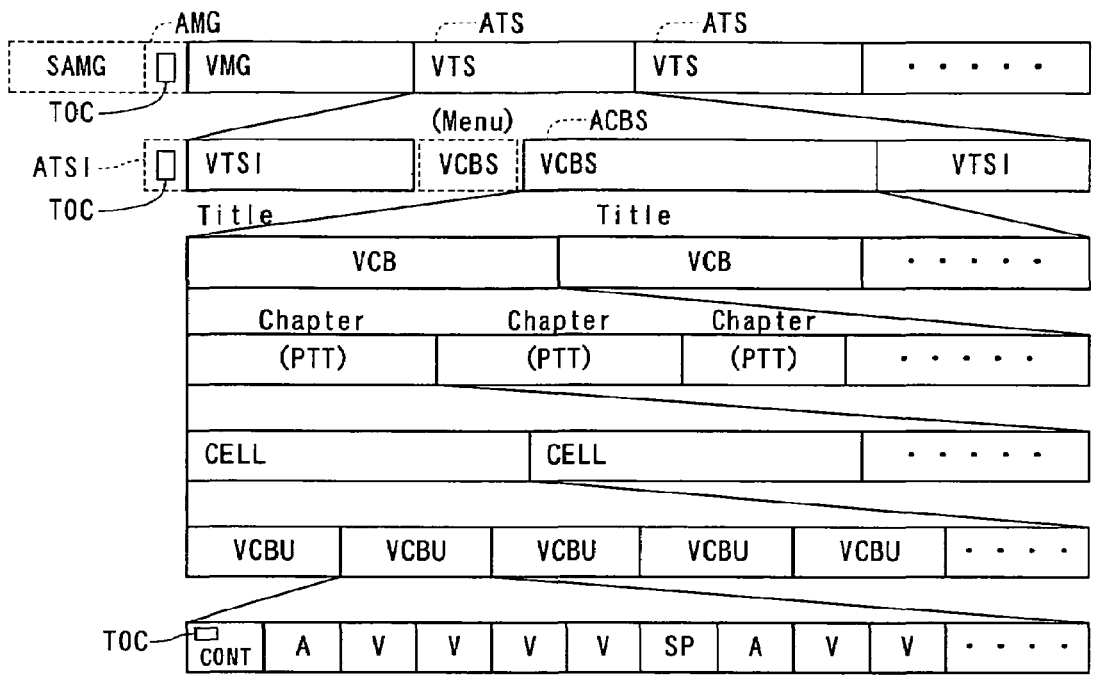
FIG. 31B DVD-Audio
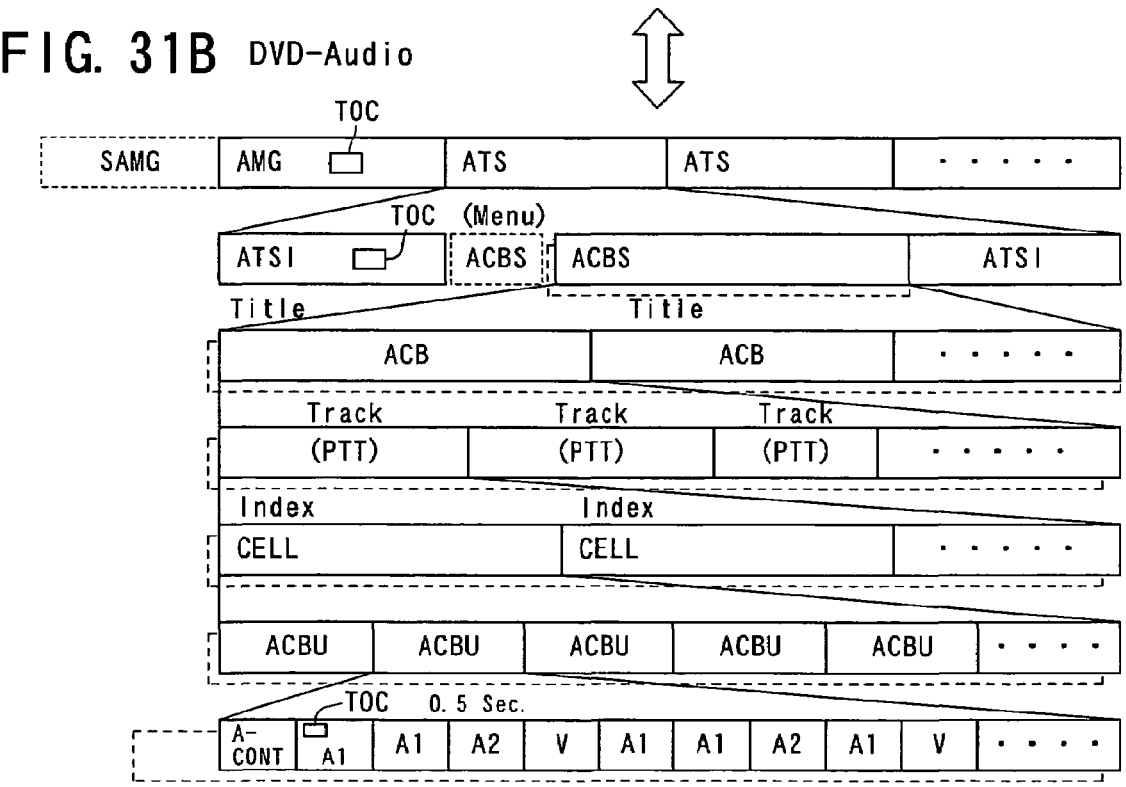

AOTT-SRPTI (4 bytes)

| AOTT-SRP-Ns | Number of Audio Only Title Search Pointers | 2 bytes |
|---|---|---|
| AOTT-SRPT-EA | End Address of AOTT-SRPT | 2 bytes |

AOTT-SRP(12 bytes)

| ATT-CAT | Audio Title Category | 1 byte |
|---------|---------------------|--------|
| AOTT-PG-Ns | Number of Programs in AOTT | 1 byte |
| AOTT-PB-TM | Total Playback Time for AOTT | 4 bytes |
| ATSN | ATS Number | 1 byte |
| ATS-TTN | ATS Title Number | 1 byte |
| ATS-SA | Start Address of ATS | 4 bytes |

FIG. 35

ATS-PGC-GI

| RBP | | NUMBER OF BYTES |
|---|---|---|
| 0~3 | ATS-PGC Contents (ATS-PGC-CNT) | 4 bytes |
| 4~7 | ATS-PGC Playback Time (ATS-PGC-PB-TM) | 4 bytes |
| 8~9 | Reserved | 2 bytes |
| 10~11 | ATS-PGIT Start Address | 2 bytes |
| 12~13 | ATS-C-PBIT Start Address | 2 bytes |
| 14~15 | Reserved | 2 bytes |

ATS-PGC-GI
| RBP | | NUMBER OF BYTES |
|---|---|---|
| 0~3 | ATS-PG Contents (ATS-PG-CNT) | 4 bytes |
| 4 | ATS-PG Entry Cell Number | 1 byte |
| 5 | Reserved | 1 byte |
| 6~9 | FAC-S-PTM | 4 bytes |
| 10~13 | ATS-PG Playback Time | 4 bytes |
| 14~17 | ATS-PG Pose Time | 4 bytes |
| 18 | Reserved (for Copyright Management Data CMI) | 1 byte |
| 19 | Reserved | 1 byte |
FIG. 43
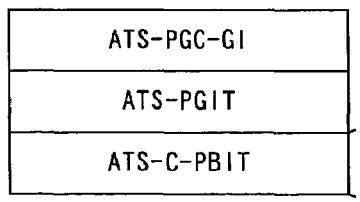
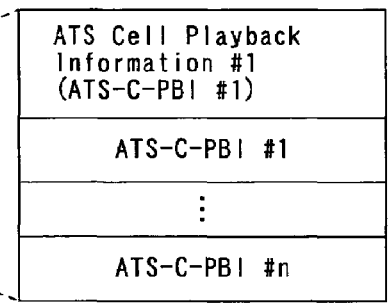
FIG. 44

ATS-C-PBI

| RBP | | NUMBER OF BYTES |
|---|---|---|
| 0 | ATS-C Index Number | 1 byte |
| 2 | ATS-C Type (ATS-C-TY) | 1 byte |
| 2~3 | Reserved | 2 bytes |
| 4~7 | ATS-C Start Address | 4 bytes |
| 8~11 | ATS-C End Address | 4 bytes |

FIG. 65A
PRODUCTION OF PACKETS
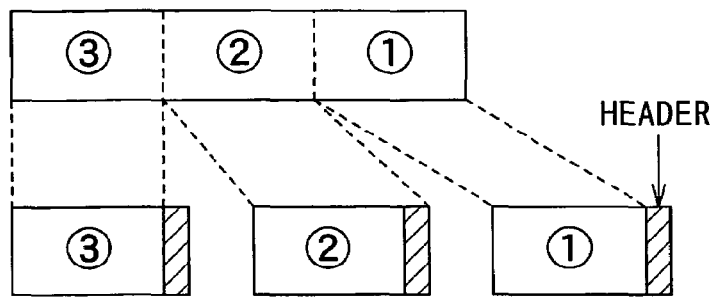
HEADER
FIG. 65B
DECODE OF DATA
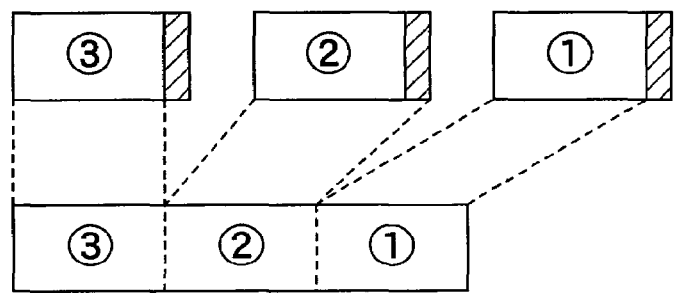
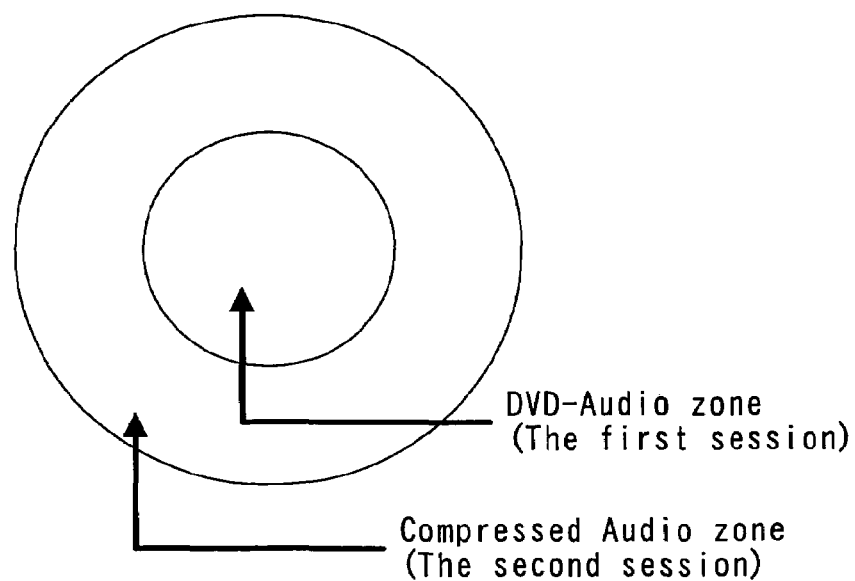
DVD-Audio zone (The first session)
Compressed Audio zone (The second session)
FIG. 66

DISK FOR AUDIO DATA, REPRODUCTION APPARATUS, AND METHOD OF RECORDING/REPRODUCING AUDIO DATA

BACKGROUND OF THE INVENTION

1. Technical Field

The present invention relates to a disk for audio data, reproduction apparatus, and method of recording/reproducing audio data.

2. Related Art

One of conventional recording mediums for memorizing audio data is a compact disk (CD), which is categorized into optical disks for reproducing audio data. A digital versatile disk (or a digital video disk) (DVD), which is also a conventional recording medium, is known as an optical disk higher in recoding density than the CD.

In such conventional conditions, the DVD (hereinafter referred to as "DVD-Video") records thereon video signals as a main signal and audio signals as a subsidiary signal. Thus this recording scheme has the problems described below.

First, the audio signal is combined with the video signal in the DVD-Video, so that a capacity for recording the audio signal is limited to a small amount. Secondly, it is impossible to manage time for recording the audio signal independent of the video signal. Thirdly, audio data cannot be recorded in a high grade manner and lossless compression cannot be applied to recording audio data.

Also, since compared to video users, audio users range over various ages, it is requested that the DVD-Video provide a simplified reproduction way realized by using a TOC (table of contents), as can be seen in the CD. However, in using a reproduction apparatus such as player whose recording medium is the DVD-Video, a navigation control pack (called "CONT pack") is combined with plural video ("V") and audio ("A") packs so as to form a video contents block unit that is in charge of controlling the reproduction of the "V" and "A" packs. Therefore, for users who desire to record and reproduce audio signals in the DVD-Video disk independent of the video signal, it is difficult to primarily record and reproduce them in a simple manner, thus resulting in that the DVD-Video disk is not very useful for users.

Moreover, in the case of using the DVD-Video, the time management is dependent on only intervals of video frames. This will cause a difficulty when a user desires to primarily record audio signals. That is, it is difficult to manage the audio signals in real time, although continuously playing back is more significant for the audio signals than video signals.

In order to ease such a difficulty, some techniques of improving the continuity of audio signals have been proposed. One of such techniques is shown by Japanese Patent Laid-open publication No. 11-185450, in which there is disclosed an encoder that allows a user to easily reproduce audio signals, thus having a good usability, and to easily manage the real-time performance of recording of audio signals. Another technique is shown by Japanese Patent Laid-open No. 2002-358732, which provides a recorder for disks in which audio data for a longer period of time can be recorded in a compressed manner. This recorder is therefore useful for alleviation of a problem that some compression techniques such as AAC (Advanced Audio Coding) and AC-3 (Dolby AC3), which are effective in saving a memory capacity for audio signals, cannot be applied to compressed audio signals.

However, the above conventional encoder and recorder still face some drawbacks which have not been resolved fully yet. Specifically, the above-described encoder and recorder are not sufficient in that audio data cannot be recorded both in a high grade manner with lossless compression and in a reasonable grade manner with lossy compression. In addition, the above-described encoder and recorder cannot cope with providing various types of compressed audio data with a various range of recording time. In the above-described encoder and recorder, there is still a problem that a user cannot chooses a desired type of compressed audio data according to the category of the music or user's recording medium.

SUMMARY OF THE INVENTION

The present invention has been made with due consideration to the foregoing drawbacks, and an object of the present invention is to resolve the foregoing various problems.

In the present invention, the term "a piece (or pieces) of music" is conceptually defined as a segmented aggregation (or aggregations) of music (tune or musical composition), and includes for example a movement (movements).

In order to achieve the object, as one aspect of the present invention, there is provided an audio disk comprising; a first audio zone which is an area in which both of a plurality of tracks each including a single piece of music and a first management information including first control information for allowing each track to be reproduced are recorded, wherein the music is composed of audio data produced from either a linear PCM (Pulse Code Modulation) signal or a signal produced by applying lossless compression to the linear PCM signal and the linear PCM signal is an audio signal subjected to quantization at both a sampling frequency and the number of quantization bits on a DVD-Audio specification; and a second audio zone which is an area where music composed of audio signal produced under lossy compression, a plurality of files each storing a signal of a single piece of music subjected to the lossy compression, and second management information including second control information for allowing each file to be reproduced are recorded, each piece of music stored in each file corresponding to the music included in any one of the tracks in the first audio zone. In this configuration, text information concerning each piece of music stored in each file may additionally be recorded in the second audio zone.

It is preferred that the file recorded in the second audio zone has a plurality of files each storing therein a signal produced by applying each of a plurality of types of lossy compression each serving as the lossy compression to the music corresponding to each of the tracks in the first audio zone, the plurality of files being given with the same file name having an extension which is different from one another depending on each of the plurality of types of lossy compression.

Further, as another aspect of the present invention, there is provided an audio disk comprising; a first audio zone which is an area in which both of a track including a single piece of music and a first management information including first control information for allowing the track to be reproduced are recorded, wherein the music is composed of audio data produced from either a linear PCM (Pulse Code Modulation) signal or a signal produced by applying lossless compression to the linear PCM signal and the linear PCM signal is an audio signal subjected to quantization at both a sampling frequency and the number of quantization bits on a DVD-Audio specification; and a second audio zone which is an area where music composed of audio signals produced under lossy compression, a file storing a signal produced by applying to the lossy compression to the music corresponding to the single track in the first audio zone, and second management information including second control information for allowing the file to be reproduced are recorded. In this configuration, text information concerning each piece of music stored in each file may additionally be recorded in the second audio zone.

In the above configurations, it is therefore possible that all or part of pieces of music (tunes) of the tracks in the first audio zone are recorded, file by file, as compressed audio files into the second audio zone. Hence, without trans-coding, a compressed audio file can quickly be taken out. Using a portable audio terminal, audio disk on this disk can be reproduced with saved power consumption. Further, audio data can be copied at higher speed from a general-purpose audio player (DVD-Audio player) to a potable audio terminal having no disk reproducing function.

Since each piece of music (tune) can be recorded, file by file, in two or more compression techniques, a desired compression technique which is applicable to a potable audio terminal can be chosen for an immediate reproduction of audio data.

Moreover, in the second audio zone, all or part of pieces of music (tunes) corresponding to the tracks in the first audio zone are recorded, file by file, together with both management information (CAMG) for managing the files and text information. Hence the audio data in the second audio zone can be recorded concurrently with the text information, whereby the usability is improved.

Further, as another aspect of the present invention, there is provided a reproduction apparatus for reproducing the music recorded on the audio disk according to the above, the reproduction apparatus comprising: a reading unit configured to selectively read out the music recorded in either of the first audio zone and the second audio zone on the audio disk; and a reproduction unit configured to reproduce the music read out by the reading unit using either of the first and second control information corresponding to the read-out music.

Hence this reproduction apparatus has the capability of selectively reading out either a piece of music recorded in the first audio zone or a piece of music recorded in the second audio zone of an audio disk according to the present invention.

Still further, as another aspect of the present invention, there is provided a method of recording the music recorded on the audio disk according to the above to a medium to be copied and reproducing the music recorded on the medium, comprising; selectively reading out the music recorded on either of the first audio zone and the second audio zone on the audio disk; recording the read-out music to the medium; and reproducing the music recorded on the medium.

The instant recording/reproducing technique enables the selection of a compression technique with which a portable audio terminal is able to decode audio data, which will lead to recording and reproduction in an immediate manner.

Further, as another aspect of the present invention, there is provided a recording method, comprising; preparing an audio disk comprising a first audio zone which is an area for recording therein both of a plurality of tracks each including a single piece of music and first management information including first control information for allowing each track to be reproduced, wherein the plurality of tracks are recorded in a group, the music is composed of a signal based on either a linear PCM (Pulse Code Modulation) signal or a signal produced by applying lossless compression to the linear PCM signal, the linear PCM signal is an audio signal subjected to quantization at both a sampling frequency and the number of quantization bits on a DVD-Audio specification, and the first control information includes group information in relation to the group, and a second audio zone which is an area for recording therein music composed of audio signal produced under lossy compression; and recording onto the second audio zone a plurality of files each storing therein a signal of a single piece of music subjected to the lossy compression and second management information including second control information for allowing each file to be reproduced, wherein each piece of music stored in each file corresponds to the music included in any one of the tracks in the first audio zone, the plurality of files are recorded in a group corresponding to the group in the first audio zone, and the second control information includes group information in relation to the group in the second audio zone. In this configuration, recording onto the second audio zone includes recording text information concerns with each piece of music stored in each file.

It is preferred that the file recorded in the second audio zone has a plurality of files each storing therein a signal produced by applying each of a plurality of types of lossy compression each serving as the lossy compression to the music corresponding to each of the tracks in the first audio zone, the plurality of files being given with the same file name having an extension which is different from one another depending on each of the plurality of types of lossy compression.

Still further, as another aspect of the present invention, there is provided a recording method, comprising; preparing an audio disk comprising a first audio zone which is an area for recording therein both of a track including a single piece of music and first management information including first control information for allowing the track to be reproduced are recorded, wherein the track is recorded in a group, the music is composed of audio data produced from either a linear PCM (Pulse Code Modulation) signal or a signal produced by applying lossless compression to the linear PCM signal, the linear PCM signal is an audio signal subjected to quantization at both a sampling frequency and the number of quantization bits on a DVD-Audio specification, and the first control information includes group information in relation to the group, and a second audio zone which is an area for recording therein music composed of audio signal produced under lossy compression; and recording onto the second audio zone both of a file storing therein a signal produced by applying to the lossy compression to the music corresponding to the single track in the first audio zone and second management information including second control information for allowing the file to be reproduced, wherein the file is recorded in a group corresponding to the group in the first audio zone and the second control information includes group information in relation to the group in the second audio zone. In this configuration, recording onto the second audio zone includes recording text information concerns with the music.

The foregoing recording methods are therefore able to provide the similar or identical advantages to those provided by the audio disk according to the present invention.

Further, as another aspect of the present invention, there is provided a reproduction apparatus for reproducing the music recorded on an audio disk with the use of the recording method according to the above, the reproduction apparatus comprising: a reading unit configured to selectively read out, by the group, the music recorded in either of the first audio zone and the second audio zone on the audio disk; and a reproduction unit configured to reproduce, by the group, the music read out by the reading unit using either of the first and second control information corresponding to the read-out music.

In this production apparatus, a piece of music recorded either in the first audio zone or in the second audio zone of an audio disk can selectively be read out from each zone, group by group. Thus read-out music can be reproduced (played back) on the group basis.

Further, as another aspect of the present invention, there is provided a method of recording the music recorded on an audio disk with the use of the recording method according to the above to a medium to be copied and reproducing the music recorded on the medium, comprising; selectively reading out the music recorded on either of the first audio zone and the second audio zone on the audio disk; recording the read-out music to the medium; and reproducing the music recorded on the medium. This recording/reproducing method is also able to have the advantages identical to those described before.

Various other configurations and advantages thereof will be made clear in the accompanying drawings and the descriptions in the embodiments.

BRIEF DESCRIPTION OF THE DRAWINGS

Other objects and aspects of the present invention will become apparent from the following description and embodiments with reference to the accompanying drawings in which:

FIG. 1A is an explanatory diagram showing the format of a DVD-Video, which is introduced for comparison with the format of a DVD-Audio according to a first reference adopted by a first embodiment of the present invention;

FIG. 1B is an explanatory diagram showing the format of the DVD-Audio according to the first reference;

FIG. 5 is an explanatory diagram detailing the format of an audio character display (ACD) area in FIG. 4;

FIG. 7 is an explanatory diagram detailing the format of an audio search data (ASD) area in FIG. 4;

FIG. 10 is an explanatory diagram showing a modification of the format of audio character display (ACD) information in the second reference;

FIG. 11 is an explanatory diagram showing audio search data (ASD) in the second reference;

FIG. 13 is a table detailing PCI data shown in FIG. 12;

FIG. 14 is a table detailing PCI general information shown in FIG. 13;

FIG. 15 is a table detailing recording information shown in FIG. 13;

FIG. 16 is a table detailing PCI data shown in FIG. 12;

FIG. 17 is a table detailing DCI general information shown in FIG. 16;

FIG. 18 is a table detailing seamless reproducing information PCI shown in FIG. 16;

FIG. 21 is a table explaining in detail the VOBU search information in FIG. 16;

FIG. 26 is a table that exemplifies TOC information recorded in a copyright information area in FIG. 24;

FIG. 27 is a table that details the TOC information recorded in a copyright information area in FIG. 24;

FIGS. 31A and 31B illustrate another reference which can be adopted by the first embodiment, in which there are shown the format of a DVD-Video and the format of a DVD-Audio according to the present invention;

FIG. 35 illustrates in detail the format of AOTT-SRP (audio only title search pointer) in FIG. 32;

FIG. 43 illustrates in detail the format of ATS-PGI (ATS program information) in FIG. 42;

FIG. 44 illustrates in detail the format of ATS-C-PBIT (ATS cell playback information table) in FIG. 40;

FIGS. 65A and 65B respectively explain processing for packets on the network shown in FIG. 64;

FIG. 66 illustrates the allocation of audio zones on a DVD-Audio disk accord to a further embodiment of the present invention;

DETAILED DESCRIPTION OF PREFERRED EMBODIMENTS

Figure 2:
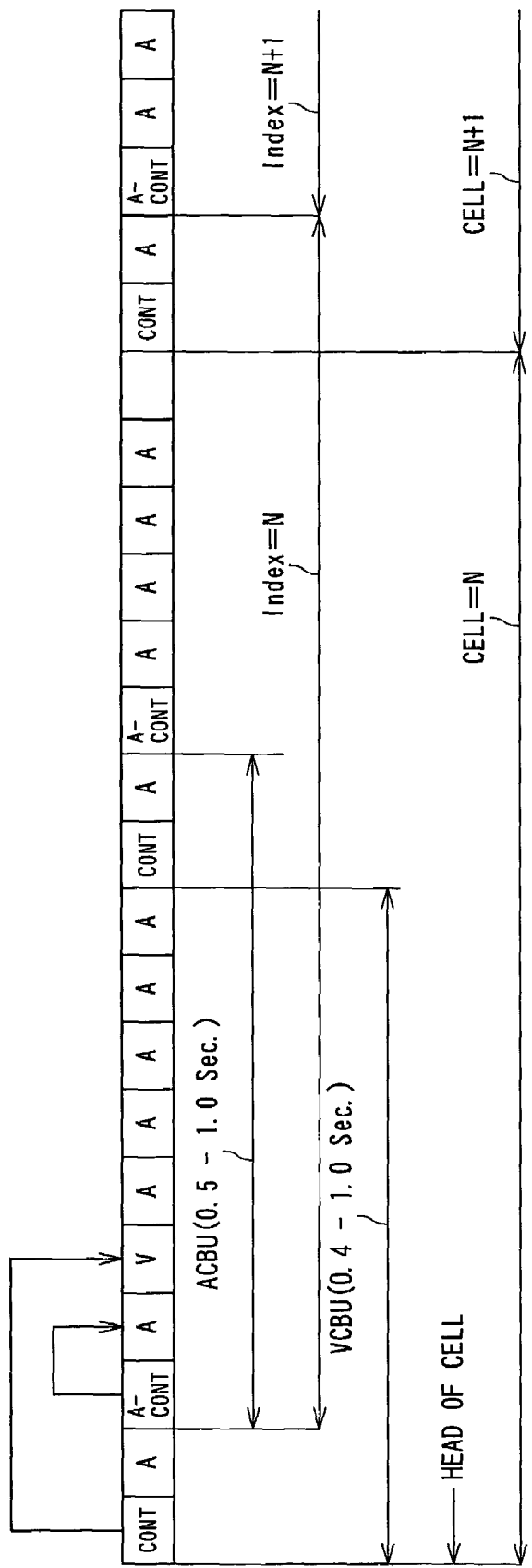
FIG. 2 is an explanatory diagram showing the format of an audio contents block unit (ACBU) on the DVD-Audio in FIG. 1B.

In connection with accompanying drawings, preferred embodiments of the present invention will now be described.

First Embodiment

In connection with FIGS. 1A and 1B to 65, a first embodiment of the present invention will now be described, together with some modifications thereof.

In the first embodiment, for an easier understanding of a DVD (digital versatile disk)-Audio disk according to the present invention, the format structures of known DVDs will firstly be explained as "a first reference" and "a second reference." After those explanations, audio disks (DVD-Audio disks) according to "a first example" and "a second example" adopted in the first embodiment will then be explained, which will also be followed by the explanations of a reproduction apparatus, reproducing method, and recording method according to the first embodiment.

In terms of physical structures, the audio disk (DVD-Audio disks) according to the present invention can be formed in a known manner, where, though not shown in figures, by way of example, the disk is composed of a printing layer, an upper protective layer, a reflection layer for a laser beam, one or double layered recording layers on which audio data are recorded or can be recorded, and a lower protective layer.

First Reference

In connection with FIGS. 1A and 1B to 8, a first reference of an audio disk will now be explained.

FIGS. 1A and 1B show the data formats of a DVD-Video and a DVD-Audio, respectively, in which the data format of the DVD-Audio is compatible with that of the DVD-Video, though its area names are different from one the other.

As shown in FIG. 1A, the DVD-Video has the data format consisting essentially of areas of a video manager (VMG) positioning at the head thereof and a plurality of video title sets (VTS) following the VMG. Correspondingly, as shown in FIG. 1B, the DVD-Audio has the data format consisting essentially of areas of an audio manager (AMG) and a plurality of audio tile sets (ATS) following the AMG.

The VTSs and ATSs will now be described in a comparative manner. Each of the VTSs is composed of areas of a first VTS information (VTSI) positioning at the head thereof, one or more video contents block sets (VCBS) following the headmost VTSI, and a second VTSI positioning at the tail thereof. Correspondingly, each of the ATSs is composed of areas of a first ATS information (ATSI) positioning at the head thereof, one or more video contents block sets (ACBS) following the headmost ATSI, and a second ATSI positioning at the tail thereof. In the ATSI, data of time indicative of performance (playback time) of each of pieces of music stored in the ACBS is set in actual time.

Each of the VCBSs is composed of a plurality of video contents blocks (VCB), while each of the ACBSs is composed of a plurality of audio contents blocks (ACB). Each VCB is an area formed for one title (Title) of video data, while each ACB is an area formed for one title of audio data. Each VCR (for one title) is composed of plural chapters, while each ACB (for one title) is composed of plural tracks. Each of the chapter (Chapter) and track (Track) includes part of title (PTT).

Each chapter is made up of plural cells (CELL), while each track is made up of plural indexes indices (Index). Moreover, while each cell is composed of plural VCB units (VCBU), each index is composed of plural ACB units (ACBU). Each VCB unit and each ACB unit are composed of a plurality of packs, respectively, and each pack is formed into a 2048-bytes memory region.

Each VCB unit is composed of a navigation control pack (hereinafter referred to as "CONT pack") positioning at the head thereof and a plurality of succeeding packs consisting of video (V) packs, audio (A) packs and sub-picture (SP) pack. Correspondingly, each ACB unit is composed of an audio control pack (hereinafter referred to as "A-CONT pack") positioning at the head thereof and a plurality of succeeding packs consisting of audio (A) packs and video (V) packs.

In the CONT pack of each VCR unit, information to control the succeeding V-packs is stored and in the A-CONT pack of each ACB unit, information to manage audio signals in the succeeding A-packs, like TOC information for CDs, is stored. Audio data is stored in the A-packs, while video data and data other than audio data, for example, closed caption (CC) data, are stored in the V-packs.

As shown in FIG. 2, each VCB unit is composed of an arbitrary number of packs for a period of 0.4 to 1.0 seconds and each ACB unit is composed of an arbitrary number of packs for a period of 0.5 to 1.0 seconds. The A-CONT pack of the ACB unit in the CVC-audio is located as the third pack of the VCB unit in the DVD-Video.

The A-CONT pack is basically every 0.5 seconds in the audio time and lasts until the last of each index which is completed in a period of 0.5 to 1.0 seconds. The audio time is (GOF: Group of Audio Frame unit) is indicated by the A-CONT pack and data position of the audio time is decided by an audio frame number, a first access unit pointer, and the number of frame headers. In addition, the A-pack located immediately before the A-CONT pack is not always padded every 0.5 seconds in the audio time.

Mutually adjacent A-packs are located to have mutually related audio signals. For example, for stereo type of audio data, audio data of L-channel pack and R-channel pack are stored in mutually adjacent A-packs. Similarly, another example can be given to 5-channel (multiple channels) type of audio data in the same way. The V-pack in the A-CONT pack is located next to an A-pack in cases where video data the V-pack should be displayed together with the reproduction of audio signals in the A-pack.

Figure 3:
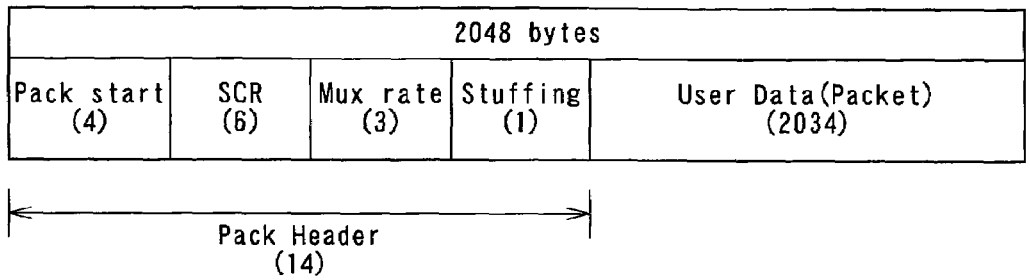
FIG. 3 is an explanatory diagram detailing the formats of an audio pack (A-pack) and a video pack (V-pack) in FIG. 2.

As shown in FIG. 3, each of the A-packs and V-packs is formed in a pack of totals of 2048 bytes and consists of user data (audio or video packet data: A-data or V-data) of 2034 bytes and additional data amounting a total of 14 bytes. The additional data is pack start information of 4 bytes, an SCR (System Clock Reference) of 6 bytes, information of 3 bytes indicating a maximum rate (i.e., a maximum multiplex rate for program streams), and a stuffing of 1 byte. In this configuration, the SCR information, which serves as a time stamp, can be set not only to "1" in the lead-off pack in each ACB unit but also to be successive through the A-packs within the same title, with the result that the time of the A-packs in the same title can be managed.

Figure 4:
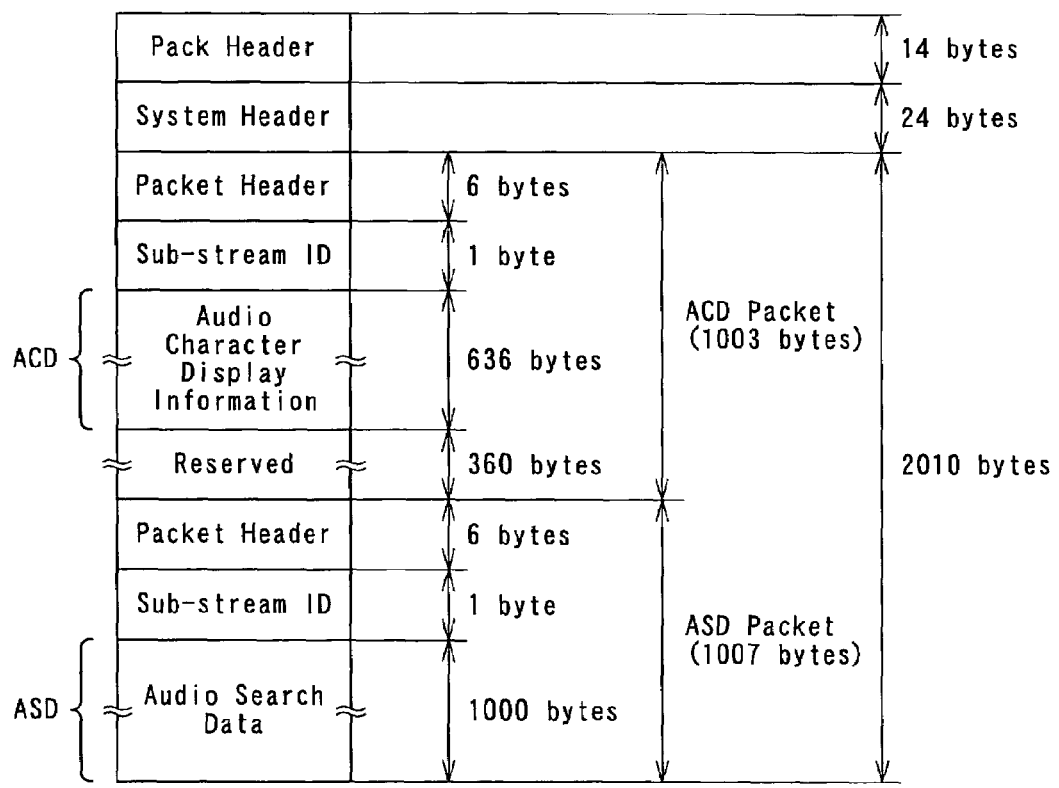
FIG. 4 is an explanatory diagram detailing the format of an audio control pack (A-CONT pack) in FIG. 2.

The A-CONT pack is illustrated in FIG. 4, which is composed of a pack header of 14 bytes, a system header of 24 bytes, an ACD (audio character display) packet of 1003 bytes, and an ASD (audio search data) packet of 1007 bytes. Of these, the ACD packet is made up of a packet header of 6 bytes, a sub stream ID of 1 byte, ACD (audio character display) information of 636 bytes (which will be detailed in FIG. 5), and a reservation (frequently indicated as "reserved") area of 360 bytes. Similarly to the above, the ASD packet is composed of a packet header of 6 bytes, a sub stream ID of 1 byte, and ASD (audio search data) of 1000 bytes which will be detained in FIG. 7.

As explained in detail in FIG. 5, the area of the 636-byte ACD information is composed of a general information area of 48 bytes and two areas each of which amounts 294 bytes and each assigned to each of the first and language characters "1" and "2-" Each area of 294 bytes comprises a name space area of 93 byte, two free space areas "1" and "2" each amounting 93 bytes, and a data pointer area of 15 bytes.

Figure 6:
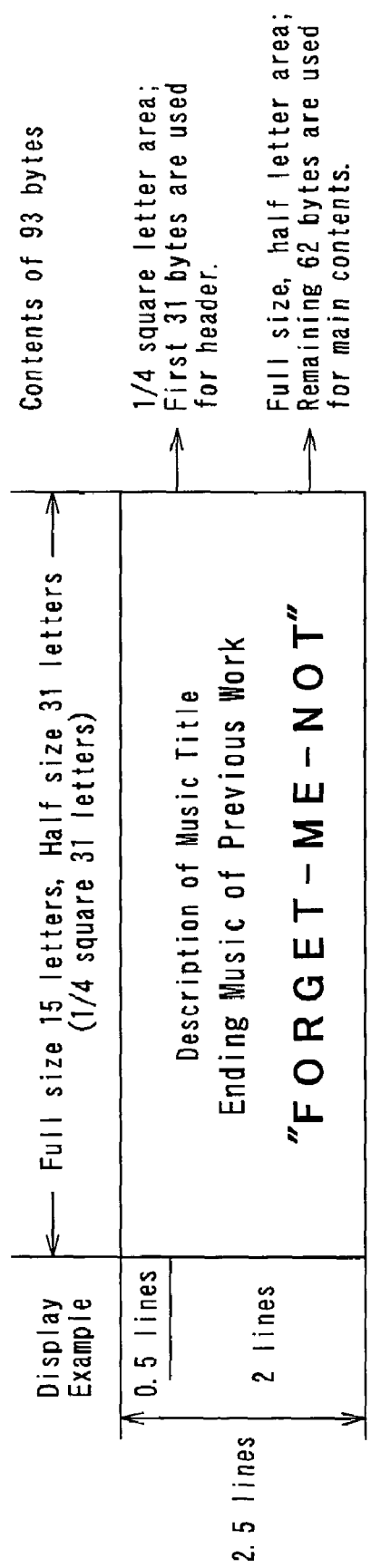
FIG. 6 is an explanatory diagram exemplifying a display based on name space information in FIG. 5.

In the name space area in either the first or second language character "1" or "2," data (audio text data) to display a music name in Japanese, for example, as shown in FIG. 6, is mapped. In contrast, in the other name space area, data (audio text data) to display the music name in English is mapped. As one variation mode, the types of display languages may be determined by a disk publisher.

The 48-byte general information consists of, for example, service level information of 16 bytes, language code information of 12 bytes, character set code information of 6 bytes, display item information of 6 bytes, 2-byte information indicative of "a difference from the previous ACD information," and reservation information of 6 bytes. Of these pieces of information, the 16-byte service level information represents various matters including a display size, display type, distinction among audio/video/sp, and stream. In this service level information, a character is mandatory but a bit map is optional. The 12-byte language code information represents, like a video file, the language codes of the character "1" and "2" by using 2 bytes, respectively, so that eight languages can be represented at the maximum in a file. With respect to this language code information, English is mandatory.

The foregoing 6-byte character set code information is given such that this information is able to have maximum of 15 character codes each corresponding to the language codes. In this information, one byte is used to show the presence or absence and types of the languages of the characters "1" and "2." Some codes can be exemplified as below.

1) ISO646
2) ISO8859-1
3) MS-JIS

The foregoing 6-byte display item information indicates the free spaces "1" and "2" shown in FIG. 5, whether or not therein is a data pointer, and an ID, where filling out name spaces is mandatory. That is, a title name, a music name, and an artist name should be filled out any time.

The 1000-byte ASD (audio search data) is detained in FIG. 7, where this ASD is composed of general information of 16 bytes, current number information of 8 bytes, current time information of 16 bytes, title set search information of 8 bytes, title search information of 8 bytes, track search information of 404 bytes, index search information of 408 bytes, highlight search information of 80 bytes, and a reservation area of 52 bytes.

Of these, the 8-byte current number information is composed of a current title number of a title set (2 bytes: BCD), a current track number of the title set (2 bytes: BCD), a current index number of the tracks (2 bytes: BCD), and a reservation area (2 bytes). Furthermore, the 16-byte current time information a playback time for the tracks (4 bytes: BCD), a remaining playback time for tracks (4 bytes: BCD), an absolute time for the titles (4 bytes: BCD), and a remaining absolute time for titles (4 bytes: BCD).

The 8-byte title set search information is composed of the first sector number (4 bytes) of a title set and the last sector number (4 bytes) of the title set. Further the 8-byte title search information is composed of the first sector number (4 bytes) of a title and the last sector number (4 bytes) of the title. Still further, the 404-byte track search information is set to comprise the numbers of the tracks and sectors (4 bytes×99) of the title, the first track number (4 bytes) of the title, and the last track number (4 bytes) of the title.

The 408-byte index search information is set to have the indices of the sector numbers (4 bytes×100) of the tracks, the first index number (4 bytes) of the tracks, and the last index number (4 bytes) of the tracks. Further, the 80-byte highlight search information is composed of the in-sector numbers (4 bytes×10) of the tracks and the out-sector numbers (4 bytes×10) of the tracks.

The foregoing data format on the DVD is able to have the A-CONT pack located at the head of a series of plural A-packs, like the TOC information on a CD, so as to permits the A-CONT pack to manage the succeeding A-packs. Hence the audio data can be separated from other data such as video data and given much memory capacities thereto. In addition, the A-CONT pack is able to manage the audio time and allows easy text information such as music names of audio data.

Additionally, the TOC information including the title, start address, and performance time is included in the A-CONT pack, so that, even during the reproduction of audio data, pieces of information in response to user's operations can be taken out of the A-CONT pack to start the reproduction of the audio data. Further, the TOC information can be placed in both of an audio management information (AMGI) and an audio title set information (ATSI), where the necessary TOC information is memorized in a memory of a reproduction apparatus. This makes it possible to quickly read out, from the memory, information in response to user's operations to start reproducing audio data as early as possible. Still further, there is no need to memorize pieces of information requiring a larger amount of memory capacities, unlike a program chain information (PGCI) on the DVD-Video, so that the disk can be managed efficiently.

Additionally, a variety of functions can be given to each of the first case in which video (V) data are included and the second case in which video (V) data are not included in contents. When there is no video data in contents, (i) search and random access can be executed to three layers of titles, movements, and indices; (ii) rewinding, time search and random access can be executed by the GOF (audio frame); and (iii) the time of titles, movements and indices can be managed in real time.

In contrast, when there are some video data in contents, audio data and video data are given different advantages, respectively, As to the audio data, in addition to acquiring the foregoing advantageous functions (i) to (iii), there is an additional function that the current time and time remaining in titles and movements can be displayed and managed in real time. As to the video data, (i) search and random access can be executed to three layers of titles, PTTs and cells, (ii) rewinding, time search and random access can be executed by the video frame audio, (iii) the time of titles, PTTs and cells can be managed in real time, and (iv) the current time and time remaining in PTTs or titles can be displayed or managed by a video frame time.

Figure 8:
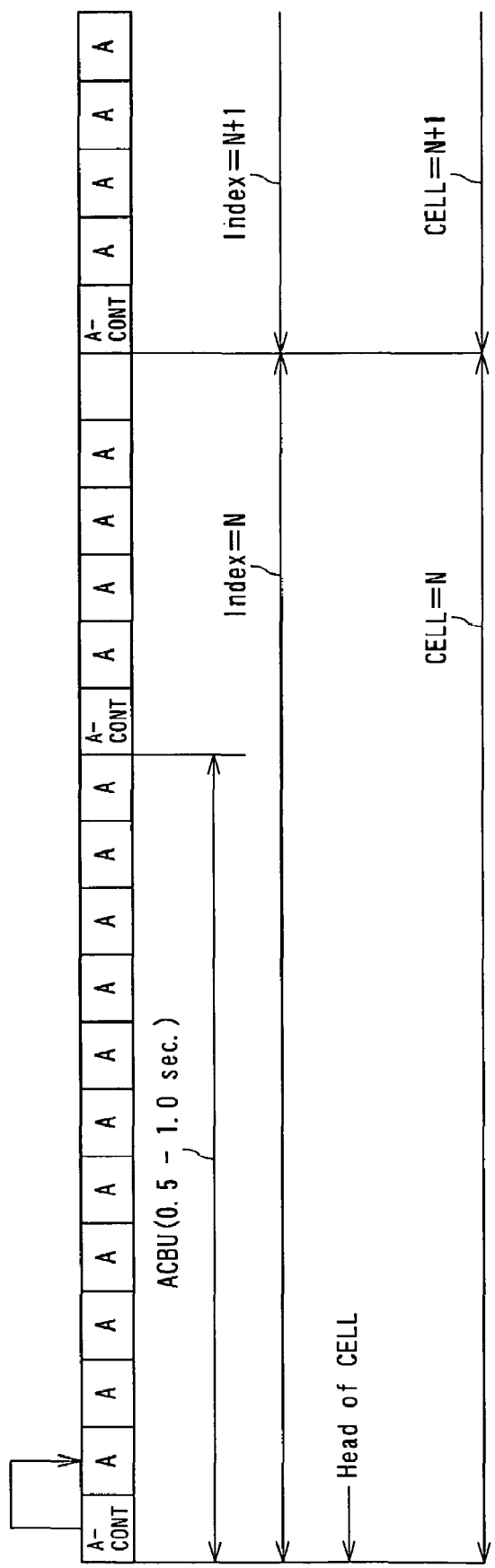
FIG. 8 is an explanatory diagram showing the format of an audio contents block unit on a DVD-Audio according to a modification of the first reference.

The ACBU shown in FIG. 1B, which includes both of the A-CONT and the CONT, can be modified as shown in FIG. 8, where there are no V-packs and CONT in the ACBU. That is, this modified ACBU is configured to reject video signals from being recorded therein, but a capacity to recode audio signals can be increased instead. Additionally, the size of a disk can be made more compact and the functions for playing audio signals back can be simplified, thus providing a reproduction apparatus suited for potable use.

Second Reference

In connection with FIGS. 9-25 as well as the foregoing various drawings, an audio disk according to a second reference employed by the first embodiment will now be explained.

In the foregoing first reference, the ASD (audio search data) in the A-CONT pack detailed in FIG. 7 is used to cause an audio reproduction apparatus to control the reproduction of A-packs. In this configuration, seamless reproduction is carried out based on the current number and the current time and jumping reproduction is carried out based on pieces of information acquired by the title set search, title search, track search, index search, and highlight search.

Figure 9:
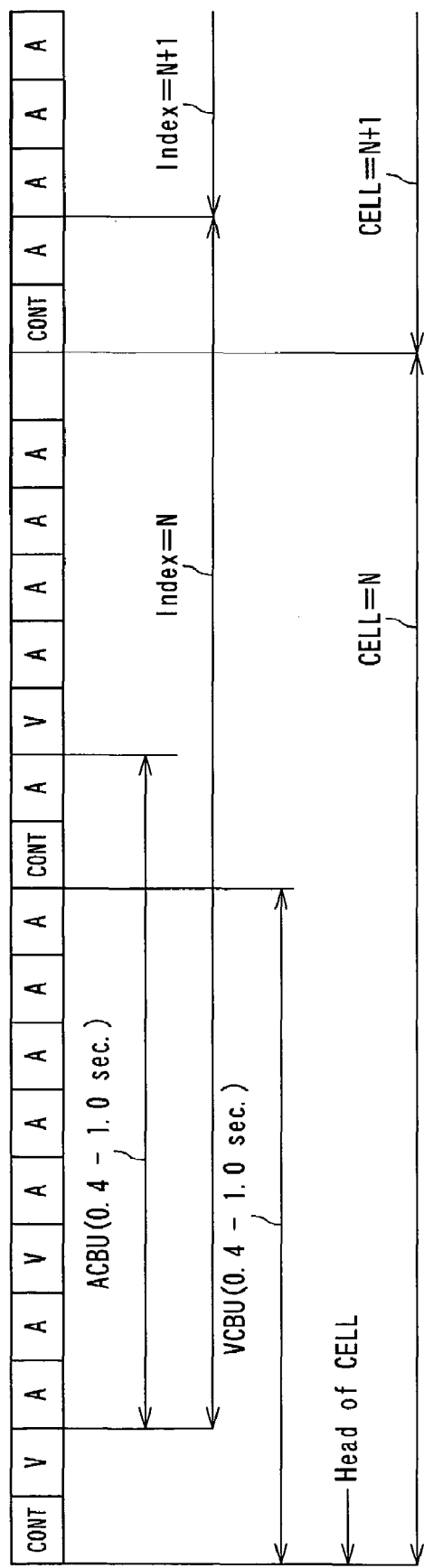
FIG. 9 is an explanatory diagram showing the formats of an ACBU and a video contents block unit (VCBU) according to a second reference adopted by the first embodiment of the present invention.

In contrast, an audio disk according to the second reference has a basic format defined on the DVD-Video specifications shown in FIG. 1A so that the audio disk can be reproduced by a DVD-Video disk reproduction apparatus. To be specific, as shown in FIG. 9, a VCB unit (VCBU) includes no A-CONT pack and is composed of a CONT pack located at the head thereof, a relatively large number of A-packs, and a relatively small number of V-packs. On the other hand, an ACB unit (ACBU) is formed to use, as the head thereof, an A-pack first following the first V-pack in the VCBU and is composed of an arbitrary number of packs falling within a range from 0.4 to 1.0 seconds, which is almost the same as that of the VCBU. In terms of the DVD-Video specifications, the VCBU is also called "VOBU."

Since there is no A-CONT pack in the ACBU, both of the ACD and ASD packets, which are included in the A-CONT pack in the foregoing first reference, are mapped in either the VMG (video manager) or the VTSs (video title sets) or in both of the VMG and the VTSs, which are shown in FIG. 1A. Alternatively, as shown by dotted liens in FIG. 1A, the ACD and ASD packets can be mapped in an AMG and ATSs added and accompanied to and by the VMG and VTSs. These AMG and ATSs are the same in functions with the AMG and ATSs shown in FIG. 1A, thus omitting them from being explained.

In the foregoing first reference, each ACD packet is placed within the A-CONT pack arranged in each ACB unit (repeated every time of 0.5 to 1.0 seconds), data indicative of a number of screens can be contained in the ACD packets. However, in the case of the second reference, the ACD packet is contained in the VMG (video manger) and/or VTSs (video title sets), so that an amount of data to be contained has a limitation. Hence, only data such as titles of each piece of music and/or each movement, which is a relatively small amount, is contained. In addition, audio reproducing control information, whose kind is as less as one kind, is enough for the container.

Furthermore, though the ACD area in the ACD may be configured to have the data of the first language character "1" and the second language character "2," like the first reference (refer to FIG. 5), this configuration can be modified as below. That is, as shown in FIG. 10, the data of the character "2" are deleted, where the ACD area is composed of a general information area of 48 bytes, an area of 294 bytes concerning the one language character "1," and an audio reproducing control information area of 294 bytes. The 294-byte area for the character "1" is used for displaying "audio navigation" information, such as the title of a piece of music, as shown in FIG. 6. The area for the character "1," which is formed in the same manner as that in the first reference, is composed of a name space area of 93 bytes, two free space areas each having 93 bytes, and a data pointer area of 15 bytes.

The audio reproducing control information area, of which contents are arbitrary and, for example, comprises 10 kinds of audio reproducing control information areas each having 25 bytes (250 bytes in total) and a reservation area of 44 bytes. These 10 kinds of audio reproducing control information indicate, what is called, control data recommended by professional mixers and can be used when a user desires to reproduce pieces of music put in A-packs. Hence the audio reproducing control information can be used to raise reproduced sound quality up to its best depending on the category of the music (classic, jazz, rock, or BGM) and factors such as performed condition, recorded condition, and atmosphere of the music (which may give different impression to the same music).

In cases where the number of audio signal channels is six, a mixing coefficient is put in the reservation area, the mixing coefficient being set to a value to mix the channels in such a manner that number of channels is down to 2 to allow stereophonic reproduction.

Since the CONT pack is used to reproduce A-packs in a seamless manner, the ASD is formed as shown in FIG. 11, where both of the 8-byte current number information and the 16-byte current time information which are shown in FIG. 7 in the first reference are deleted and the areas for those pieces of information are used as a reservation area of 76 bytes. Accordingly, although it is difficult to finely perform display and reproduction control, a DVD-Video disk reproduction apparatus is able to afford the reproduction of signals on such audio disks. Thus, as explained in the first reference, the audio disks are able to serve as effective recording mediums in a transition period during which disks permitting only the DVD-Audio disk reproduction apparatus to afford the reproduction but permitting the DVD-Video disk reproduction apparatus not to afford the reproduction become popular.

Figure 12:
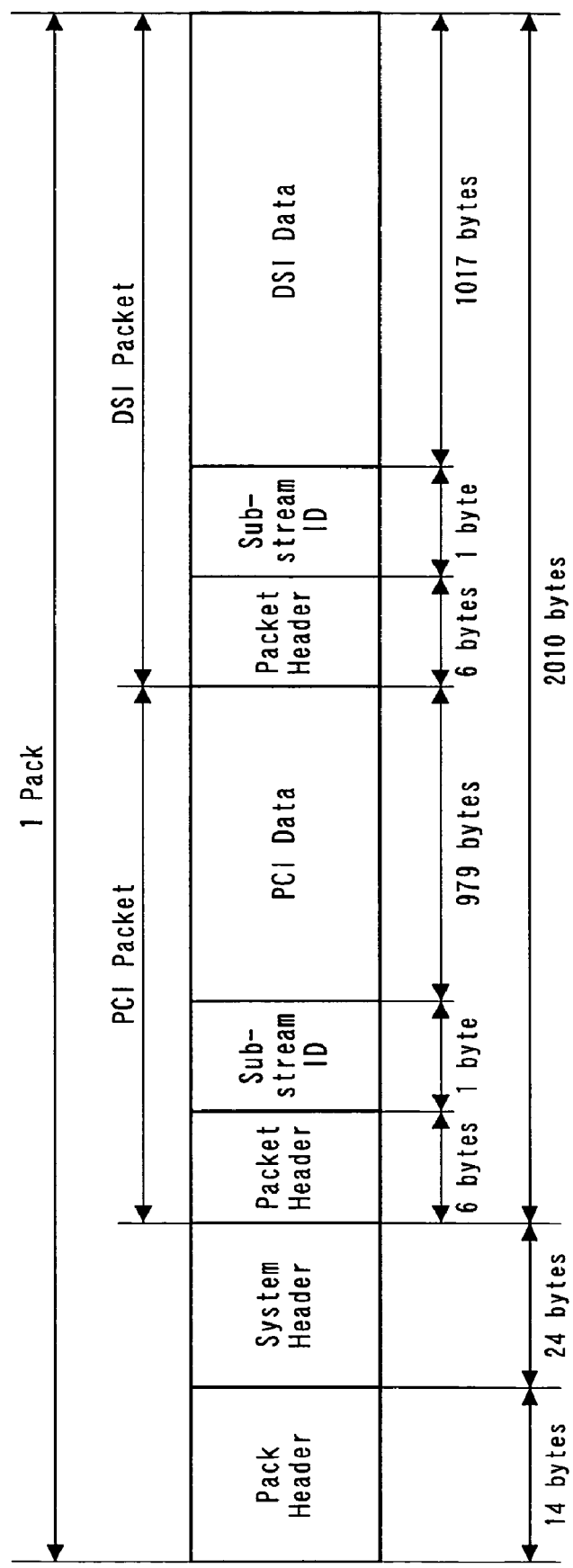
FIG. 12 is an explanatory diagram detailing a CONT pack shown in FIG. 9.

Referring to FIG. 12, the CONT pack will now be detailed in terms of its configuration. This CONT pack is normally called "navigation (NV) pack (common name is "navi pack") in the DVD-Video specifications. As shown in FIG. 12, the CONT pack is composed of a pack header of 14 bytes, system header of 24 bytes, presentation control information (PCI) packet, and data search information (DSI) packet, The PCI is referred to as reproducing control information and its packet is made up of a packet header of 6 bytes, sub-stream ID) of 1 byte, and PCI data of 979 bytes which will be detailed in FIG. 13 (986 bytes in total). By contrast, the DSI packet is made up of a packet header of 6 bytes, sub-stream ID of 1 byte, and DSI data of 1017 bytes which will be detailed in FIG. 16 (1024 bytes in total).

The PCI data is provided as navigation data to control the reproduction of the VOBUs. As detailed in FIG. 13, the PCI data is composed of four kinds of information consisting of PCI general information of 60 bytes (PCI_GI), non-seamless reproduction angle information of 36 bytes (NSML_AGLI), highlight information of 694 bytes (HLI), and recording information of 189 bytes (RECI).

Of the four kinds of information, the PCI general information is formed as detailed in FIG. 14, where the PCI general information comprises:
  an "LBN of NV pack (=CONT pack)" of 4 bytes (NV_PCK_LBN),
  a "category of VOBU" of 2 bytes (VOBU_CAT),
  a reservation area of 2 bytes,
  a "user operation control information of VOBU" of 4 bytes (VOBU_UOP_CTL),
  a "start PTM of VOBU" of 4 bytes (VOBU_S_PTM),
  an "end PTM of VOBU" of 4 bytes (VOBU_E_PTM),
  an "end PTM of sequence end in VOBU" of 4 bytes (VOBU_SES_PTM),
  an "elapse time in cell" of 4 bytes (C_ELTM), and
  a reservation area of 32 bytes.

In the "LBN of NV pack" (NV_PCK_LBN), the address of the NV pack including the present PCI data to be concerned is descried in RLBN from the lead-off LB of the VOBS including the present PCI data to be concerned. In the "category of VOBU" (VOBU_CAT), the state of an analog protection system (APS) of the present VOBU to be concerned is described.

The seamless-reproduction angle information of 36 bytes (NSML_AGLI) in FIG. 13 shows information concerning a destination address needed when an angle is changed. This information is valid only when an angle cell change is changed into "non-seamless," that is, a seam-less angel change flag shows the "non-seamless," The highlight information (HLI) in FIG. 13 is used to highlight a single rectangular area in a sub-picture display region, so that this information can be a basis for changing a mixture ratio (contrast), of hues between video in the specific rectangular area and the sub-picture. In addition, each sub-picture stream has a sub-picture unit (SPU), of which period of time for reproduction equals a valid period of time of the highlight information (HLI).

The recording information (RECI) in FIG. 13 can be detailed by way of example as shown in FIG. 15. Namely, the RECI is composed of:
  an "ISRC (international standard recording code) of video data in video streams" of 10 bytes (ISRCV),
  an "ISRC of audio data in decoding audio stream #0" of 10 bytes (ISRC_A0),
  an "ISRC of audio data in decoding audio stream #1" of 10 bytes (ISRC_A1),
  an "ISRC of audio data in decoding audio stream #2" of 10 bytes (ISRC_A2),
  an "ISRC of audio data in decoding audio stream #3" of 10 bytes (ISRC_A3),
  an "ISRC of audio data in decoding audio stream #4" of 10 bytes (ISRC_A4),
  an "ISRC of audio data in decoding audio stream #5" of 10 bytes (ISRC_A5),
  an "ISRC of audio data in decoding audio stream #6" of 10 bytes (ISRC_A6)
  an "ISRC of audio data in decoding audio stream #7" of 10 bytes (ISRC_A7),
  an "ISRC of SP data in decoding SP stream #0, #8, #16 or #24" of 10 bytes (ISRC_SP0),
  an "ISRC of SP data in decoding SP stream #1, #9, #17 or #25" of 10 bytes (ISRC_SP1),
  an "ISRC of SP data in decoding SP stream #2, #10, #18 or #26" of 10 bytes (ISRC_SP2),
  an "ISRC of SP data in decoding SP stream #3, #11, #19 or #27" of 10 bytes (ISRC_SP3),
  an "ISRC of SP data in decoding SP stream #4, #12, #20 or #28" of 10 bytes (ISRC_SP4),
  an "ISRC of SP data in decoding SP stream #5, #13, #21 or #29" of 10 bytes (ISRC_SP5),
  an "ISRC of SP data in decoding SP stream #6, #14, #22 or #30" of 10 bytes (ISRC_SP6),
  an "ISRC of SP data in decoding SP stream #7, #15, #23 or #31" of 10 bytes (ISRC_SP7),
  a "group of SP streams selected for ISRC" of 1 byte (ISRC-SP_SEL), and
  a reservation area of 18 bytes.

The data search information (DSI) described in FIG. 12 serves as navigation data to search the VOBUs for desired video data to reproduce the searched data in a seamless manner. The DSI is composed of, as listed in FIG. 16,:
  DSI general information of 32 bytes (DSI_GI),
  seamless reproducing information of 148 bytes (SML_PBI),
  seamless-reproduction angle information of 54 bytes (SML_AGLI),
  VOBU search information of 168 bytes (VOBU_SRI),
  synchronizing information of 144 bytes (SYNCI), and
  a reservation area of 471 bytes.

As listed in detail in FIG. 17, the DSI general information is composed of:
  an "SCR base of NV PCK" of 4 bytes (NV_PCK_SCR),
  an "LBN of NV PCK" of 4 bytes (NV_PCK_LBN),
  an "end address of VOBU" of 4 bytes (VOBU_EA),
  an "end address of the first reference picture of VOBU" of 4 bytes (VOBU_1STREF_EA),
  an "end address of the second reference picture of VOBU" of 4 bytes (VOBU_2STREF_EA),
  an "end address of the third reference picture of VOBU" of 4 bytes (VOBU_3STREF_EA),
  a "VOB ID number of VOBU" of 2 bytes (VOBU_VOB_IDN),
  a "reservation area" of 1 byte, a "cell ID number of VOBU" of 1 byte (VOBU_C_IDN), and a "cell elapse time" of 4 bytes (C_ELTM).

As listed in FIG. 18, the seamless reproducing information (SML_PBI) in FIG. 16 is composed of:
- a "category of seamless VOBU" of 2 bytes (VOBU_SML_CAT),
- an "end address of interleaved unit" of 4 bytes (ILVU_EA),
- a "start address of the next interleaved unit" of 4 bytes (NXT_ILVU_SA),
- a "size of the next interleaved unit" of 2 bytes (NXT_ILVUSZ),
- a "start PTM of video in VOB" of 4 bytes (VOB_V_S_PTM),
- an "end PTM of video in VOB" of 4 bytes (VOB_V_E_PTM),
- an "end PTM of audio in VOB" of 8 bytes×8 (VOB_A_STPPTM), and
- a "gap length of audio in VOB" of 8 bytes×8 (VOB_A_GAPLEN).

Figure 19:
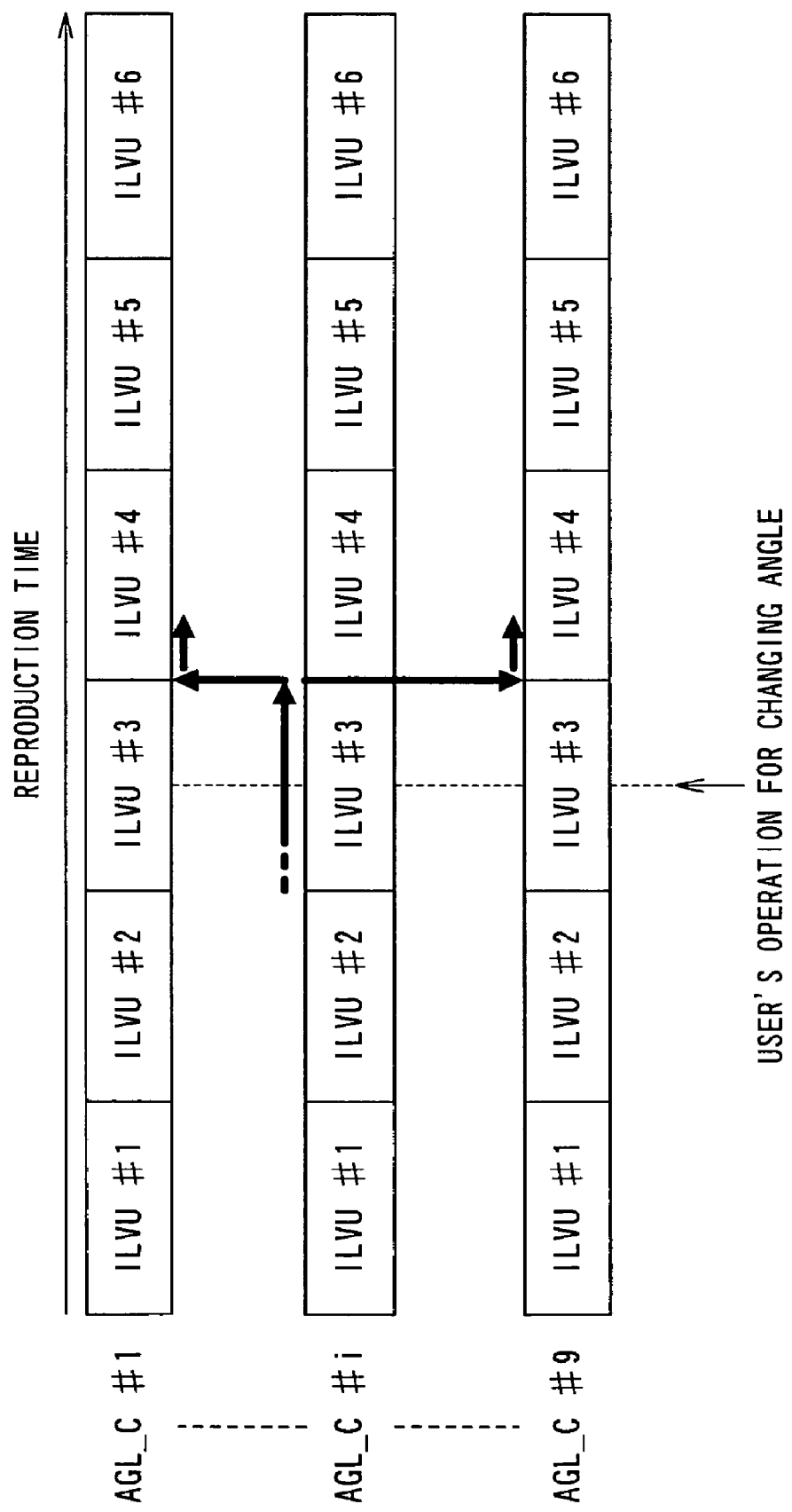
FIG. 19 conceptually shows a technique of seamless angle change that uses angle information for seamless reproduction in FIG. 16.

The angle information for seamless reproduction shown in FIG. 16 is information indicative of a destination address to which an angle is changed, as shown in FIG. 19. This information becomes valid only when an angle is changed in a seamless manner, that is, a seamless angle change flag is set to "seamless."

Figure 20:
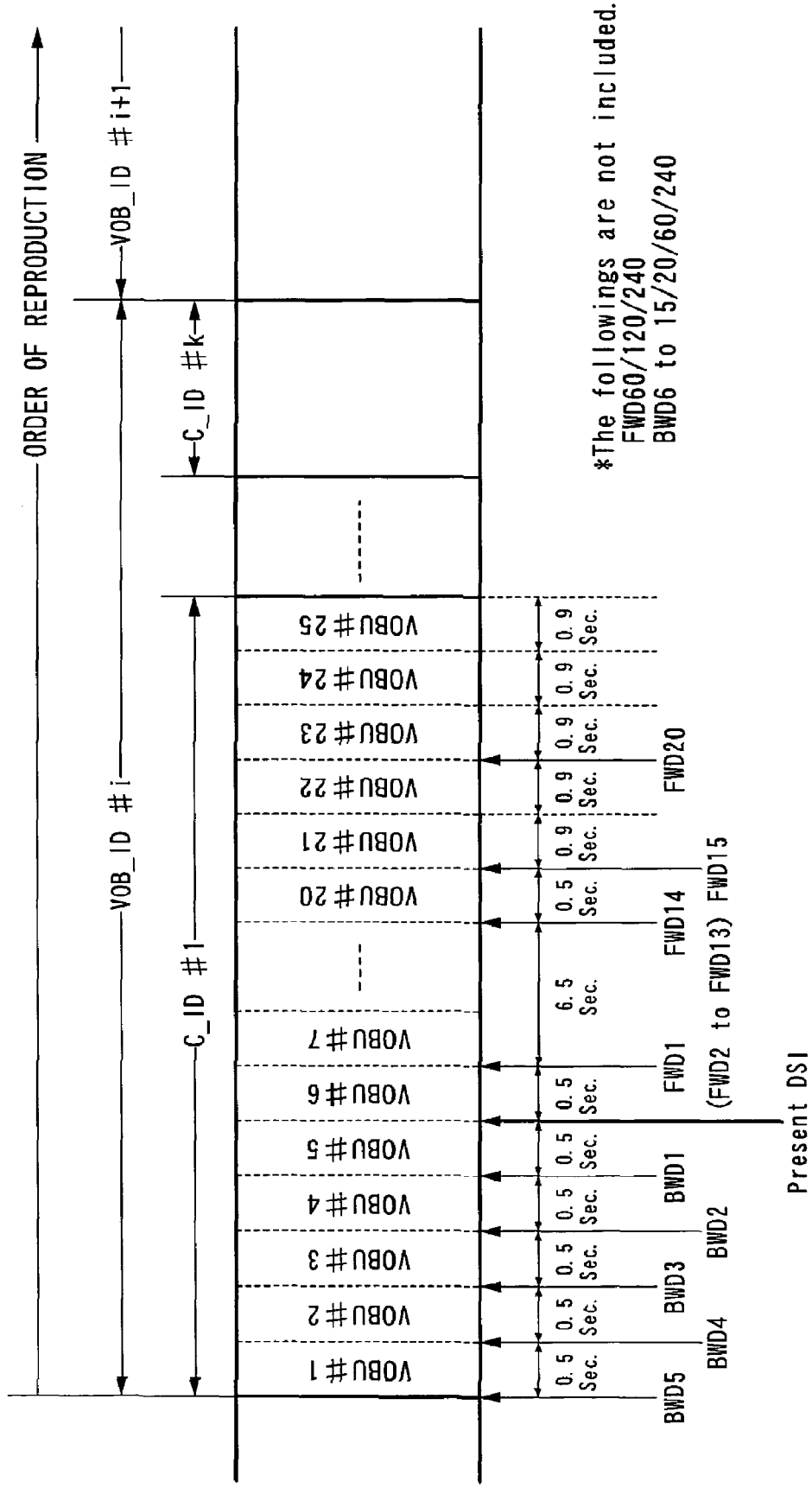
FIG. 20 is a map exemplifying VCB unit (VOBU) search information in FIG. 16.

Furthermore, the VOBU search information (VOBU_SRI) in FIG. 16 can be expressed with cells illustrated in FIG. 20. In each cell in FIG. 20, described is the lead-off address of VOBUs reproduced during a period of 0.5×n seconds just before and after a reproduction start time instant of a VOBU including the present DSI to be concerned. This VOBU search information is valid in only this single cell. This VOBU search information, which is detailed in FIG. 21, is composed of:
- a "lead-off address of the next VOBU having video data" of 4 bytes (FWDI Video),
- a "lead-ff address of +240 VOBU and video-existence indicating flag" of 4 bytes (FWDI 240),
- a "lead-ff address of +120 VOBU and video-existence indicating flag" of 4 bytes (FWDI 120),
- a "lead-ff address of +60 VOBU and video-existence indicating flag" of 4 bytes (FWDI 60),
- a "lead-ff address of +20 VOBU and video-existence indicating flag" of 4 bytes (FWDI 20),
- a "lead-ff address of +15 VOBU and video-existence indicating flag" of 4 bytes (FWDI 15),
- a "lead-ff address of +14 VOBU and video-existence indicating flag" of 4 bytes (FWDI 14),
- a "lead-ff address of +13 VOBU and video-existence indicating flag" of 4 bytes (FWDI 13),
- a "lead-ff address of +12 VOBU and video-existence indicating flag" of 4 bytes (FWDI 12),
- a "lead-ff address of +11 VOBU and video-existence indicating flag" of 4 bytes (FWDI 11),
- a "lead-ff address of +10 VOBU and video-existence indicating flag" of 4 bytes (FWDI 10),
- a "lead-ff address of +9 VOBU and video-existence indicating flag" of 4 bytes (FWDI 9),
- a "lead-ff address of +8 VOBU and video-existence indicating flag" of 4 bytes (FWDI 8),
- a "lead-ff address of +7 VOBU and video-existence indicating flag" of 4 bytes (FWDI 7),
- a "lead-ff address of +6 VOBU and video-existence indicating flag" of 4 bytes (FWDI 6),
- a "lead-ff address of +5 VOBU and video-existence indicating flag" of 4 bytes (FWDI),
- a "lead-ff address of +4 VOBU and video-existence indicating flag" of 4 bytes (FWDI 4),
- a "lead-ff address of +3 VOBU and video-existence indicating flag" of 4 bytes (FWDI 3),
- a "lead-ff address of +2 VOBU and video-existence indicating flag" of 4 bytes (FWDI 2),
- a "lead-ff address of +1 VOBU and video-existence indicating flag" of 4 bytes (FWDI 1),
- a "lead-ff address of the next VOBU and video-existence indicating flag" of 4 bytes (FWDI Next),
- a "lead-ff address of the previous VOBU and video-existence indicating flag" of 4 bytes (FWDI Prev),
- a "lead-ff address of −1 VOBU and video-existence indicating flag" of 4 bytes (BWDI 1),
- a "lead-ff address of −2 VOBU and video-existence indicating flag" of 4 bytes (BWDI 2),
- a "lead-ff address of −3 VOBU and video-existence indicating flag" of 4 bytes (BWDI 3),
- a "lead-ff address of −4 VOBU and video-existence indicating flag" of 4 bytes (BWDI 4),
- a "lead-ff address of −5 VOBU and video-existence indicating flag" of 4 bytes (BWDI 5),
- a "lead-ff address of −6 VOBU and video-existence indicating flag" of 4 bytes (BWDI 6),
- a "lead-ff address of −7 VOBU and video-existence indicating flag" of 4 bytes (BWDI 7),
- a "lead-ff address of −8 VOBU and video-existence indicating flag" of 4 bytes (BWDI 8),
- a "lead-ff address of −9 VOBU and video-existence indicating flag" of 4 bytes (BWDI 9),
- a "lead-ff address of −10 VOBU and video-existence indicating flag" of 4 bytes (BWDI 10),
- a "lead-ff address of −11 VOBU and video-existence indicating flag" of 4 bytes (BWDI 11),
- a "lead-ff address of −12 VOBU and video-existence indicating flag" of 4 bytes (BWDI 12),
- a "lead-ff address of −10 VOBU and video-existence indicating flag" of 4 bytes (BWDI 13),
- a "lead-ff address of −14 VOBU and video-existence indicating flag" of 4 bytes (BWDI 14),
- a "lead-ff address of −15 VOBU and video-existence indicating flag" of 4 bytes (BWDI 15),
- a "lead-ff address of −20 VOBU and video-existence indicating flag" of 4 bytes (BWDI 20),
- a "lead-ff address of −60 VOBU and video-existence indicating flag" of 4 bytes (BWDI 60),
- a "lead-ff address of −120 VOBU and video-existence indicating flag" of 4 bytes (BWDI 120),
- a "lead-ff address of −240 VOBU and video-existence indicating flag" of 4 bytes (BWDI 240), and
- a "lead-off address of the previous VOBU having video data" of 4 bytes (BWDI Video).

The synchronizing information (SYNCI) in FIG. 16 represents pieces of information about the addresses of audio data and sub-picture data which are reproduced in synchronization with video data of a VOBU including the present DSI to be concerned. To be specific, the synchronizing information (SYNCI) is made up of, as detailed in FIG. 22,
- an "address of an audio pack (A_PCK) to be reproduced" of 2 bytes×8 (A_SYNCA 0 to 7) and
- a "lead-off address of VOBU for sub-picture pack (SP_PCK) to be reproduced" of 4 bytes×32 (SP_SYNCA 0 to 31).

Audio Disk According to the First and Second Examples of the First Embodiment An audio disk according to first and second examples of the first embodiment will now be described.

Disk Identifier

A disk identifier adopted by a DVD-Audio according to the first and second examples of the first embodiment, which is based on the DVD formats described in the foregoing first and second references, will now be described.

Figures 22, 23:
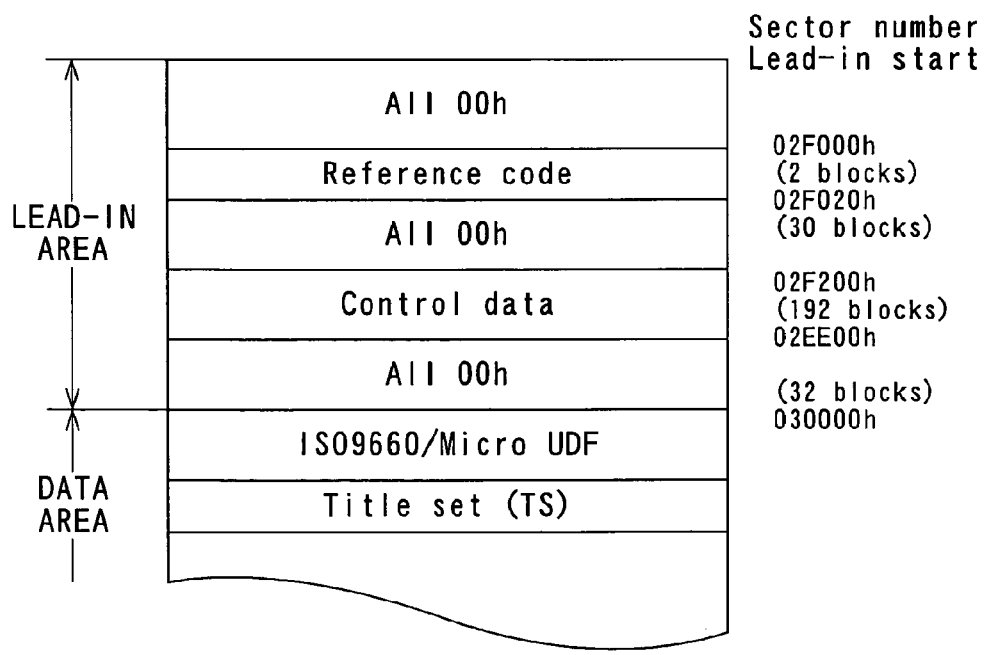
FIG. 22 is a table explaining in detail synchronizing information in FIG. 16.
FIG. 23 is an explanatory diagram showing the configuration of a lead-in area according to the first and second references.

As outlined in FIG. 23, the DVD has a recording area comprising a lead-in area and a data area. Of these, the lead-in area of the DVD is made up of:

a block all filled with 00h, which ranges from a lead-in start sector to a sector located just before a sector number "02F000h,"

a reference code block of two blocks, which ranges from the sector of number "02F000h" to a sector located just before a sector number "02F020h,"

a block area of 30 blocks all filled with 00h, which ranges from the sector of number "02F020h" to a sector located just before a sector number "02F200h,"

a control data block of 192 blocks, which ranges from the sector of number "02F200h" to a sector located just before a sector number "02FE00h," and a block area of 32 blocks all filled with 00h, which ranges from the sector of number "02FE00h" to a sector located just before a sector number "030000h."

In addition, in a data area starting the sector whose sector number is "030000h," data based on ISO9660 and micro UDF (universal disk format) are recorded from the head thereof, which is successively followed by recording of audio title sets (TS), video TS, computer TS, and others.

Figure 24:
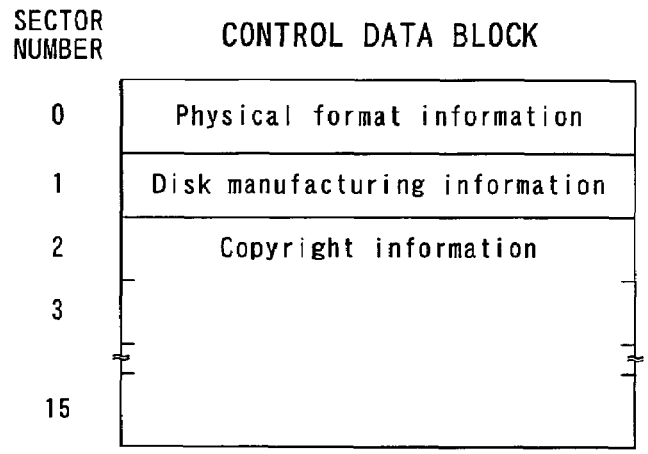
FIG. 24 shows in detail a control data block in FIG. 23.
Figure 25:
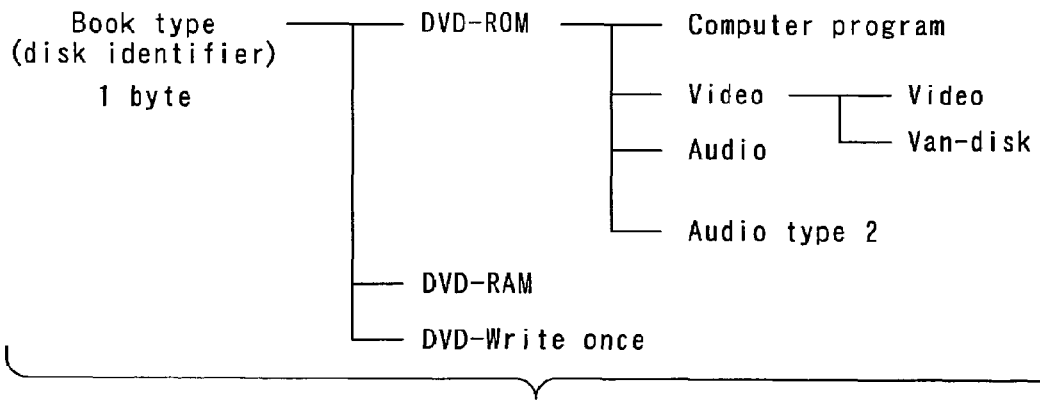
FIG. 25 is a table that details physical format information in FIG. 24.

In the foregoing lead-in area, the control data block is formed, as illustrated in FIG. 24, to comprise a sector for physical format information and a sector for disk manufacturing information, and a sector for copyright information. Of these the physical format information sector is formed, as illustrated in FIG. 25, to have an area for book type and part version, an area for disk size and minimum lead-out rate, an area for disk structures, an area for recoding density, and an area for data area allocation.

The book-type and part-version area is in charge of serving as a disk identifier and its high-order bits are described to indicate that this is a "DVD-ROM disk,"
this is a "DVD-RAM disk," or
this is a "DVD-Write Once disk."

In cases where the high-order bits indicate a "DVD-ROM disk," its low-order bits are described to indicate that this is a "computer program disk,"
this is a "pure video disk,"
this is a "video and audio navigation disk (Van-disk),"
this is an "audio disk," or
this is an "audio disk type 2."

The above term "type 2" just indicates that an audio disk to be identified is produced according to the concept of the present invention.

Accordingly, in the book-type and part-version area on the disk according to the foregoing first reference, the disk identifier to indicate "DVD-ROM-Audio disk" is described. Meanwhile in the book-type and part-version area on the disk according to the foregoing second reference, the disk identifier to indicate "DVD-ROM-Van-disk" is described. In addition, though the TOC information, such as rewinding information in relation to pieces of music and movements, is not described in the lead-in area of the "DVD-ROM-Video disk" the TOC information is described in both of the lead-in areas of the "DVD-ROM-Audio disk" according to the first reference and the "DVD-ROM-Van-disk" according to the second reference.

Hence, in the case of the second reference, the number of A-packs is larger than that of V-packs in the VOB units. This means that, if such V-packs are reproduced on the display, resultant images will lead to displaying still images or moving images with fewer motions. On the contrary, the second reference allows the A-packs in the VOB units to be reproduced based on the CONT packs (NV packs) on the DVD-Video specifications. Accordingly, a DVD-Video reproduction apparatus is able to have the responsibility for such reproduction.

By the way, there are several problems arising concerning with the TOC information. First of all, although it is convenient to record audio data into the three layers of titles, tracks, and indices for search and random access, there occurs a problem that handling the TOC information becomes complicated. Secondly, in performing a simplified reproduction based on the TOC information, the reproduction cannot be done, unless some factors such as sampling frequency of audio data are found. Third, in that case that the TOC information is recorded in the lead-in area employed by DVD-Video disks, both of the compatibility with DVD-Video disks in relation to the TOC information and the convenience in access to the TOC information should be taken into account. Neglecting such a factor will raise an obstacle against popularization of the disks.

To eliminate the above problems, the TOC information is configured such that it is mapped in the order of the titles track by track. This mapping enables an efficient data management. An additional countermeasure is that the TOC information includes a sampling frequency and a quantization bit rate of audio data for each track. Hence the TOC information can be used to immediately start reproduction if the reproduction is desired to be conducted in a simplified way.

The TOC information is also described in an empty area (a reserved area) of the copyright information area of the control data block in the lead-in area adopted by the DVD-Video disk.

As shown in FIG. 24, the control data block in the lead-in area of the DVD includes the sectors whose numbers are "2" to "15," which are reserved as the sectors for copyright information. Thus, by way of example, the TOC information can be mapped in a reserved area (whose sector numbers are "8" to "15") in the control data block.

FIG. 26 exemplifies the TOC information. The TOC information is referred to as a simple audio play pointer (SAPP) and consists of a simple audio play pointer table information (SAPP TI) of 16 bytes and n-piece simple audio play pointers #1 to #n (SAPP #1 to #n) each having 48 bytes.

The "SAPP TI" is composed of an SAPP TI identifier of 12 bytes, a 2-byte data indicative of the number of SAPPs, and an SAPPTI end address of 2 bytes.

Figure 28:
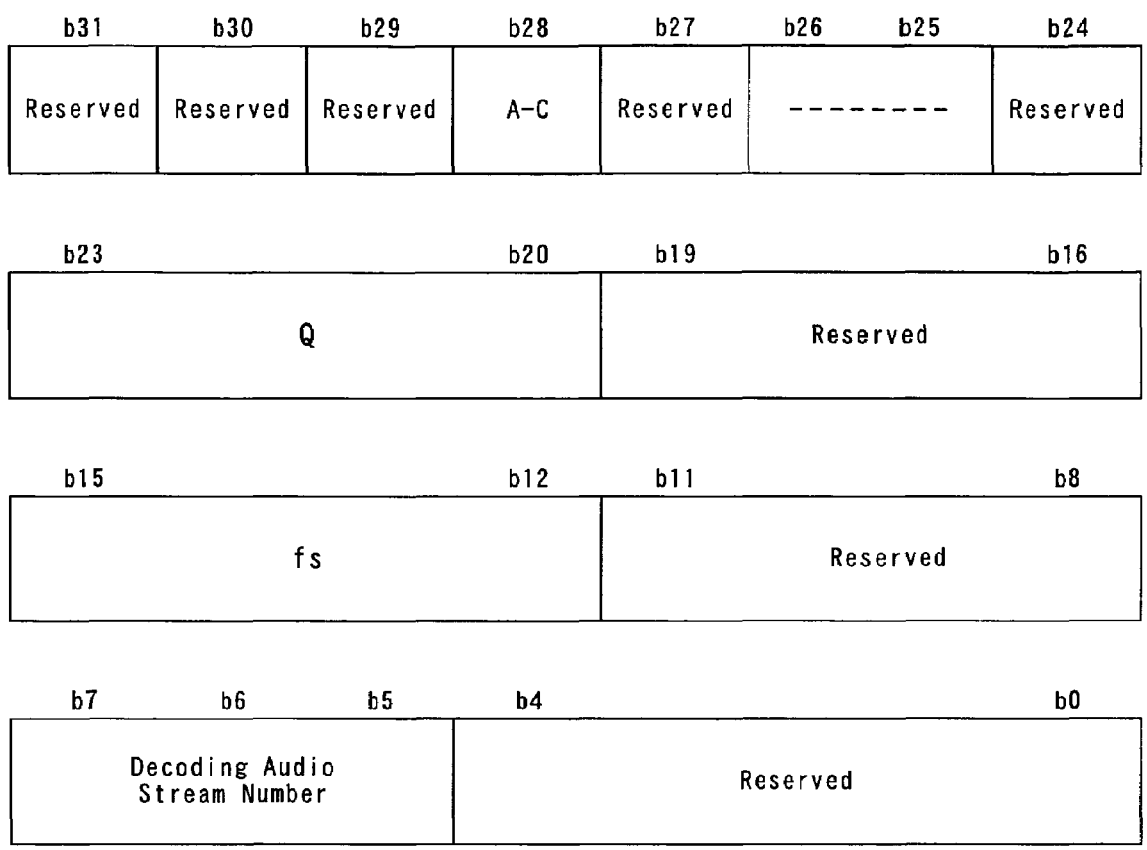
FIG. 28 illustrates in detail attribute information shown in FIG. 27.

Each of the SAPPs #1 to #n, which is composed of data of 48 bytes and arranged corresponding to each of the groups #1 to #n, consists of various data of, as shown in FIG. 27, the number of a SAPP title, which is 1 byte,
the number of a SAPP track, which is 1 byte,
a 4-byte start presentation time of the first cell of a track specified by a SAPP, a 4-byte playback time of a track specified by a SAPP,
a 4-byte pose time of a track specified by a SAPP,
a 4-byte attributes of a track specified by a SAPP (SAPP-ATR), which will be detained in connection with FIG. 28,
a reservation area of 18 bytes,
a 4-byte start address of a track specified by a SAPP,
a 4-byte start address of the first cell of a track specified by a SAPP, and
a 4-byte end address of a track specified by a SAPP.

As track attributes (SAPP-ATR) of the above 4-bytes (32 bits b31 to b0), as shown in FIG. 28, an audio coding A-C of 1 bit is recorded (at the bit b28) such that
 0b: linear PCM audio and
 1b: lossless compressed audio.

The quantization bit number Q is recorded with 4 bits (bits b23 to b20) such that
 0000b: 16 bits,
 0001b: 20 bits,
 0010b: 24 bits, and
 the others: reserved.

The sampling frequency fs is also recorded with 4 bits (bits b15 to b12) such that
 0000b: 48 kHz,
 0001b: 96 kHz,
 0010b: 192 kHz,
 1000b: 44.1 kHz,
 1001b: 88.2 kHz,
 1010b: 176.4 kHz, and
 the others: reserved.

The numbers of the decoding audio streams are recorded with 3 bits (b7 to b5). The SAPP information is recorded together with the album number belonging to individual divided tracks formed by dividing the tracks (movements and pieces of music) into n-pieces.

Copy Limitation

In cases where the pack shown in FIG. 3 is an audio pack (A-pack), its user data area includes management information limiting users from copying the audio data of the A-pack, This management information is directed to the number of permitted copies for users. The number of permitted copies for a user is defined in the same way between the DVD-Audio (i.e., PCM audio data or lossless compressed audio data) and the DVD-Audio type 2 (i.e., later-described compressed audio data (in a compressed audio-directory (CA-D)) or lossy compressed audio data, which is audio data other than the PCM audio data or lossless compressed audio data). As described later, the compressed audio data is recorded in the state of elementary streams, not in the state of audio packs (A-packs), and the number of permitted copies of the compressed audio data is managed with copy control information (management information) consisting of "audio copy permission" and "audio copy number" mapped in compressed audio file information (CAFI).

The user data of each audio pack (A pack) shown in FIG. 3 consists of a packet header (9 to 17 bytes), a private header (14 to 21 bytes) having the above management information, and audio data (1 to 2011 bytes).

When the management information is composed of parameters of "audio_copy-permission" and "audio-copy_number." When "audio_copy_permission" is 00b, copying is permitted without restriction. However, when "audio_copy_permission" is 10b, copying is permitted per "audio_copy_number." "audio_copy_number" describes the number of permitted copies of audio data included in each audio packet per recording device, as specified below.
 000b: Number of permitted copies is "1".
 001b: Number of permitted copies is "2".
 010b: Number of permitted copies is "4".
 011b: Number of permitted copies is "6".
 100b: Number of permitted copies is "8".
 101b: Number of permitted copies is "10".

Every audio packet within the program PG of one piece of music has the same value for "audio_copy_permission."

Audio Disk According to First Example

Figure 29:
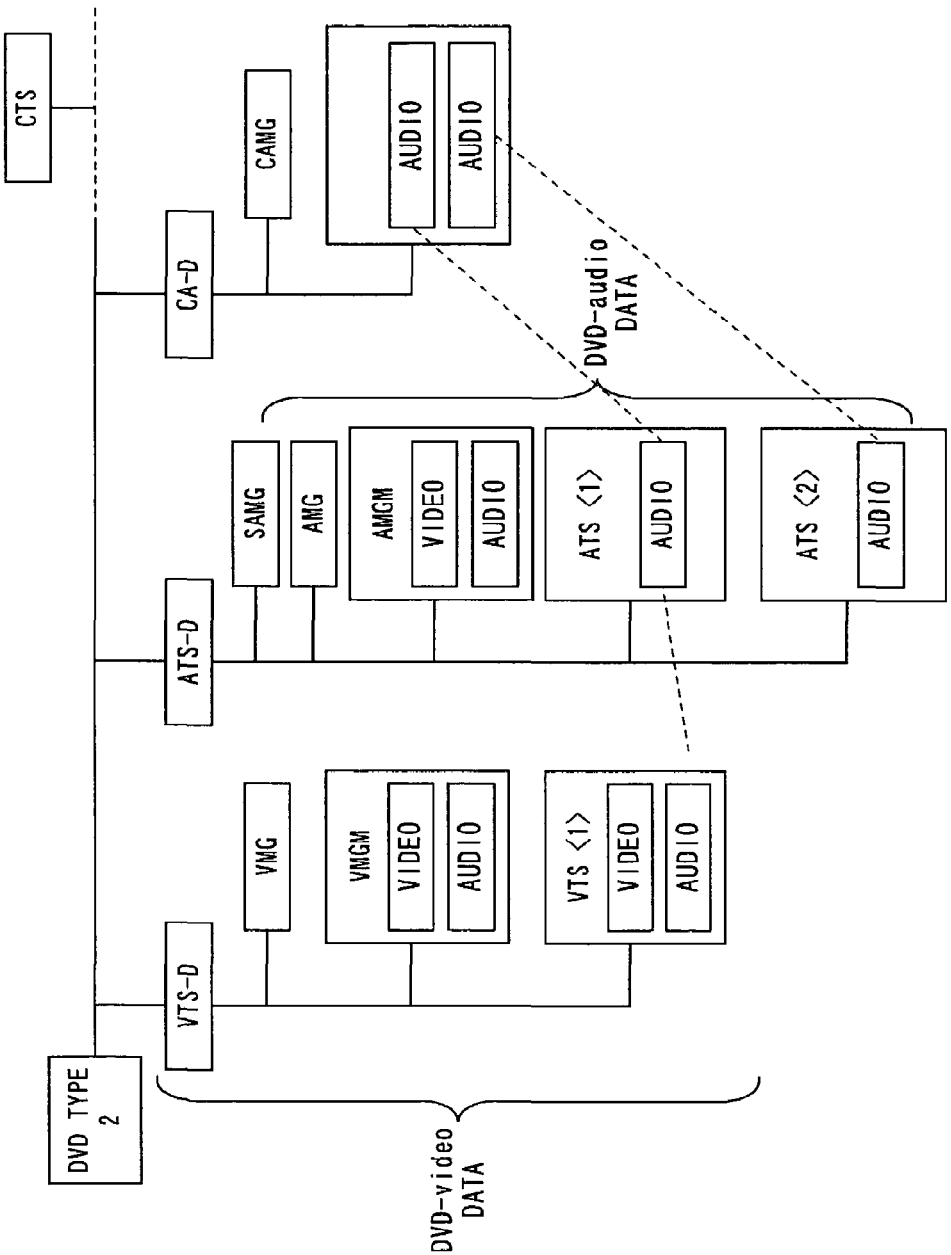
FIG. 29 illustrates the basic format of a disk adopted by the first embodiment of the present invention, the disk being an information recording medium to which the present invention is applied.
Figure 30:
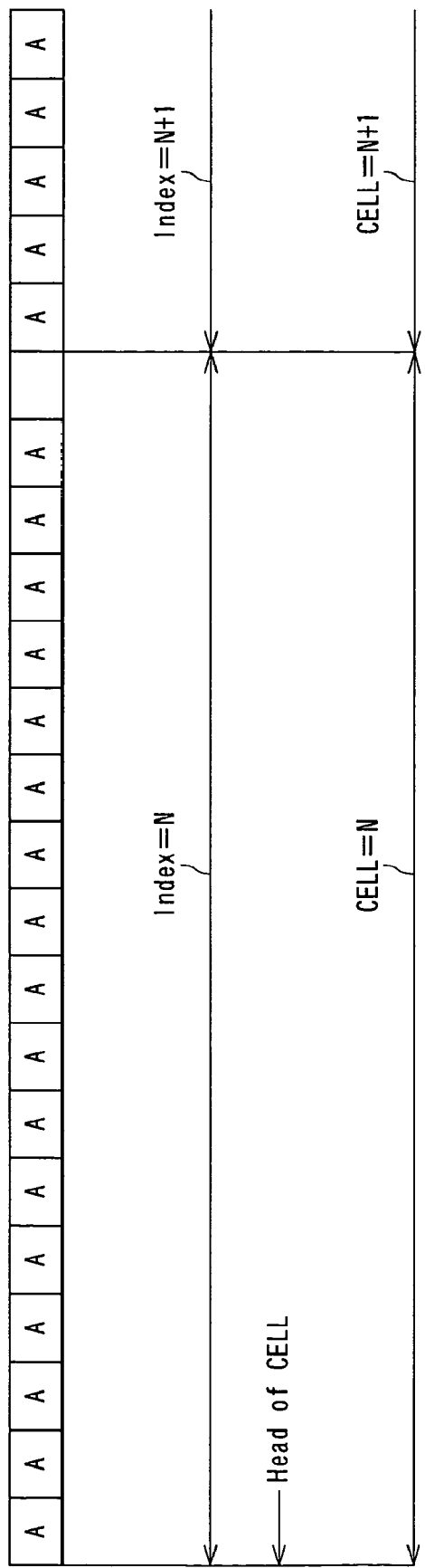
FIG. 30 is an illustration of part of an audio title set (ATS) according to the first embodiment.

Referring to FIGS. 29 and 30, an audio disk according to the first example in the first embodiment will now be detailed.

FIG. 29 shows the format of a disk of "DVD-ROM-audio disk type 2" according to the present invention, where the format is in general composed of video title set-directory (VTS-D) mapped as DVD-Video data, audio title set-directory (ATS-D) mapped as DVD-Audio data, and compressed audio-directory (CA-D) mapped as compressed audio data.

Specifically, the VTSs are composed of the video manager (VMG) shown in FIG. 1A, a video manager menu (VMGM) for video and audio, and a VTS<1> managed by a VGMI (VMG information) within the VMG.

Meanwhile the ATS is composed of the audio manager (AMG) shown in FIG. 1B, an audio manager menu (AMGM) for video and audio, an ATS<1> paired with audio data in the VTS<1> (i.e., the ATS<1> has the same contents as the audio data in the VTS<1>) and managed by an AMGI (AMG information) within the AMG, and an ATS<2> non-paired with audio data in the VTS<1> and managed by the AMGI within the AMG. The ATS<2> is composed of, as shown in FIG. 30, only A-packs, not including the A-CONT pack. The configuration in FIG. 29 may be modified into another one, in which the disk is composed of only the audio title set-directory (ATS-D) and compressed audio-directory (CA-D), with the video title set-directory (VTS-D) eliminated. This modified configuration will be described in a second example employed by the first embodiment. In addition, the audio title set-directory (ATS-D) may include an SPS (still picture set) for still picture data, which will also be described in the second example.

The lead-in area of the disk in this first embodiment is the same in the configuration as that of the second reference, except for that the book type and part version (shown in FIG. 25) includes the description of a disk identifier showing "DVD-ROM-audio disk type 2." Accordingly, this disk has a data format that cannot be reproduced by DVD reproduction apparatuses and requires a dedicated reproduction apparatus to be reproduced. However, this format includes the TOC information recorded therein, so that the disk can be subjected to a simplified reproduction.

In addition, like the foregoing second reference, the present first embodiment adopts the configurations in which the TOC information is mapped in the order of the titles, track by track, so that data can be managed with efficiency. Moreover, in the present first embodiment, the TOC information includes a sampling frequency and a quantization bit rate of audio data for each track. Hence the TOC information can be used to immediately start reproduction if the reproduction is desired to be conducted in a simplified way. Incidentally, in the present first embodiment, the TOC information is recorded as a file, as shown by an SAMG in FIG. 31B.

Though being detailed later, the compressed audio (CA) is composed of a CAMG (Compressed Audio Manager) and audio data corresponding to the audio data of both the ATS<1> and ATS<2>. However, this can be modified such that audio data corresponding to the audio data of the ATS<1> may be omitted from being handled. In other words, it is not always limited to map all compressed audio data corresponding to the audio data held by all the ATSs.

Both of the foregoing video title set-directory (VTS-D) and audio title set-directory (ATS-D) constitute the first audio zone according to the present invention, while the compressed audio-directory (CA-D) constitutes the second audio zone according to the present invention.

Audio Disk According to Second Example

Referring to FIGS. 32 to 48, an audio disk according to the second example employed by the first embodiment will now be detailed.

Figure 32:
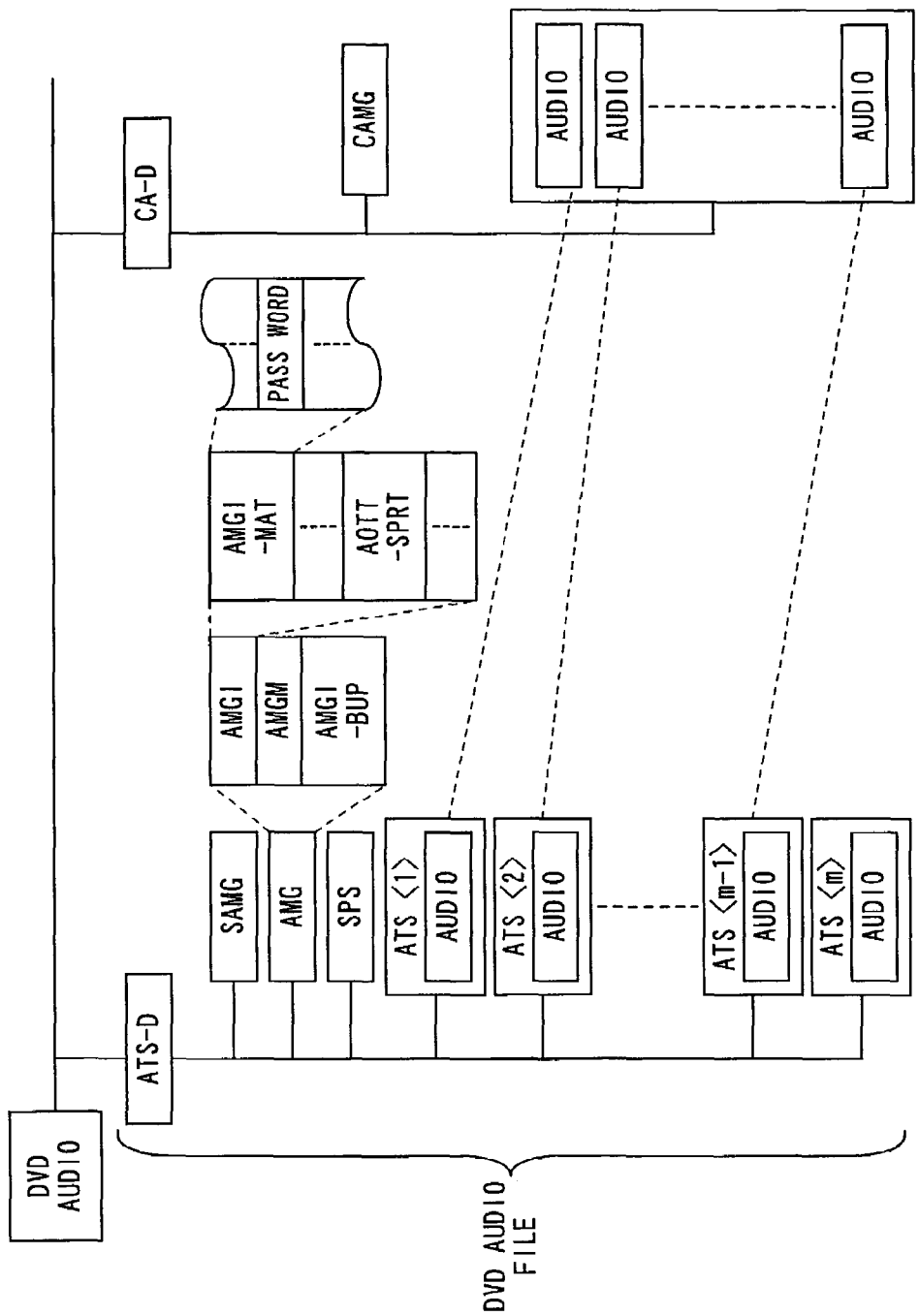
FIG. 32 illustrates the basic format of a disk adopted by the first embodiment of the present invention, the disk being an information recording medium to which the present invention is applied.

FIG. 32 shows the format of a DVD-Audio disk, in which the format is formed to have an ATS-D (Audio Title Set-Directory) under which there are provided an SAMG (Structure of Simple Audio Manager), an AMG (Audio ManaGer), an SPS (Still Picture Set), and a plurality of (m-pieces) ATS<1> to ATS<m> managed by the AMGI in the AMG. The SAMG is a region in which a SAPP table (TOC) is described eight times in a repeated manner for rewinding the ATS<1> to ATS<m>. This region can be defined as a single independent file.

Figures 33, 34:
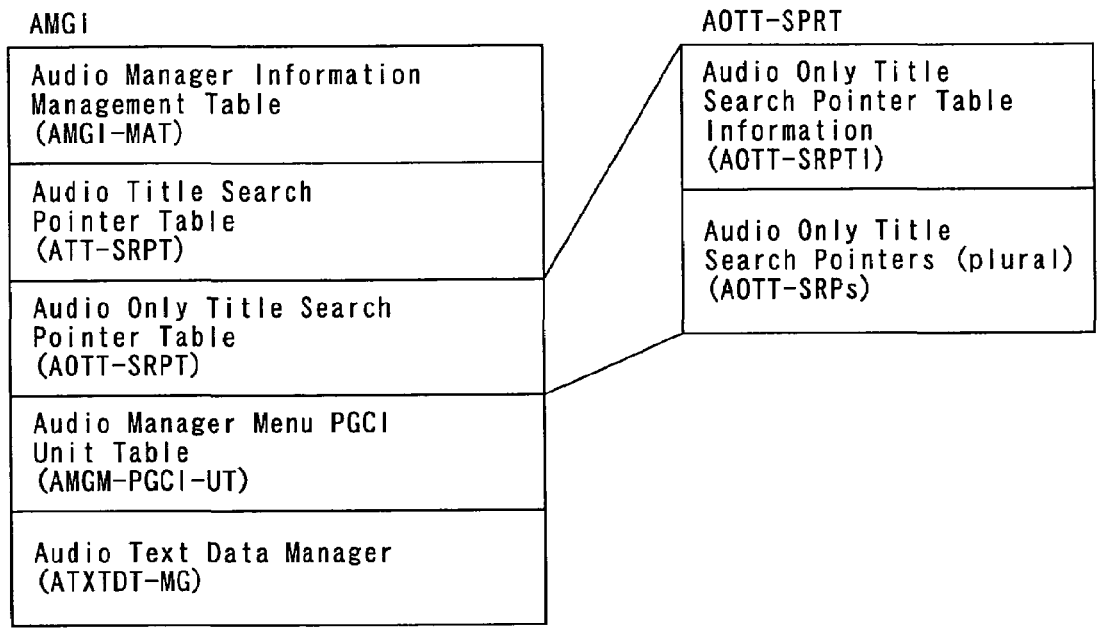
FIG. 33 illustrates in detail the formats of AMGI (audio manager information) and AOTT-SRPT (audio only title search pointer table) in FIG. 32.
FIG. 34 illustrates in detail the format of AOTT-SRPTI (audio only title search pointer table information) in FIG. 33.

The AMG is provided with the AMG information (AMGI), an AMG menu (AMGM), and a backup AMGI-BUP), the AMGI (and AMGI-BUP) including an AMGI management table (AMGI-MAT) detailed in FIG. 33. The AMGI-MAT includes interactive data (password) for accessing bonus information, in which this password is expressed by for example four-digit numerals or characters. The password is set such that a password of "0000" indicates that the bonus information is not stored and passwords other than "0000" indicate that the bonus information is stored (in this case, the passwords are processed as actual passwords). The SPS (Still Picture Set) is provided with data of still images.

The ATS<1> to ATS<m> comprises audio data such as audio of normal pieces of music (hereinafter refereed to as non-bonus music), karaoke music serving as bonus music, and BGM; and data other than audio data, such as superimposed titles in karaoke, MIDI codes, and quiz data. The ATSs can be configured freely by a disk producer, so that the foregoing non-bonus and bonus music can be mapped in any ATSs.

The AMGI is provided with, as shown in FIG. 33,
an audio manager information management table (AMGI-MAT),
an audio title search pointer table (ATT-SRPT),
an audio only title search pointer table (AOTT-SRPT),
an audio manager menu PGCI unit table (AMGM-PGCI-UT), and
an audio text data manager (ATXTDT-MG).
The AOTT-SRPT is provided with, as shown in FIG. 24,
an audio only title search pointer table information (AOTT-SRPTI) and
a plurality of audio only title search pointers (AOTT-SRPs).
Furthermore, the AOTT-SRPTI is composed of, as shown in FIG. 34, data of 4 bytes including
the number of audio only title search pointers (AOTT-SRP-Ns), which occupies 2 bytes, and
an end address of an audio only title search pointer table (AOTT-SRP-EA), which occupies 2 bytes.

Figure 36:
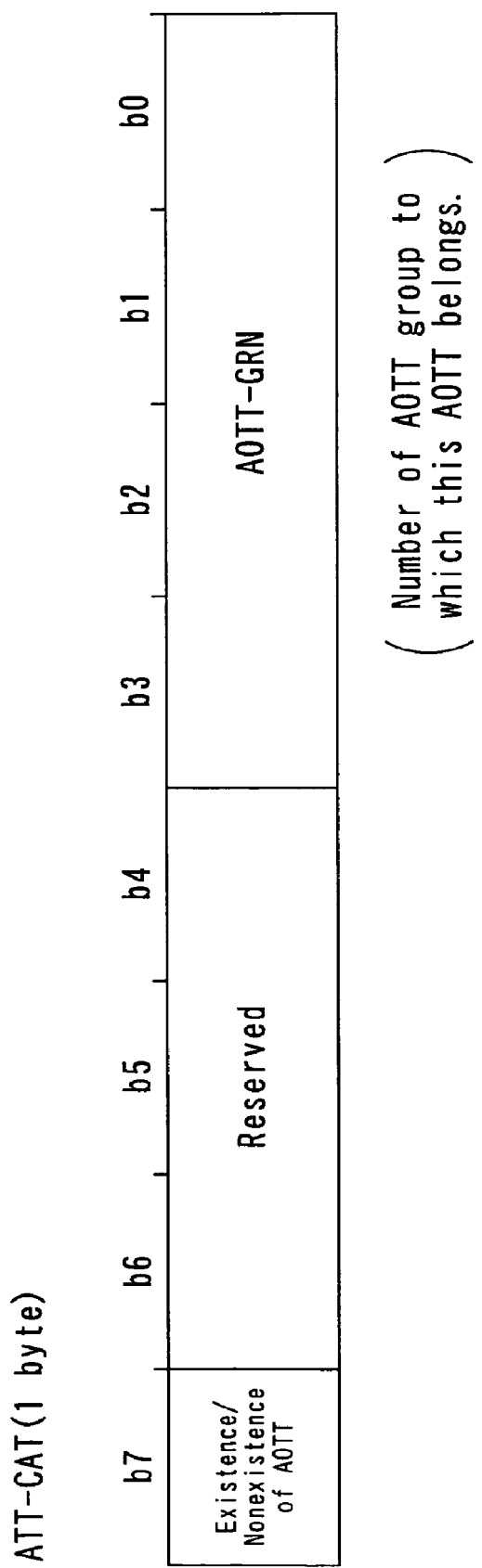
FIG. 36 illustrates in detail the format of ATT-CAT (audio title category) in FIG. 35.

Each of the plural AOTT-SRPs, which are shown in FIG. 33, is composed of 12 bytes as shown in FIG. 35. Each AOTT-SRP comprises
an audio title category of 1 byte (ATT-CAT),
the number of programs in the AOTTs (AOTT-PG-Ns), which occupies 1 byte,
a total playback time over the AOTTs (AOTT-PB-TM) of 4 bytes,
the numbers of the ATSs (ATSN), which occupies 1 byte,
the title numbers of the ATSs (ATS-TTN), which occupies 1 byte, and
a 4-bit start address of the ATSs (ATS-SA).
Moreover, as shown in FIG. 36, the audio title category (ATT-CAT) has
an AOTT existence/non-existence area of 1 bit (b7),
a reservation area of 3 bits (b6 to b4), and
the number of the AOTT group to which the present AOTT belongs, which occupies 4 bits (b3 to b0). In this configuration, the AOTT existence/non-existence bit b7=b0 shows that there are no AOTTs, while the bit b7=1b shows that there are provided AOTTs.

The total playback time over the AOTTs (AOTT-PB-TM) in FIG. 35 describes a total presentation time of the AOTTs (reproduction output time) at per bit (i.e., at per 1/90000 seconds).

Figure 37:
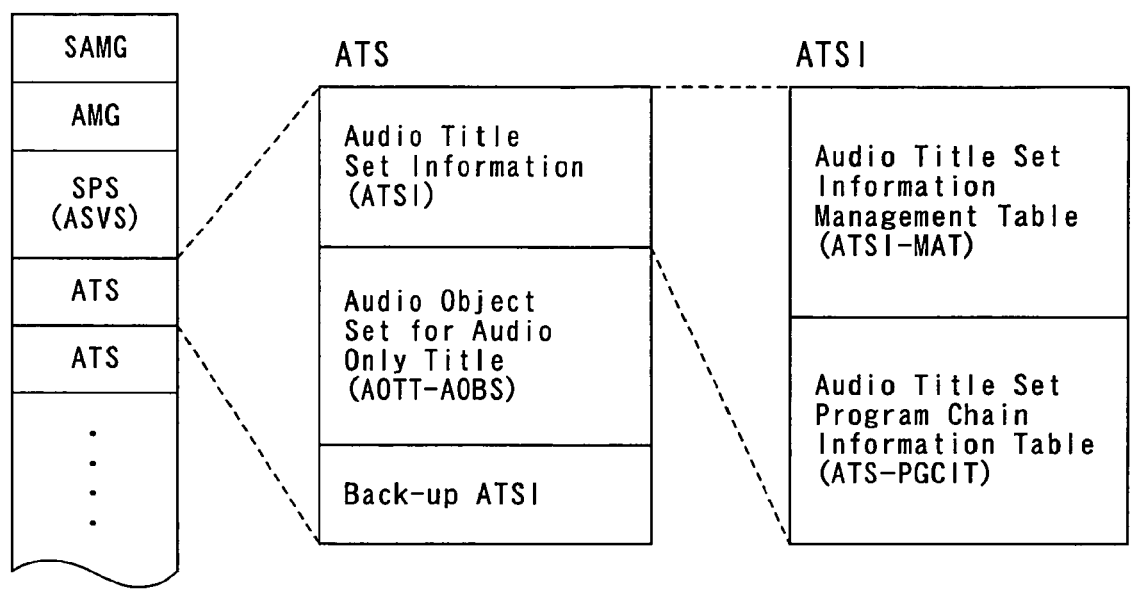
FIG. 37 details the format of both ATS (audio title set) and ATSI (audio title set information) in FIG. 32.

Each of the ATS<1> to ATS<m> in FIG. 32 can be explained in detail as in FIG. 37. That is, from the head of each ATS, there are provided
ATS information (ATSI),
an audio object set for audio only titles (AOTT-AOBS), which will be detailed in FIGS. 38A and 38B, and
a backup ATSI.
The foregoing ATSI is further provided with, from the head thereof, in turn,
an ATSI management table (ATSI-MAT) and
an ATS program chain information table (ATS-PGCIT), which will be detained in connection with FIGS. 39 to FIG. 45.

Figure 38A:
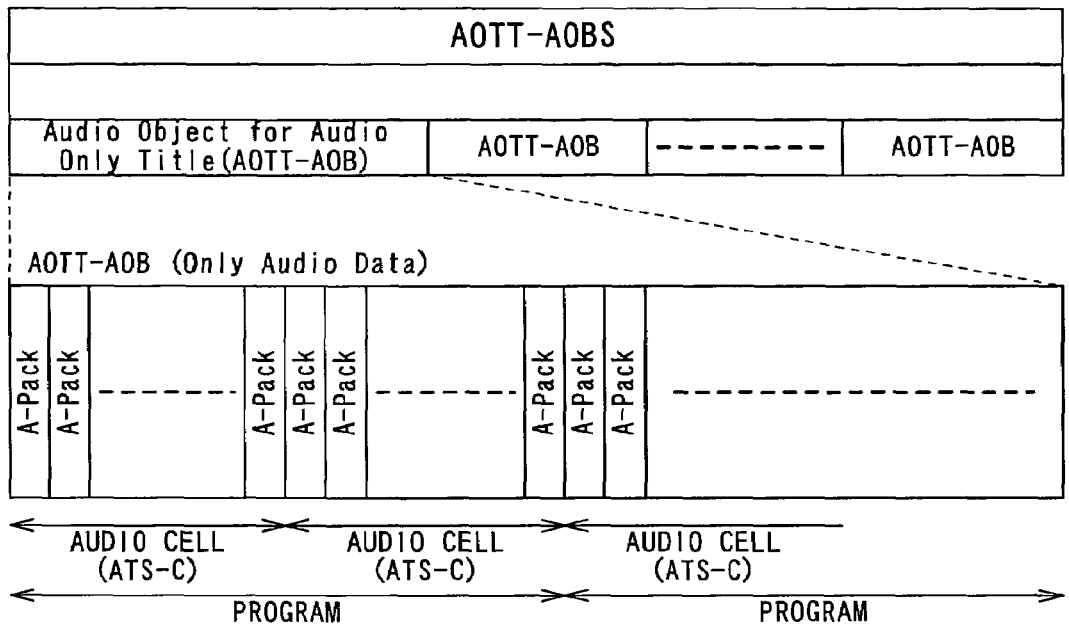
FIGS. 38A and 38B respectively details the format of AOTT-AOBS (audio object set for audio only title) in FIG. 37.
Figure 38B:
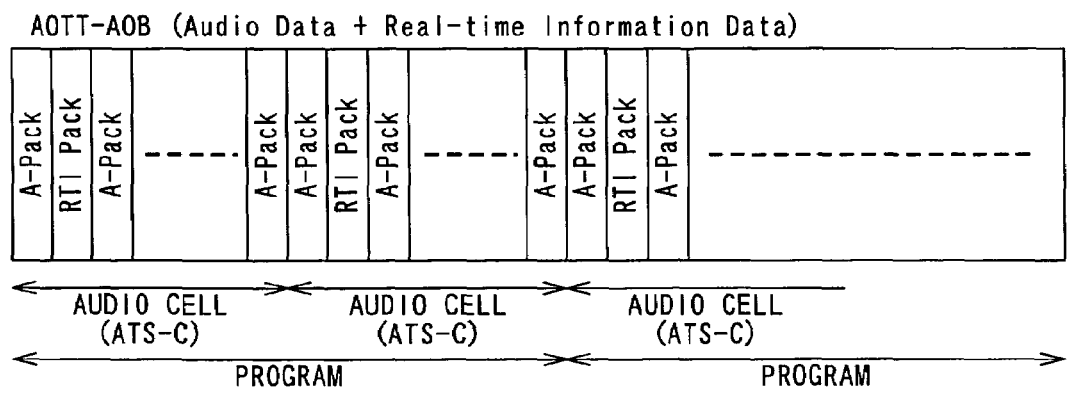

Still further, the AOTT-AOBS in each ATS in FIG. 37 is composed of, as detailed in FIG. 38A, audio objects for a plurality of audio only titles. Each of the AOTT-AOBs is composed of plural programs (PGs) and each program is further composed of plural cells (ATS-Cs) As understood in FIGS. 38A and 38B, the ATT-AOBs are made up of two types of AOTT-AOBs. One type is, as shown in FIG. 38A, configured to have only audio data, while the other type is, as shown in FIG. 38B, configured to have both audio data and real time information data (RTI data). One or more types of AOTT-AOBs are mapped in one disk and/or one piece of music.

Each program in the first AOTT-AOB that has only audio data (as shown in FIG. 38A) consists of a plurality of audio cells (ATS-C), where each audio cell further consists of a plurality of audio packs. By contrast, each programs in the second AOTT-AOB having both of the audio data and the RTI data (as shown in FIG. 38B) also consists of a plurality of audio cells (ATS-C). Each audio cell is composed of an RTI pack placed at the second pack position and plural audio packs placed at the other pack positions.

Figure 39:
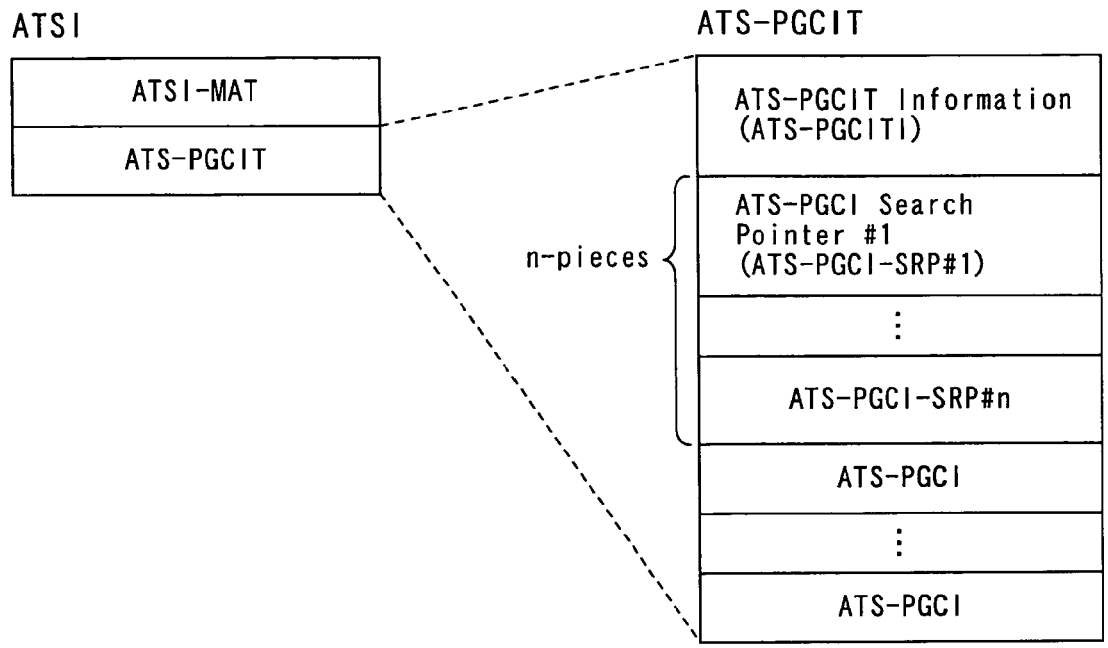
FIG. 39 is an illustration detailing the format of ATS-PGCIT (ATS program chain information table) in FIG. 37.

The ATS-PGCIT (ATS program chain information table) in FIG. 37 can be detailed as in FIG. 39. Concretely, the table consists of
an audio title set PGCI table information (ATS-PGCITI),
n-piece audio title set PGCI search pointers (ATS-PGCI-SRP#1 to #n), and a plurality of ATS-PGCIs which will be detailed in connection with FIG. 40, which are successively mapped from the head of the table.

Figure 40:
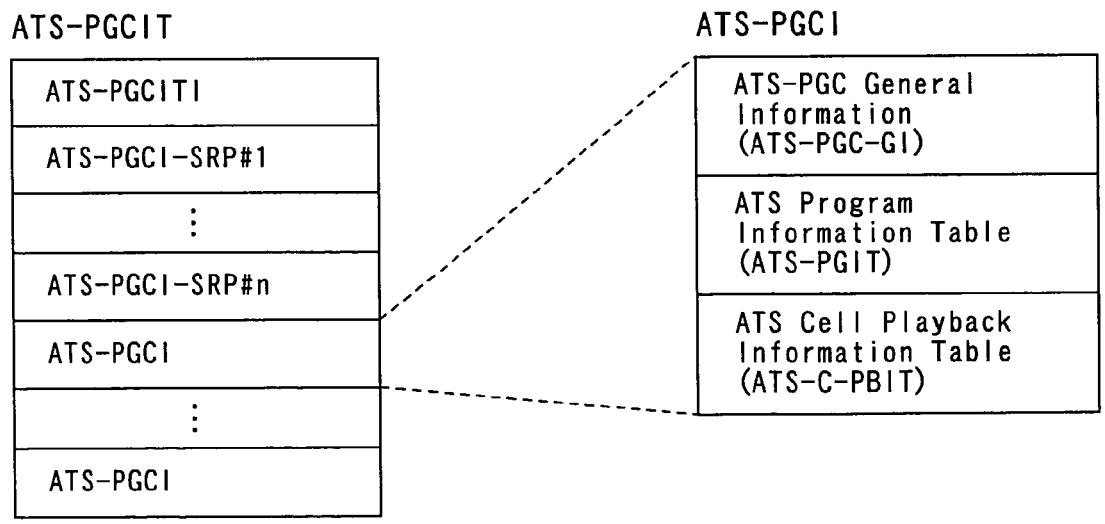
FIG. 40 illustrates in detail the format of ATS-PGCI (ATS program chain information) in FIG. 39.
Figures 41, 42:
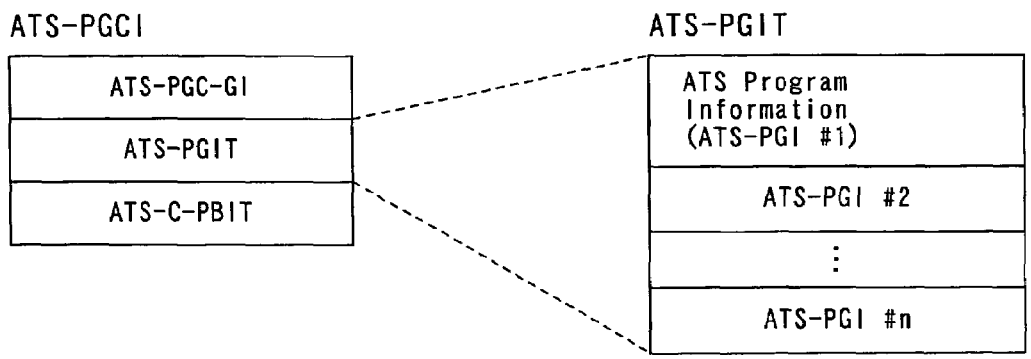
FIG. 41 illustrates in detail the format of ATS-PGC-GI (ATS-PGC general information) in FIG. 40.
FIG. 42 illustrates in detail the format of ATS-PGIT (ATS program information table) in FIG. 40.

As shown in FIG. 40, each ATS-PGCI is composed of, from the head thereof, successively, ATS-PGC general information (ATS-PGC-GI) to be detailed in FIG. 41, an ATS program information table (ATS-PGIT) to be detailed in FIGS. 42 to 45, and an ATS cell playback information table (ATS-C-PBIT).

As shown in FIG. 41, the ATS-PGC-GI is composed of 16-byte data, in which, from the head thereof, there are provided ATS-PGC contents (ATS-PGC-CNT) of 4 bytes (RBP0-3), an ATS-PGC playback time (ATS-PGC-CNT) of 4 bytes (RBP4-7), a reservation area of 2 bytes (RBP8, 9), an ATS-PGIT start address of 2 bytes (RBP10, 11), an ATS-C-PBIT start address of 2 bytes (RBP12, 13), and a reservation area of 2 bytes (RBP14, 15).

The ATS program information table (ATS-PGIT) in FIG. 40 can be detailed as in FIG. 42, in which the table is made up of n-pieces of ATS program information (ATS-PGI) #1-#n. Each of the ATS-PGI #1-#n can be detailed as in FIG. 43, in which each piece of program information is formed into data of 20 bytes (RBP0-19). This 20-byte data consist of, from the head thereof, ATS-PG contents (ATS-PG-CNT) of 4 bytes (RBP0-3), the entry cell number of the ATS-PG, which is 1 byte (RBP4), a reservation area of 1 byte (RBP5), a start presentation time (FAC-S-PTM) of the first audio cell of the ATS-PG, which occupies 4 bytes (RBP6-9), an ATS-PG playback time of 4 bytes (RBP10-13), an ATS-PG pose time of 4 bytes (RBP14-17), a reservation area (for the copyright management data CMI) of 1 byte (RBP18), and a reservation area of 1 byte (RBP19).

The ATS cell playback information table (ATS-C-PBIT) in FIG. 40 can be depicted as in FIG. 44, where this table consists of n-pieces of ATS cell playback information (ATS-C-PBI #1-#n). Each ATS-C-PBI #1 (-#n) can be shown in detail as in FIG. 45 and successively consists of, from the head thereof, an ATS-C index number of 1 byte (RBP0), an ATS-C type (ATS-C-TY) of 1 byte (RBP1), a reservation area of 2 bytes (RBP2, 3), a start address of the ATS-C, which is 4 bytes (R3P4-7), and an end address of the ATS-C, which is 4 bytes (RBP8-11).

Figures 45, 46:
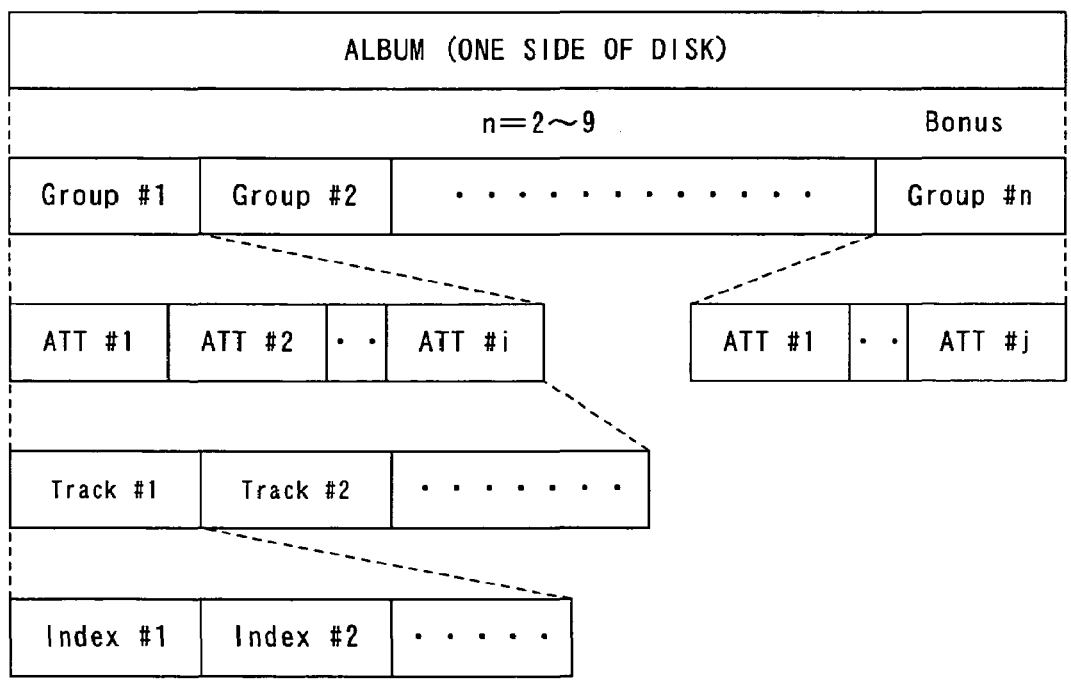
FIG. 45 illustrates in detail the format of ATS-C-PBI (ATS cell playback information) in FIG. 44.
FIG. 46 is an illustration of the structure of data of music, which can be structured for reproduction.

FIG. 46 shows the structure of audio data to be reproduced by a reproduction apparatus (serving as player) on the basis the reproduction control information in both of the foregoing AMGI and ATSI. Specifically, the data structure shown in FIG. 46 constitutes one album and corresponds to all audio data on a one-sided entire surface of a disk. If the disk is a single-sided disk, the data on the disk is formed into the structure shown in FIG. 46. In addition, if the disk is a double-sided disk, the data on either side is formed into the structure shown in FIG. 46. In other words, audio data on the single-sided disk is configured by the one album, whilst audio data on the double-sided disk is configured by the two albums.

One album is composed of nine groups of #1 to #n (hereinafter referred to as title groups). When including pieces of bonus music, the one album is made up of 2-9 title groups. All pieces of bonus music are mapped into the last title group #n. The one title group becomes the unit on which a reproduction apparatus continuously reproduces data.

The one title group also provides the unit on which a reproduction apparatus continuously reproduces a plurality of audio titles (ATT) and includes an arbitrary number of ATTs. The numbers i and j defining the number of ATTs in one title group can be selected freely by a disk manufacture. The ATT#1-ATT#i, ATT#j are included into the ATTs in any of the ATS<1>-ATS<m> shown in FIG. 32 and subjected to search and reproduction which are carried out by a reproduction apparatus based on the reproduction control information in the foregoing AMGI and ATSI.

Each ATT has two types. One type of ATT includes audio data but does not include video data in order to form audio only titles (AOTT). The other type of ATT includes both AOTT and video data, whereby providing an audio video title (AVTT). Incidentally, the ATS of the DVD-Audio disk shown in FIG. 32 includes only the AOTT, while the VTS of the DVD-Audio disk in FIG. 29 includes only one or both of the AVTT and the AOTT.

Figure 47:
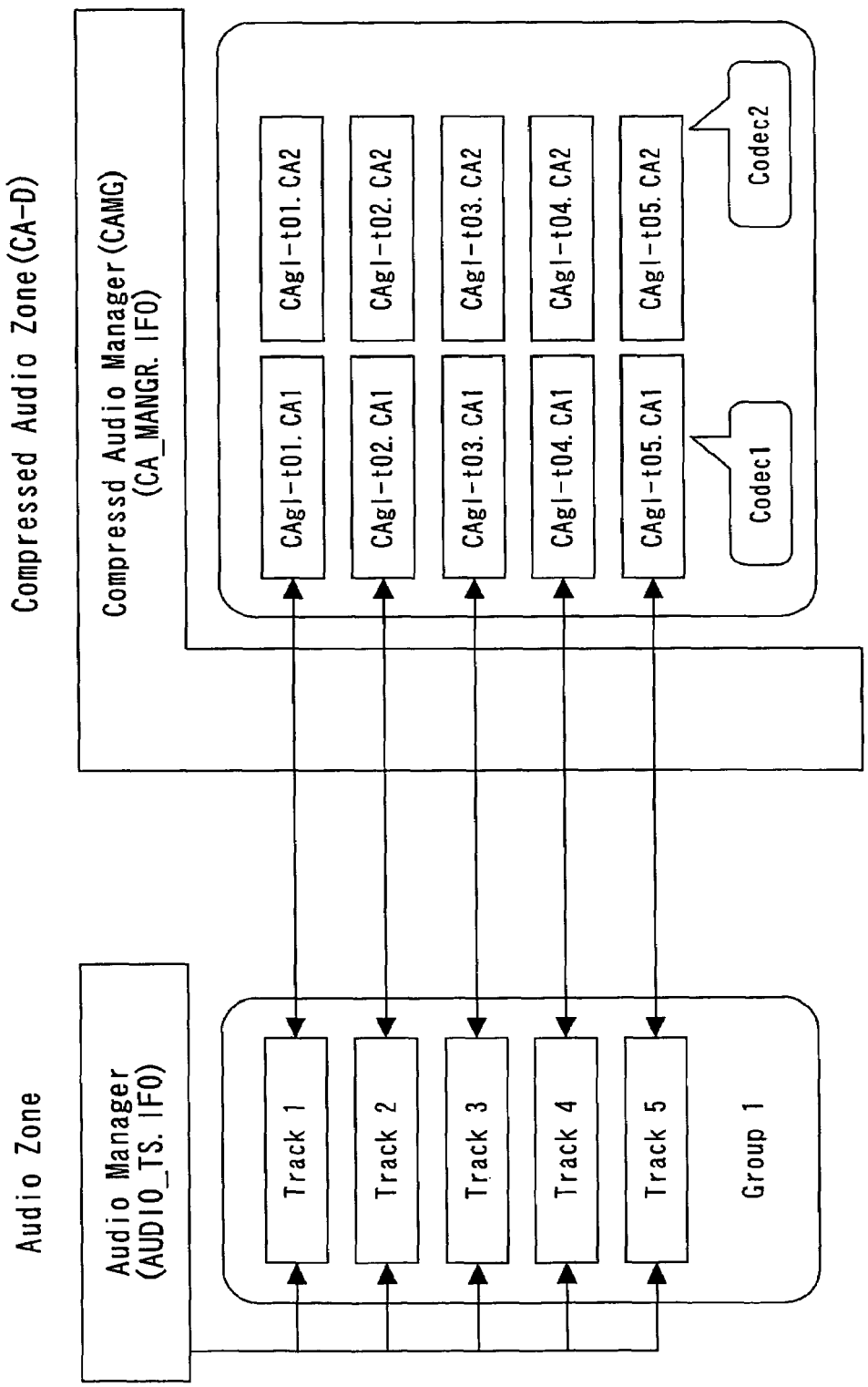
FIG. 47 exemplifies data allocation of a compressed audio zone according to the present invention.

As shown in FIG. 47, audio data of the compressed audio (CA) is provided as stream data for individual codecs corresponding to the tracks of each group (in FIG. 47, only group 1 is depicted). In the track 1, CAg1-t01.CA1 that is a file for the codec 1 and Cag1-t01.CA2 that is a file for the codec 2 are both recorded. Thus, the track 1, that is, each track, is composed of a combined set of files of Cag1-t01.CA1 and Cag1-t01.CA2.

The similar manner can be applied to the remaining tracks 2-5. That is, CAg1-t02.CA1 that is a file for the codec 1 and CAg1-t02.CA2 that is a file for the codec 2 are both recorded in the track 2. CAg1-t03.CA1 that is a file for the codec 1 and CAg1-t03.CA2 that is a file for the codec 2 are both recorded in the track 3. CAg1-t04.CA1 that is a file for the codec 1 and CAg1-t04.CA2 that is a file for the codec 2 are both recorded in the track 4. CAg1-t05.CA1 that is a file for the codec 1 and CAg1-t05.CA2 that is a file for the codec 2 are both recorded in the track 5.

The type of the codec can be chosen from a group of Dolby AC3, MPEG-1 or MPEG-2 (with no extension), MPEG-2 (with extension), DTS, MP3, mp3PRO, and ATRAC3.

The present first embodiment explains the configuration of using two codecs, but this is not a definitive list. The number of codecs recordable on each track is 1 to N (N: an integer whose maximum is 7), so that the codecs can be selected an arbitrary specified number for use in the CA.

Figure 48A:
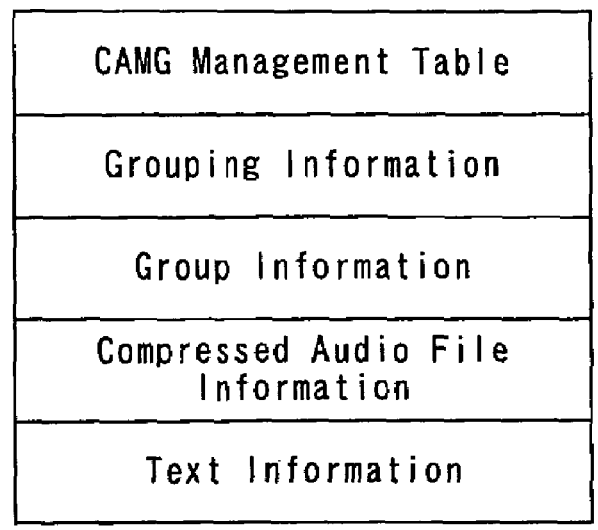
FIGS. 48A and 48B respectively explain data allocation of a ROM audio manager in FIG. 47.

The CAMG (Compressed Audio Manager: CA_MANGR.IFO) is shown in FIG. 48A in terms of its practical data structure. The CAMG structure of the compressed audio (CA) is composed of, as shown in FIG. 48A, a CAMG management table (CAMG-MAT), group link information (GRLI), group information (GRI), compressed audio file information (CAFI), and text information (CATXTI).

The CAMG management table (CAMG-MAT) consists of a CAMG-MAT identifier, a piece of information concerning a disk name, a piece of information concerning a way for copy protection (CPSI), a password (HGR_INF), information concerning character set codes of text information, and a reservation area. As to the password, the same one as in FIG. 32 is mapped. As to the character set codes of the text information, it is possible to select, from a plurality of codes, two character set codes at most. The above codes can be exemplified as below:

(i) ISO/IEC646:1983
(ii) IS08859-1:1987
(iii) KSC5601-1987
(iv) KSC5700-1995
(v) MS-JIS
(vi) Big5
(vii) GB2312

The group link information (GRLI) is made up of information showing the group of compressed audio files (group#1 to #n). As a modification, this grouping can be done in the same way as the title groups in FIG. 46. The group information (GRI) consists of the number of tracks in each group, a playback time for each group, and a reservation area Furthermore, the compressed audio file information (CAFI) is made up of file names, audio attributes, copy control information, UPC/EAN (Universal Product Code/European Article Number), and ISRC (International Standard Recording Code).

As shown in FIG. 47, the file names are given extensions such as ". CA1" and ".CA2", whereby a reproduction apparatus is able to distinguish differences in the same pieces of music by using the mutually different extensions.

The audio attributes are composed of a sampling frequency (4 bits) (0000b: 48 kHz, 0001b: 96 kHz, 0010b 192 kHz, 1000b: 44.1 kHz, 1001b: 88.2 kHz, 1010b: 176.4 kHz, and others; reserved), channel information (4 bits) (0000b: 1 ch (monaural), 0001b: 2 ch (stereo), 0000b: 3 ch, 0011b: 4 ch, 0100b: 5 ch, 0101b: 6 ch, others; reserved), and a reservation area.

Each of the UPC/EAN and ISRC is composed of UPC/EAN codes (56 bits) each corresponding to the individual files, ISRC codes (72 bits), information indicative of validity for the UPC/EAN and ISRC (4 bits). In addition, the text information (CATXTI) is composed of texts in relation to at least one of a disk name, group names, and track names, and each piece of the text information is made up of a title (music name) (64 bytes), an artist name (64 bytes), and a reservation area (128 bytes).

Mapping the various parameters as described above allows the compressed audio manager (CAMG) to be taken into consideration when a reproduction operation is performed. Hence compressed audio data can be selected corresponding to the same piece of music (i.e., the same track) as the ATS to be taken into account.

Figure 48B:
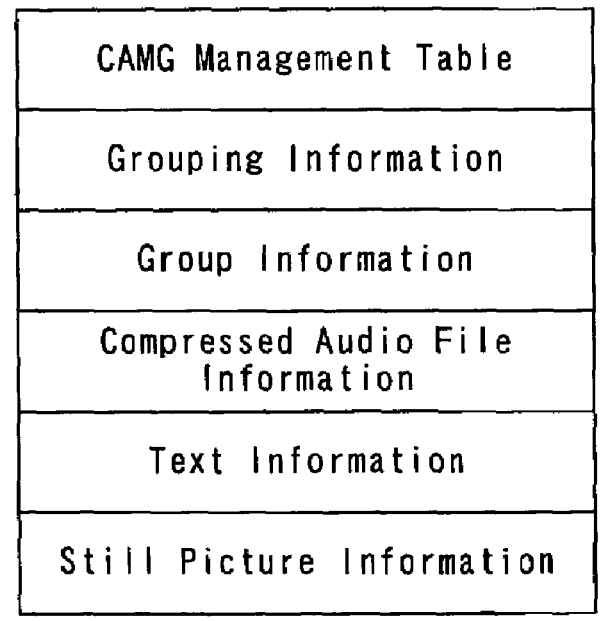

Further, as shown in FIG. 48B, the information indicative of a still picture (SPINF) to each track can be mapped. It is therefore possible to read out both audio data and still picture data at the same time.

Encoder in the First Embodiment

Figure 49:
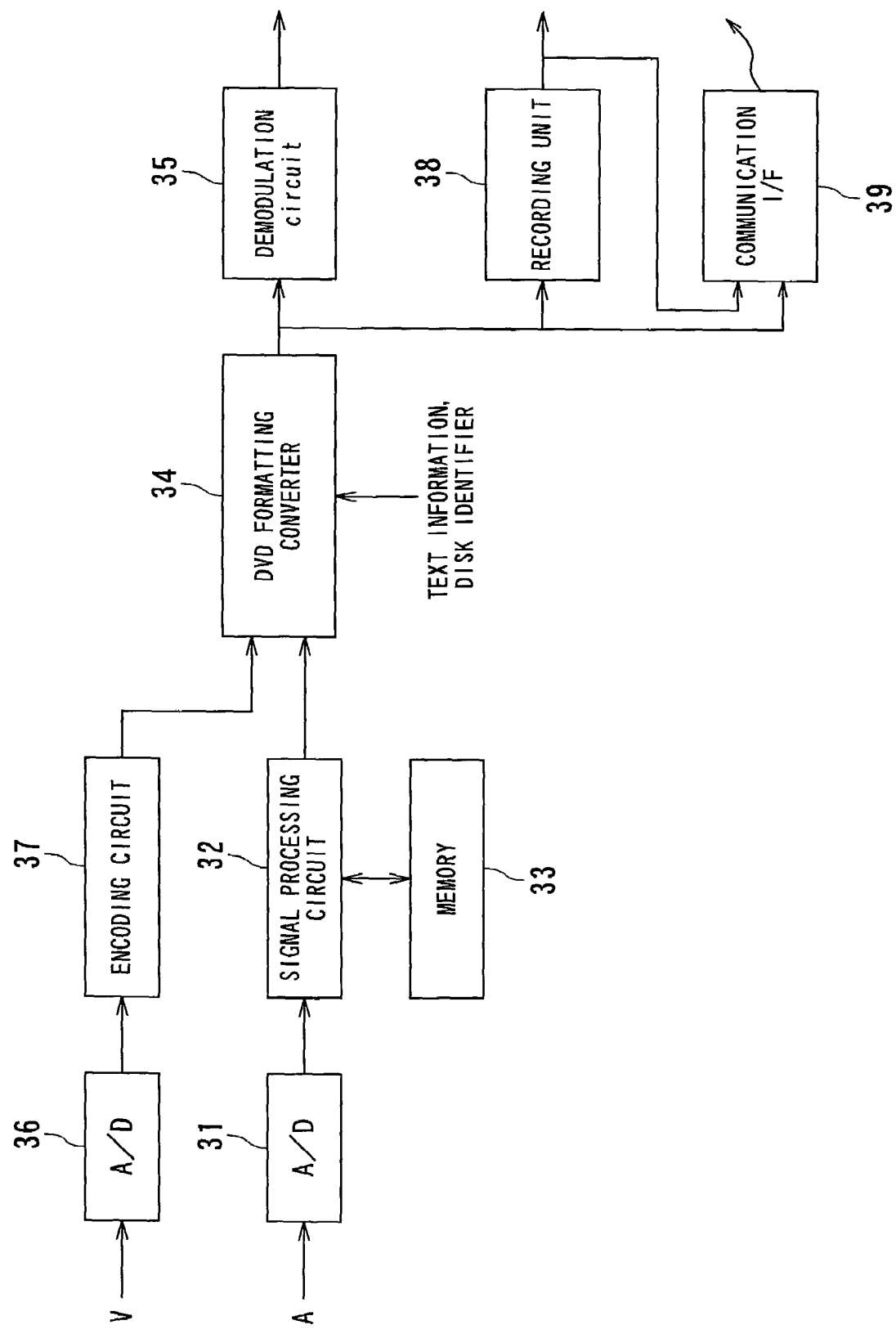
FIG. 49 is a block diagram showing an encoder for an audio disk.

With reference to FIG. 49, an encoder which can be employed in the first embodiment will now be detailed.

The encoder shown in FIG. 49 is provided with both a first A/D converter 36 receiving video signals V and a second A/D converter 31 receiving audio signals A. Moreover, the encoder a video encoding circuit 37 connected to the output of the first A/D converter 36, a signal processing circuit 32 connected to the output of the second A/D converter 31, and a memory 33 functioning as data memorizing means for the signal processing circuit 33. The outputs of both the encoding circuit 37 for video signals and the signal processing circuit 32 are coupled with a DVD formatting converter 34, of which outputs are connected, as mutually parallel paths, to a demodulation circuit 35, recording unit 34, and communication interface (I/F) 39. The modulation circuit 35 applies, to the formatted audio data, modulation based on an EFM (Eight to Fourteen Modulation) or an EFM plus modulation. These components 34, 35, 38 and 39 also compose part of the encoder.

In the encoder shown in FIG. 49, monaural-channel or multiple-channel analogue audio signals "A" are fed to the second A/D converter 31, where the signals are sampled at a sufficiently high sampling frequency (a sampling period of $\Delta t$) (e.g., 192 kHz) so that the signals are concerted to PCM signals (linear PCM signals) of high resolution, for example, 24 bits. Hence a row of data xi of high resolution is produced.

The produced data row "xi" is then subjected to processing carried out by the signal processing circuit 32 connected to the memory 33, thereby being encoded into user data shown in FIG. 3. Specifically, the signal processing circuit 32 calculates linear predictive coefficients to obtain, frame by frame, the-lead-off sample signal from the data row "xi." The circuit 32 then produces a predictive residual data row "$\Delta \times pi$" calculated with the data row xi, thereby a lossless compressed signal being provided.

The predictive residual data row $\Delta \times pi$ is for example 24-bit or less data. The number of bits may be fixed or variable.

In the signal processing circuit 32, both of the lead-off sample data and the predictive residual data row $\Delta \times pi$ are packed, together with data indicative of the prediction technique, into the user data shown in FIG. 3 (1 packet=2034 bytes), and the packed resultant data is then fed to the DVD formatting unit 34. A modification is such that the linear PCM signal is directly packed into the user data, without being subjected to such lossless compression (1 packet=2034 bytes) and the resultant user data is fed to the DVD) formatting unit 34.

On the other hand, video signals "V" are fed to the first A/D converter 36 to be converted into corresponding digital signals, The converted digital video signals are given to the encoding circuit 37, where the signals are encoded on the MPEG (Motion Picture Experts group) format. In the encoding circuit 37, the encoded digital video signals are then packed into the user data, before being sent to the DVD formatting unit 34.

Figure 50:
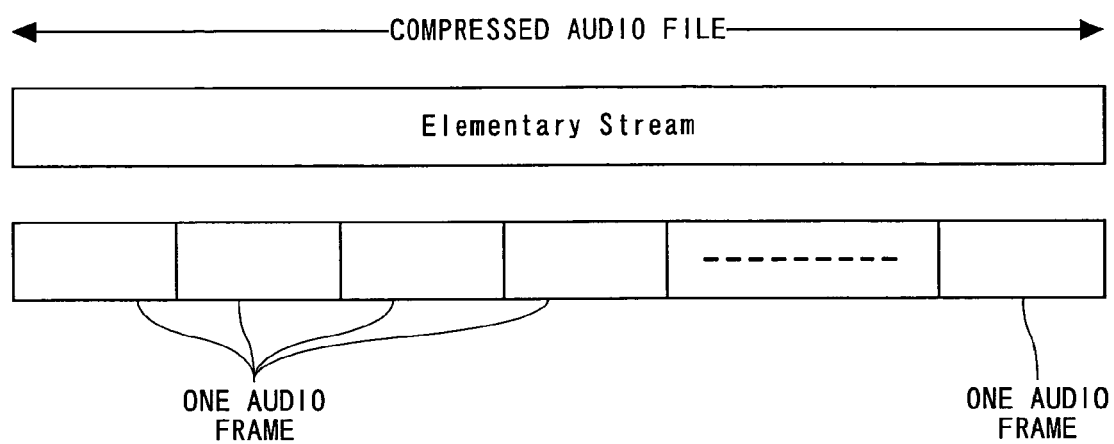
FIG. 50 explains streams in which compressed data is contained.

In the DVD formatting unit 34, the user data is packed into data based on the "DVD-ROM-audio disk" according to the first reference, the "DVD-ROM-Van-disk" according to the second reference, or the "DVD-ROM-audio disk type 2" according to the first example of the first embodiment. Meanwhile, musical compositions are subjected to compression on an audio coding mode for compressed audio, whereby the musical compositions are formatted into stream data (elementary stream data) that are continuous among audio frames, as shown in FIG. 50. As a result, compressed audio files CAF can be obtained Different sampling frequencies give various frame rates to the audio frames, which are as below. A sampling frequency of 48 kHz provides a frame rate of $1/1200$ seconds, a sampling frequency of 96 kHz provides a frame rate of $1/1200$ seconds, a sampling frequency of 192 kHz provides a frame rate of $1/1200$ seconds, a sampling frequency of 44.1 kez provides a frame rate of $1/1102.5$ seconds, a sampling frequency of 88.2 kHz provides a frame rate of $1/1102.5$ seconds, and a sampling frequency of 176.4 kHz provides a frame rate of $1/1102.5$ seconds.

In the DVD formatting unit 34, the management tables such as the CAMG management table (CAMG-MAT), group link information (GRLI), and group information (GRI) are produced. Moreover, as the need arises, the text information concerning audio data (disk names, group names, and track names) are produced.

The packed data, stream data, and management tables are fed to the modulation circuit 35, where those data are modulated on a specified modulation technique based on the type of a disk. The resultant modulation data are then used to manufacture disks.

Reproduction Apparatus in the First Embodiment Referring to FIG. 51A, a reproduction apparatus, such as audio player, applicable to the first embodiment will now be described.

The reproduction apparatus is able to reproduce audio data recorded on an audio disk DK serving as the DVD-Audio according to the present invention. The audio disk DK is loaded in a disk drive 66. As shown in FIG. 51A, this reproduction apparatus is provided with, in addition to the disk drive 66, a drive controller 67, display 61, operation device 62, controller 63, demodulation circuit 41, DVD decoding circuit 42, signal processing circuit 67, memory 44, LPF (low-pass filter) 56, and D/A converter 45.

Of these, the drive controller 67 is configured to operate in response to a control signal given from a controller 63 to control the operations of the disk drive 66. This enables a not-shown optical pickup to read audio signals from a specified position on the audio disk DK.

The demodulation circuit 41 has the configuration for performing EFM (Eight to Fourteen Modulation) demodulation of audio signals read out by the disk drive 66, whereby resultant demodulated signals are sent to the DVD decoding circuit 42. This circuit 42 is configured to apply a specified decoding technique to the demodulated signals, so that the demodulated signals are decoded (i.e., de-formatted), as described later, whereby the decoded audio signals are sent to the signal processing circuit 43. Responsively the signal processing circuit 43 processes the decoded audio signals, as described later. Cooperative operations between the demodulation circuit 42 and the signal processing circuit 43 create audio stream signals. This audio stream signals are provided outward through the LPF for limiting the band of the audio stream signals and a terminal 53. The audio stream signals are processed into analog audio signals by the D/A converter 45 and outputted outward via another terminal 55. The signal processing signal 43 is also capable of not merely providing text data of the stream signals, and its text data can be provided outward via another terminal 64 but also providing the audio stream signals in the form of digital signals via another terminal 65. This terminal can be connected to an external device via IEEE 1394 bus.

A user is able to operate the operation device 62 to give the reproduction apparatus with necessary information for desired reproduction. This operation includes the input operation of a user's password.

The controller 63 is equipped with a CPU and memories (both not shown) previously storing therein one or more programs for the reproduction of audio signals, part of the programs being described later. This processing carried out by the controller 63 includes the determination of whether a disk DK to be reproduced is "DVD-Audio (conventional audio disk)" or "DVD-Audio type 2 (audio disk according to the present invention; "type 2" indicates an audio disk according to the present invention)." Such determination requires either a signal indicative of whether or not the audio disk DK has a compressed audio data-directory (CA-D) or a signal indicative of a disk identifier, which is read out via the DVD decoding circuit 42. Incidentally, the determination of the type of a disk can be done by a digital or CPU-basis internal circuit or an external circuit dedicated to the determination, differently from the CPU of the controller 63.

The display 61, which is under the control of the controller 61, is in charge of displaying necessary information for a user. This display operation includes the representation of a menu concerning audio data to be reproduced. Hence, part of the functions of the controller 63, the operation device 62, and the display 63 constitute an interface between the user and the reproduction apparatus.

Figure 51A:
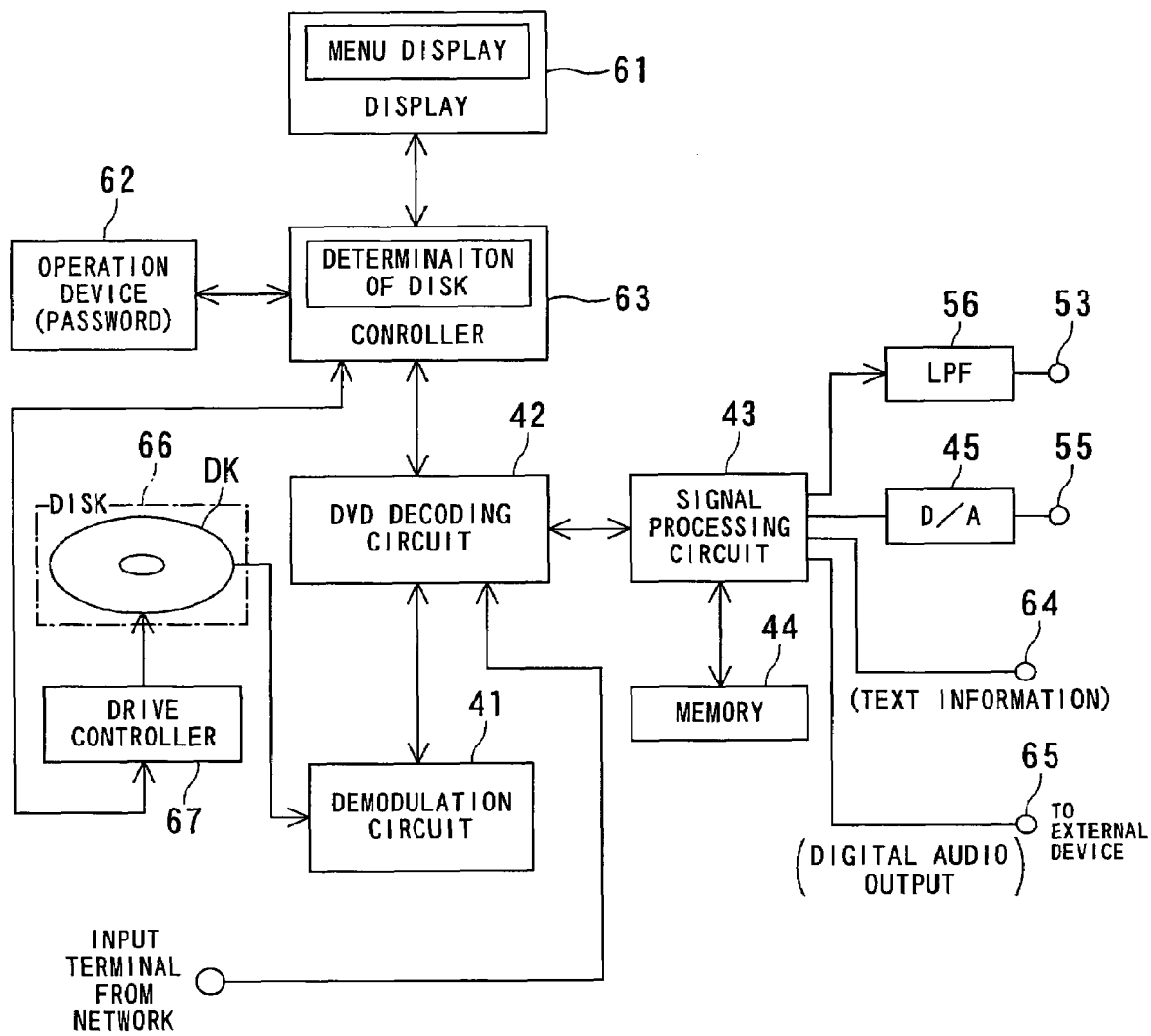
FIG. 51A is a block diagram exemplifying a reproduction apparatus according to a first embodiment of the present invention.
Figure 51B:
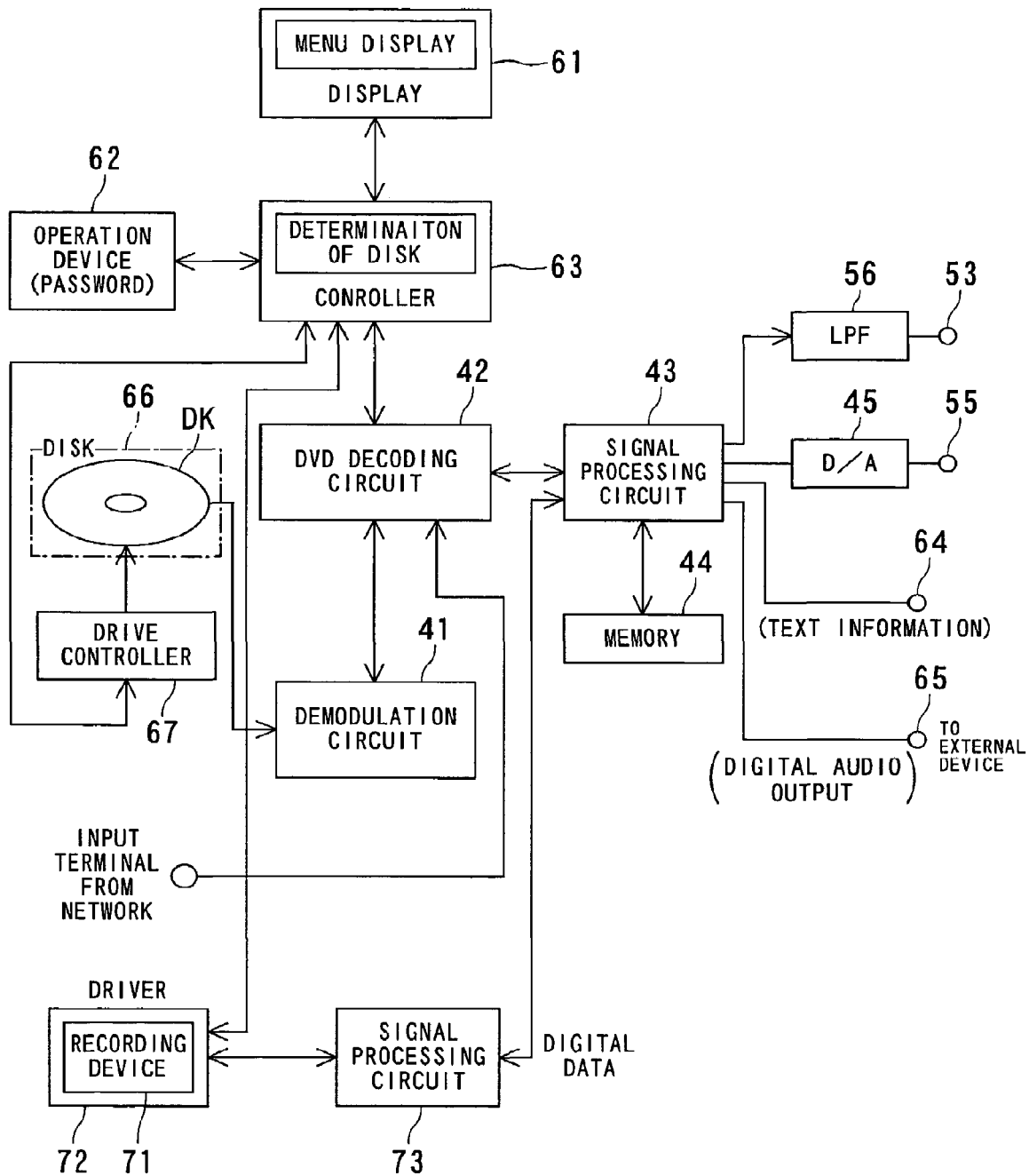
FIG. 51B is a block diagram exemplifying a reproduction apparatus according to a modification of the first embodiment of the present invention.

In place of the foregoing reproduction apparatus, another reproduction may be adopted, which is shown in FIG. 51B, for instance. The configurations of the reproduction apparatus in FIG. 51B include a drive 72 for reading/writing audio data with a recording device 71, such as hard disk (HD) and SD (Secure Digital) memory card, and a further signal processing circuit 73 responsible for reading/writing audio data with the driver 72, in addition to the components of the reproduction apparatus shown in FIG. 51A. The recording device 71 can be mounted in the drive 72 in a detachable manner. The signal processing circuit 73 has the capability of transmitting digital audio data to and from the foregoing signal processing circuit 43. Furthermore, the driver 72 is under the control of the controller 63. The additional components of 72 and 73 allow digital audio data to be recoded and reproduced into or from the recoding device 71, which is an internal unit detachably mounted in the reproduction apparatus.

DVD Decoding Circuit and Signal Processing Circuit

The processing of the foregoing DVD decoding circuit 42 and signal processing circuit 43 will now be described.

Figure 52:
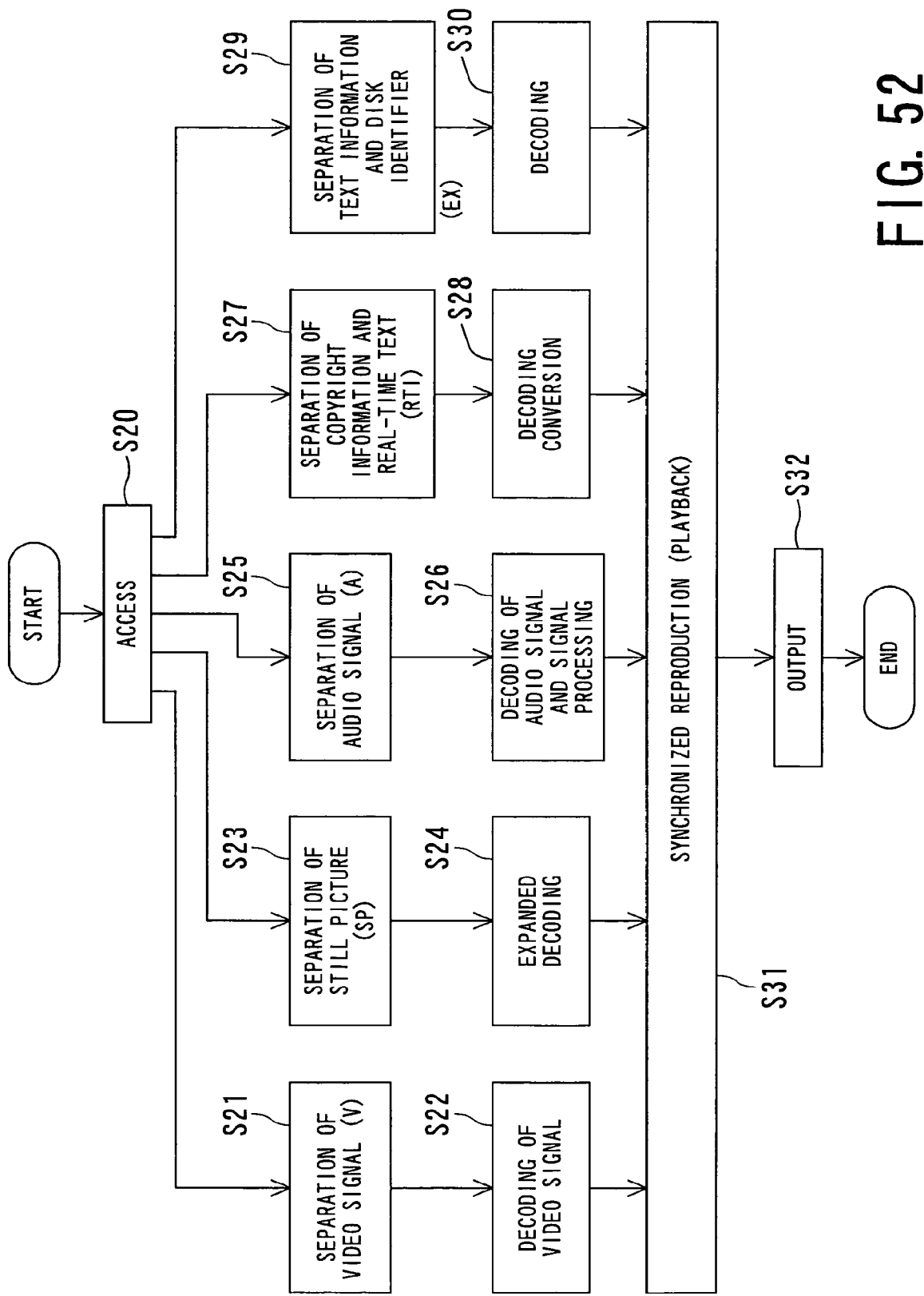
FIG. 52 is a flowchart explaining the operations of a DVD decoding circuit and a signal processing circuit.

The reproduction apparatus shown in FIGS. 51A and 51B is provided with the DVD decoding circuit 42 and the signal processing circuit 43, whose operations are shown in FIG. 52 as operation flowcharts.

First, a disk is accessed to read out data recorded thereon (step 20), and the read-out data are then subjected to separation among video signals, still picture signals, audio signals, copyright information and real time information (RTI), and text information and disk identifiers at separation steps S21, S23, S25, S27 and S29 in FIG. 52. Each of the above separated signals and data are decoded at decoding steps S22, S24, S26, S28 and S30, respectively. The decoded various data are then reproduced in a synchronized manner at steps S31 and S32.

There are three techniques for processing for reproduction of still pictures SP. A first technique is to interrupt the reproduction of audio signals "A" to mute it, when signals of still pictures SP are acquired. A second one is to reproduce data of still pictures SP together with audio signals "A" based on time control signal, responsively to acquisition of the data of the still pictures SP. A third one relates to page-turning reproduction, in which when data of still pictures SP are acquired, the acquired data undergoes the page-turning reproduction in response to a page-turning command from a user, during which time audio signals "A" are reproduced as they are.

When it is necessary to synchronize still pictures with audio, time control signal is used to perform the synchronization in real time. In such a case, the time control signal is placed in a time control data information (SPCIT-TCDI) under a still picture control information table (SPCIT) added to the ATSI.

In addition, a still picture page control command information (SPPI) including the page-turning command is put in the SPCIT. Hence the SPCIT is composed of SPCIT general information (SPCIT-GI), time control data information (SPCIT-TCDI), and still picture page control command information (SPPI).

Incidentally, into still picture data of a SPCT pack concerning the real time information RTI of still pictures SP, additional information for controlling the pages of the still pictures may be included. This additional information defines page control data, which is interpreted with reference to the SPPI, with the page control of the still pictures performed.

If there is no sufficient room to store the above additional information in the still picture data, the additional information may be included in the RTI data of the RTI pack.

Controller

The operations of the foregoing controller 63 will now be described with reference to FIGS. 53, 54, 55 and 56.

First, the operations carried out for an audio disk with no compressed audio-directory (CA-D) will be described using FIGS. 53 and 54.

Figure 53:
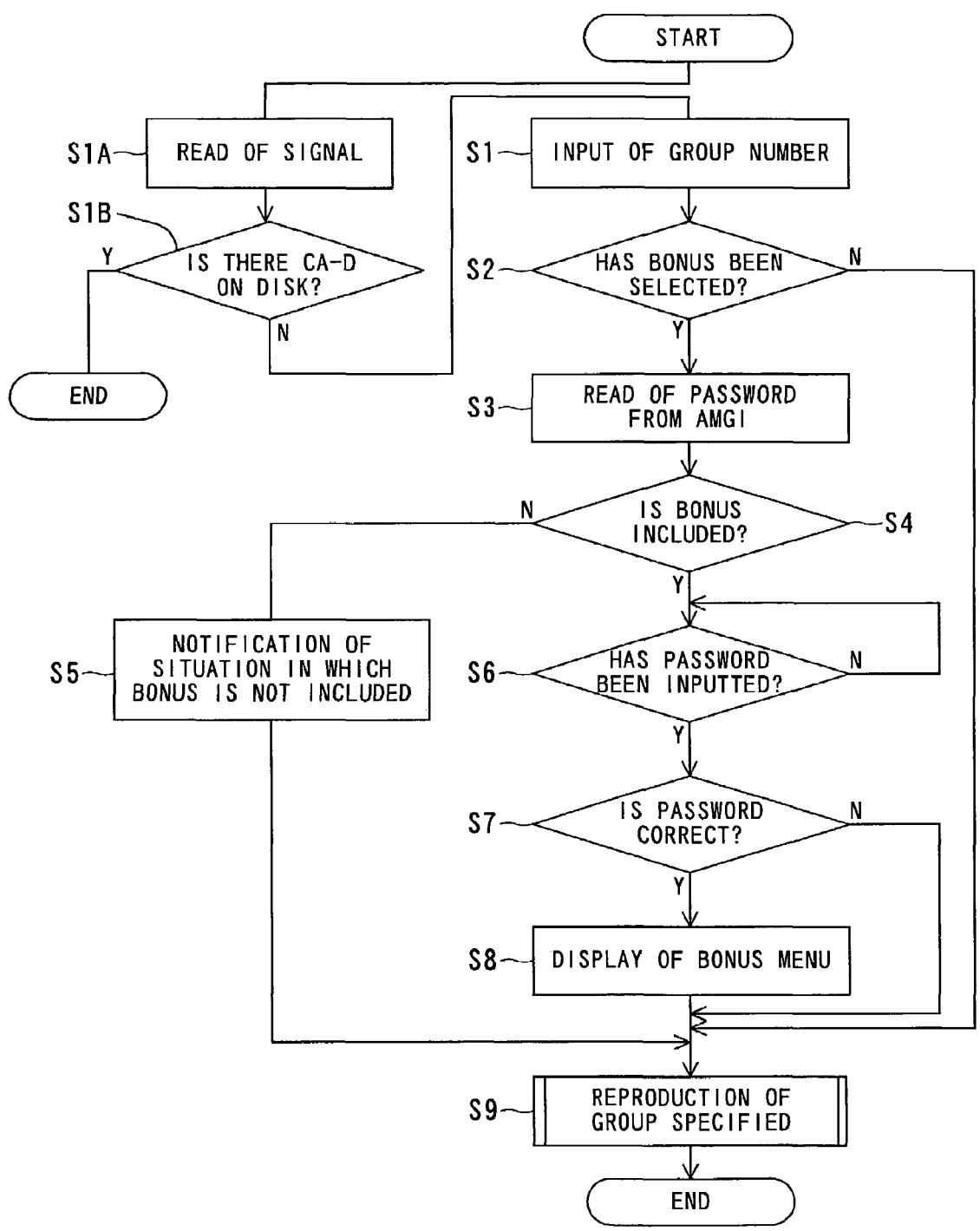
FIG. 53 is a flowchart explaining reproduction processing.

The controller 63 first reads, from an audio disk DK loaded in drive 66, a signal indicative of whether or not there is compressed audio-directory (CA-D) on the audio disk DK through the DVD decoding circuit 42 (step S1A in FIG. 53). The controller 63 then uses the read signal to determine whether or not the audio disk DK is a disk with compressed audio-directory (CA-D) (step S1B).

As to determining the type of an audio disk to be reproduced as above, the above determination can be modified into the technique of using the disk identifier. Specifically, the controller 63 may read in a signal indicative of the disk identifier (refer to "book type and part version" in FIG. 25) of an audio disk DK from the DVD decoding circuit 42, and use the read signal to perform the determination.

In step S1B, if the determination reveals that the audio disk DK is a disk with compressed audio-directory, that is, a "DVD-Audio disk type 2" according to the present invention (YES in step S1B), the processing is ended, while the determination reveals that the disk DK is a disk with no compressed audio-directory, that is, a conventional "DVD-Audio disk" (NO in step S1B), the processing is shifted to step S1 and subsequent steps, which are also carried out by the controller 63 as follows.

Specifically, a predetermined menu is displayed on a display 61. The controller 63 reads out a group number inputted on the menu by an operator through an operation device 62 (step S1). The controller 63 then determines whether or not a bonus program is selected by the user (step S2). For example, if the final group number is selected, the controller 63 decides that the bonus program has been specified, When the determination in step S2 is affirmative (YES), the processing is moved to step S3, while the determination in step S2 is negative (NO), the processing is skipped to step S9 to reproduce a group of data depending on a user's specified command.

In step S3, the controller 63 reads out a password, which has been described together with FIG. 32, from the AMGI, and then determines whether or not the password agrees with "0000," that is, the bonus information is contained. If it is determined at step S4 that the bonus information is not included (NO), the controller 63 urges the display 61 to display thereon a massage showing the non-existence of the bonus information (step S5), before shifting to step S9.

In contrast, if the opposite determination comes out at step S4 (that is, it is determined that the bonus information is contained), the controller 63 waits for the input of a user's password (step S6). When the determination that the user's password has been inputted, the controller 63 applies the processing to the inputted password to determine whether or not the password is valid (step S7). As a result of this determination, the processing is shifted to step S8 if the password is valid, but shifted to step S9 if the password is not valid. In step S8, the controller 63 engages in display of a bonus menu, before proceeding to step S9, where the reproduction of a specified group data is performed depending on a user's specified command.

Figure 54:
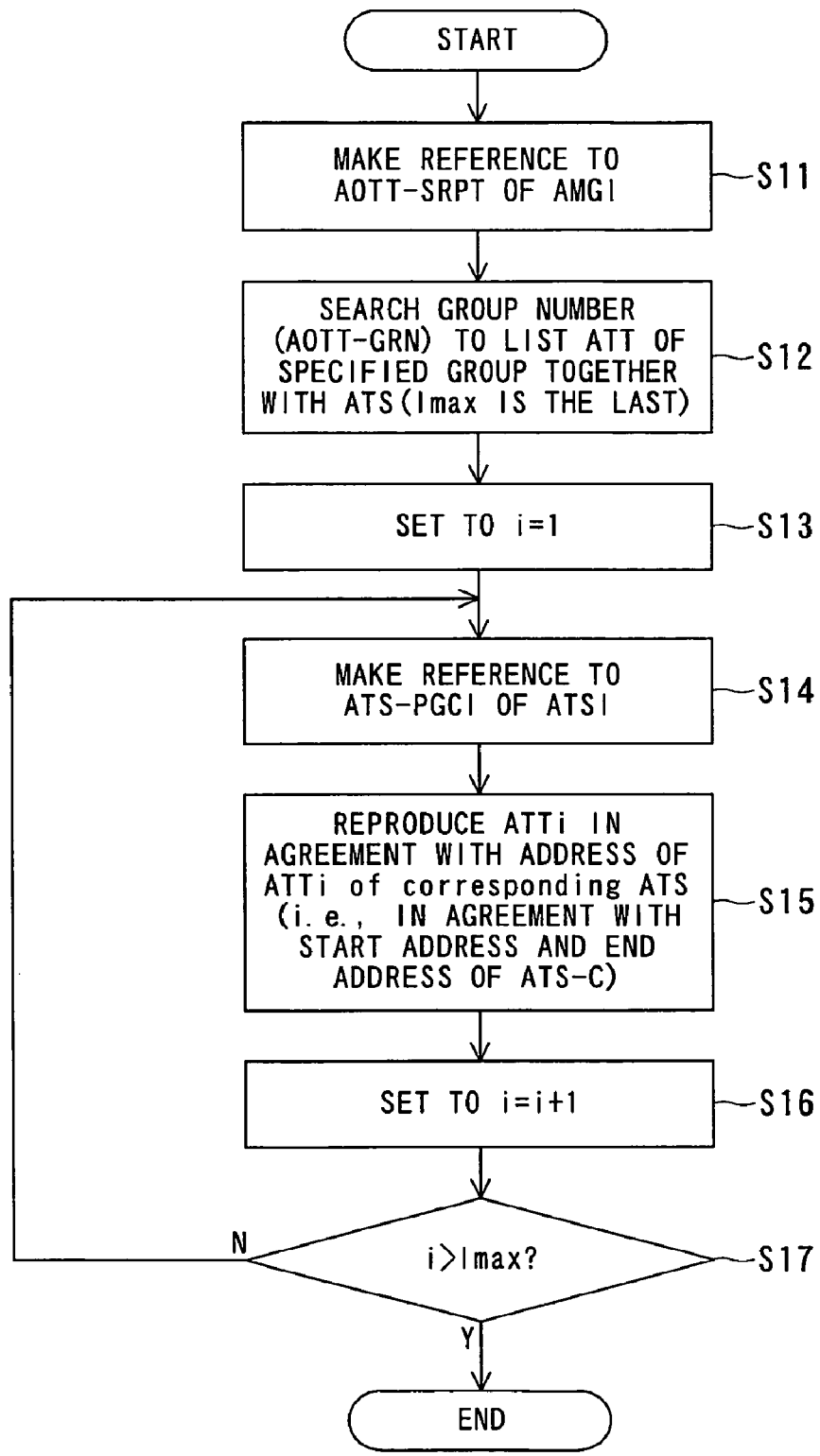
FIG. 54 is a flowchart detailing the group reproduction processing in FIG. 53.

The process carried out in step S9 is more detailed in FIG. 54. The controller 63 makes reference to the audio title search pointer table (AOTT-SRPT), which has been described in connection with FIGS. 33-36 (step S11 in FIG. 54), so that a desired group number (AOTT-GRN) shown in FIG. 36 is found out. The controller 63 makes a list of an audio title (ATT) that belongs to the specified group, together with audio title sets (ATS) (step S12).

The processes in step S11 and S12 will now be detailed, The bits b3-b0 in the audio title category (ATT-CAT) table shown in FIGS. 35 and 36 are used to detect a desired group number. The number of programs in the AOTTs (AOTT-PG-Ns) in the table shown in FIG. 35 is then referred to find out the number of programs in the audio only titles (AOTT) (i.e., the number of tracks). The numbers of the audio title sets (ATSN) in its table are referred to detect the numbers of the ATS titles. Thus the numbers of the groups shown in FIG. 46 and the numbers of the audio titles (ATT) are acquired. In addition, during the above lists, the last audio title number Imax belonging to the specified group is decided.

The controller 63 sets an audio title number ATTi to 1 (step S13).

Then the controller 63 makes reference to the ATS program chain information (ATS-PGCI) in the ATSI shown in FIGS. 40-45 in order to search for addresses in the ATTi (i.e., the start address and end address of ATS cells) (step S14). Thus the ATTi is reproduced (step S15). During this search, the ATS-PG-CNT (contents) in the ATS-PGI shown in FIG. 43 is referred to understand the numbers of the titles shown in FIG. 46, and the numbers of the ATS-PG entry cells are used to detect the indices shown in FIG. 46.

By the controller 63, the audio title number ATTi is then incremented (step S16), and it is determined whether or not the audio title number ATTi is larger than a predetermined number Imax (step S17). When the ATTi is smaller or less than Imax (NO in step S16), the controller 63 makes the processing go to step S14, while when the ATTi is larger than Imax (YES in step S16), the controller 63 finishes this grouping reproduction.

Secondary, the operations carried out for an audio disk with compressed audio-directory (CA-D) will be described using FIGS. 55 and 56.

Figure 55:
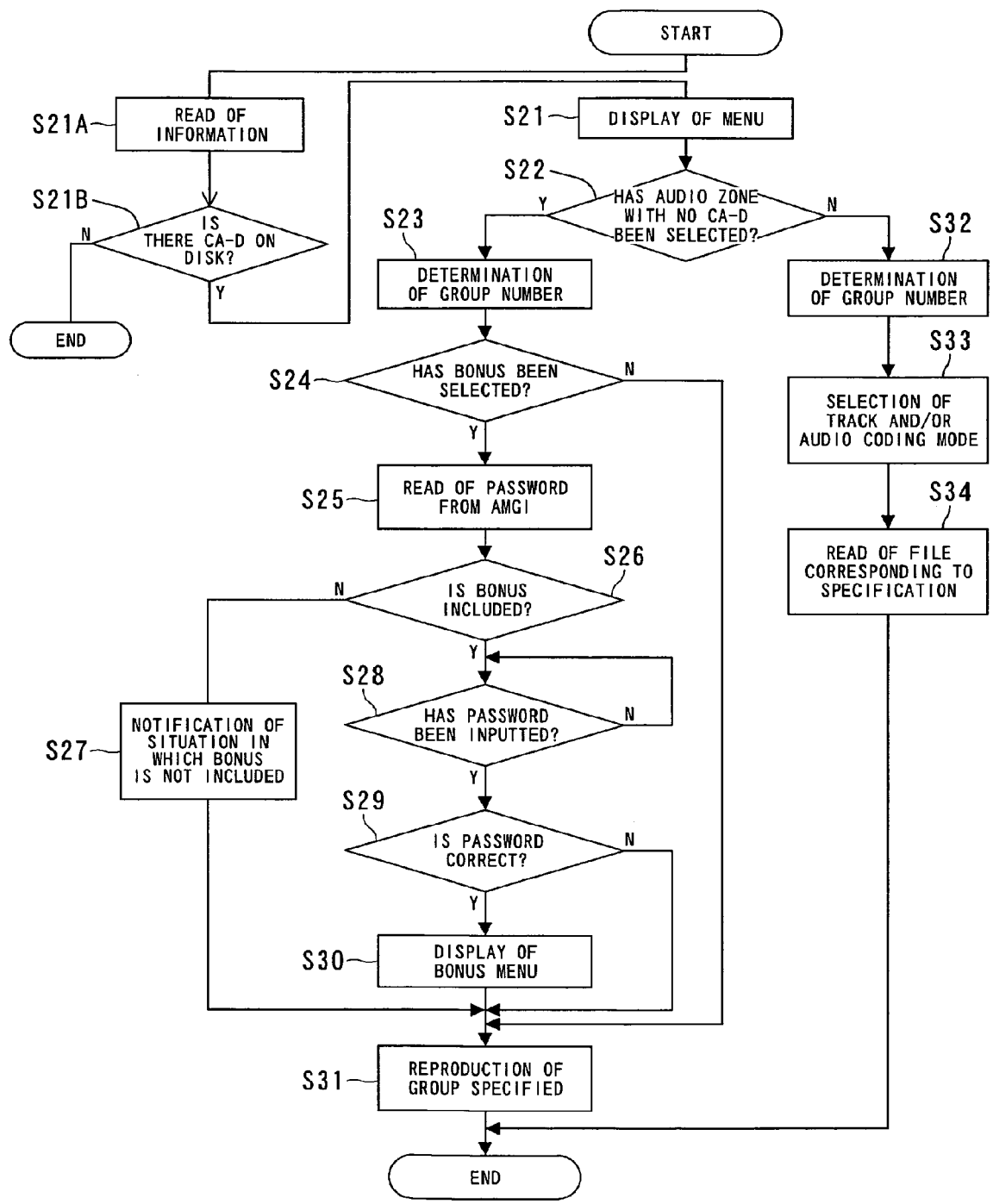
FIG. 55 is a flowchart explaining reproduction processing.

The controller 63 first reads, from an audio disk DK loaded in drive 66, a signal indicative of whether or not there is compressed audio-directory (CA-D) on the audio disk DK through the DVD decoding circuit 42 (step S21A in FIG. 55). The controller 63 then uses the read signal to determine whether or not the audio disk DK is a disk with compressed audio directory (step S21B).

In this case, as described above, the disk identifier may be used to determine the type of an audio disk.

In step S21B, if the determination reveals that the disk DK is a disk with no compressed audio-directory, that is, a conventional "DVD-Audio disk" (NO in step S21B), the processing is ended, while the determination reveals that the audio disk DK is a disk with compressed audio-directory, that is, a "DVD-Audio disk type 2" according to the present invention (YES in step S21B), the processing is shifted to step S21 and subsequent steps, which are also carried out by the controller 63 as follows.

To be specific, as shown in FIG. 55, a menu is displayed on the display 61 (step S21), and it is determined that which one of the audio zone with no compressed audio data (with no CA-D) or the compressed audio zone with compressed audio data (with CA-D) is selected on the displayed menu (step S22). If it is determined that the audio zone with no CA-D is selected on the menu (YES in step S22), the processing in the controller 63 is shifted to step S23 and subsequent steps S24 to S31, which are identical to steps S1-S9 in FIG. 53. In contradiction to this, when it is determined that the compressed audio zone with CA-D is selected on the menu (NO in step S22), a group number is determined (step S32). Then a track and/or an audio coding mode are selected (step S33), and then a specified file is read out (step S34). Incidentally, in the case that the compressed audio zone includes some bonus programs stored therein, the controller 63 carries out the processing similar to steps S24 to S30, though it is not shown, in which a password is read out from the CAMG management table or AMGI, and it is determined if an inputted password is bona fide using the read-out password. Only when the inputted password is bona fide, the processing is shifted to step S33.

By the way, after the format conversion of audio data as above, the format-converted audio data can be sent to a use's terminal. For example, the converted audio data can be sent to the user's terminal via a communication interface (I/F) 39 and a communication line (refer to FIG. 49), so that the user can replay the audio data. Alternatively, the recorder 38 shown in FIG. 49 can be used. That is, the converted audio data can be recorded on another recording medium by the recorder 38 and then transmitted to a user's terminal via the communication interface 39 and the communication line.

Figure 56:
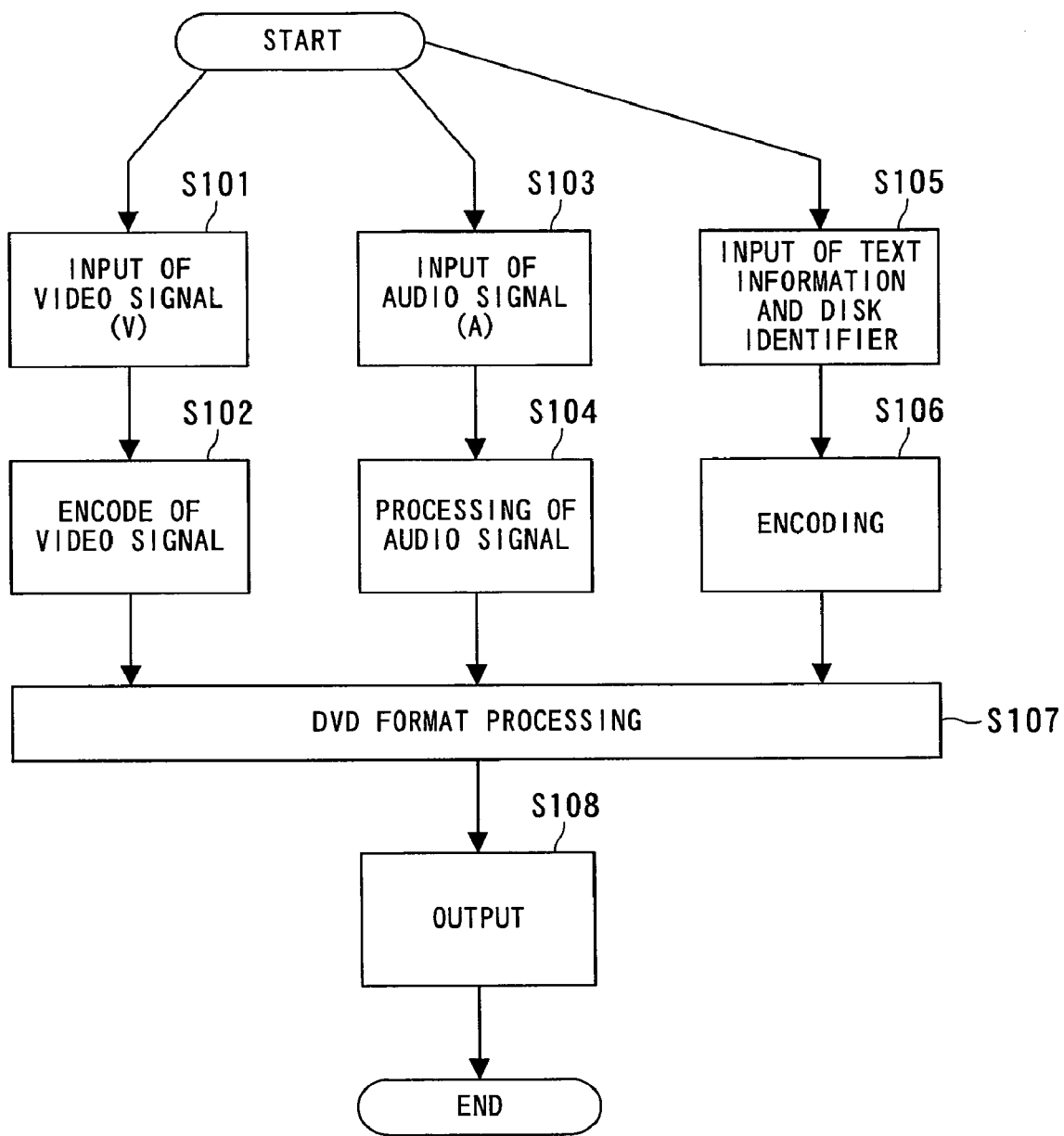
FIG. 56 is a flowchart outlining an example as to how to encode for the audio disk.

FIG. 56 shows the processing necessary for the above transmission, which is carried out by the configuration in FIG. 49. A video signal V is received to be V-encoded (steps S101, S102), an audio signal A is received and then subjected to signal processing (steps S103, S104), and text information and a disk identifier are received and then encoded (steps S105, S106).

The thus-processed data and information are then subjected to the DVD format conversion as shown in the first reference, second reference, first example, or second example (step S107). The converted data and information is outputted for transmission to a user's terminal (step S108).

In the case of being converted to the DVD format on the first and second examples, the processing in step S107 includes the production of compressed audio files (CAF), CAMG management table (CAMG-MAT), grouping information (GRLI), and group information (GRI). If necessary, the processing in step S107 additionally includes production of text information (a disk name, group name, and track name) in relation to the audio data.

Modifications

Figure 57:
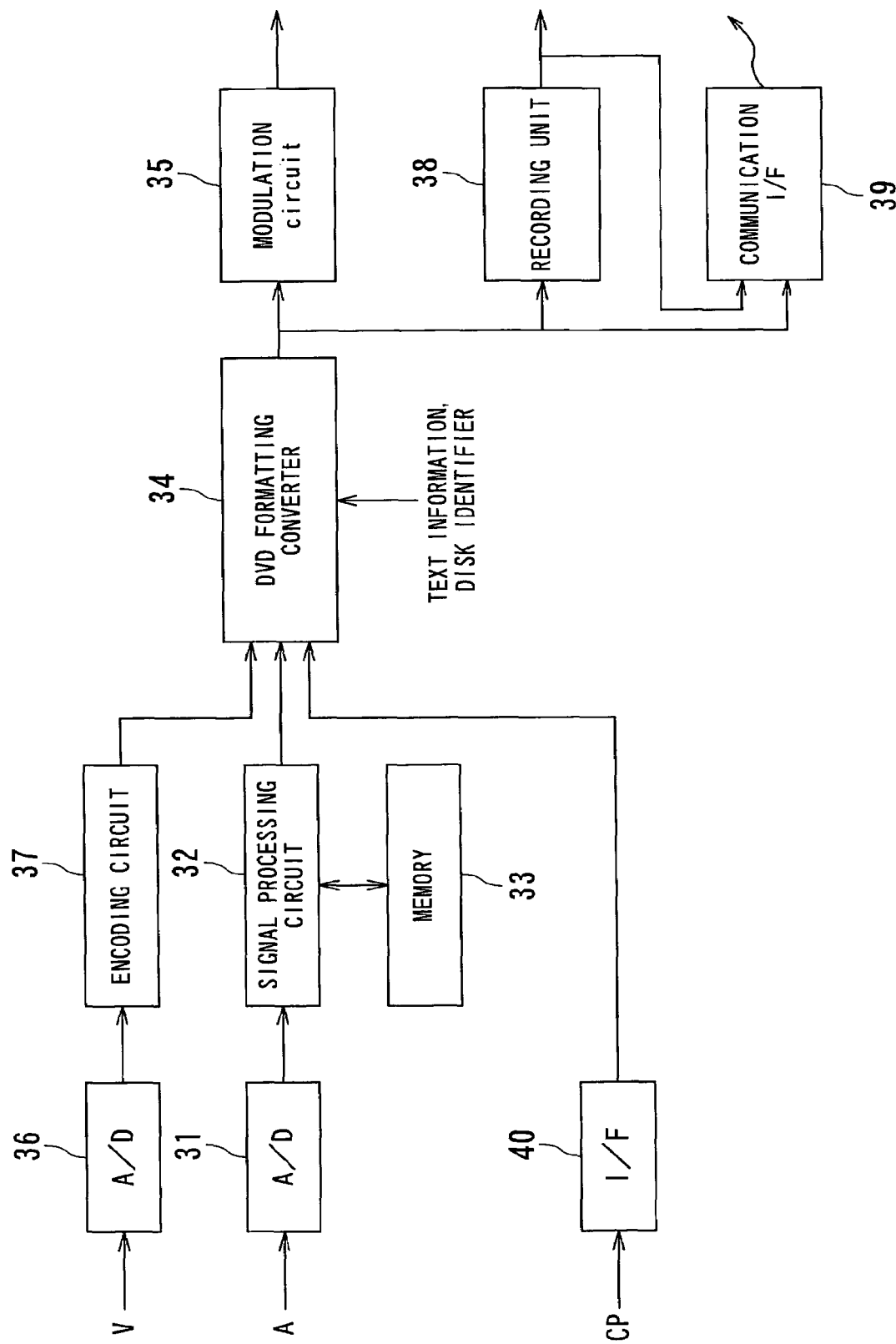
FIG. 57 is a block diagram exemplifying another encoder for audio disks.

FIG. 57 shows the configuration of another encoder. This encoder has the capability of receiving a computer program CP for decoding the above encoded data and information and placing the computer program CP in a CTS (Computer Title Set) shown in FIG. 29. Alternatively, a program for further encoding may be placed in the CTS.

Figure 58:
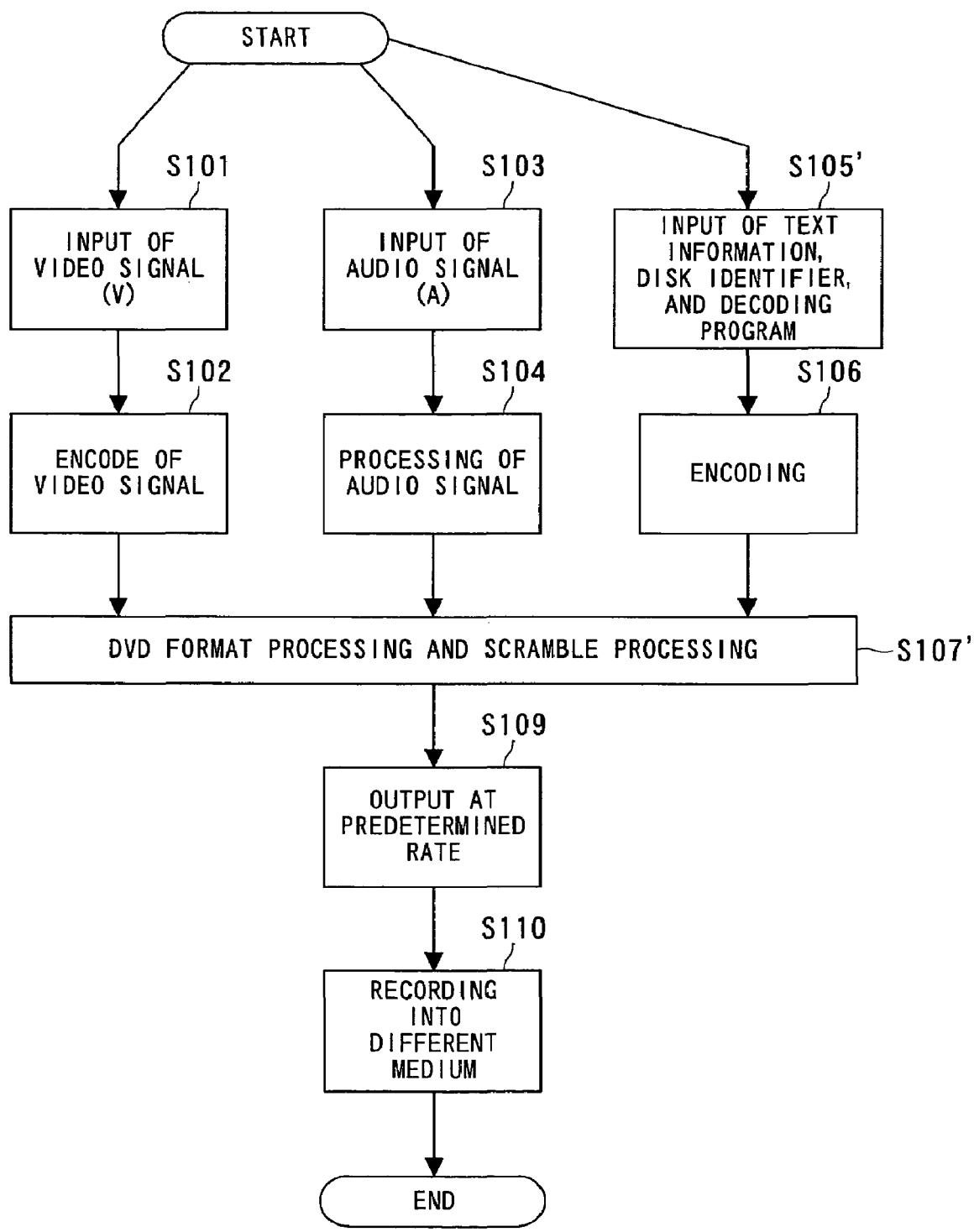
FIG. 58 is a flowchart outlining another example as to how to encode for the audio disk.

FIG. 58 shows the processing for the above, which is the same to that shown in FIG. 56 except for several steps. In step S105' in the processing, together with text information and a disk identifier, a computer program CP can be received which is for decoding the format shown in the first reference, second reference, first example, and second example. The video signal V and audio signal A can be processed in the same way as that in FIG. 56. The data and information are then converted into the format explained in the first reference, second reference, first example, and second example, and subjected to scramble processing with each other (step S107'). The scramble-processed data and information is then outputted at predetermined rates and recorded onto a further recording medium for transmission to a user's terminal (steps S109 and S110).

Figure 59:
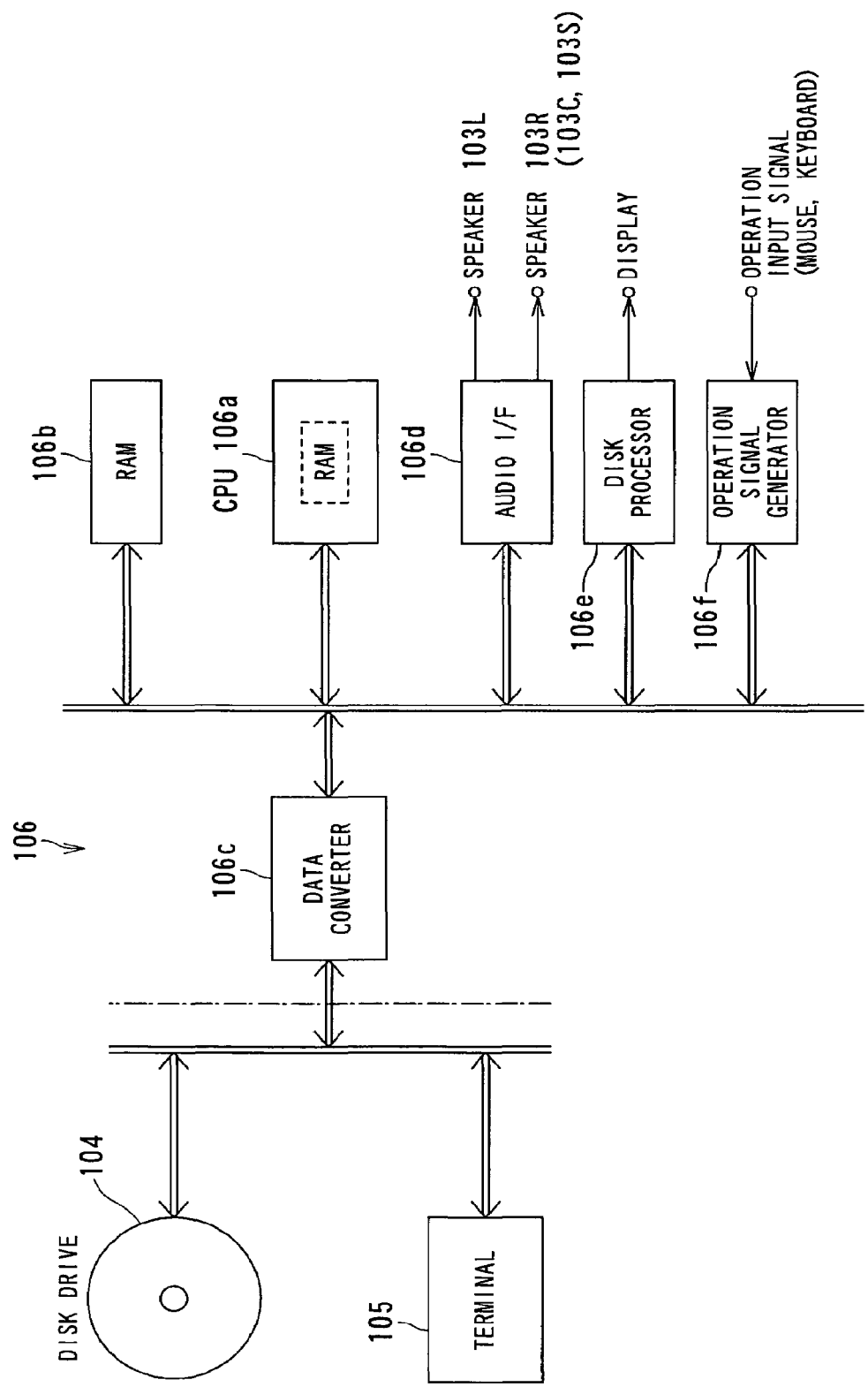
FIG. 59 is a block diagram showing a terminal (personal computer) for the transmission or reception of audio data.

FIG. 59 shows the configuration of a terminal 106 (, which is composed of a personal computer or a recording/reproducing apparatus with network terminals; hereinafter simply referred to as "personal computer,") placed in both the data transmission system side and a data reception system side (the foregoing editor), the processing carried out by the data reception-side terminal 106 being shown in FIG. 60. The terminal 106 is configured to receive an audio source and a decoding program, which are formatted as described in the first reference, second reference, first example, and second example, via a disk driver 104 or a network terminal 105.

By way of example, the terminal 106 is a personal computer essentially equipped with a CPU 106a, RAM 106b, data converter 106c, audio interface (I/F) 106d, display processor 106e, and operation signal generator 106f. Of these, the CPU 106a is formed as a CPU that has an application specific instruction set added to effectively process digital signals such as videos and audio signals, like an extended instruction set (MMX) of PP55C made by Intel cooperation. The RAM 106b is placed as a buffer for data processing. The data coveter 106c converts data supplied from the disk driver 104 or the network terminal 105. Further the audio interface (I/F) 106d is responsible for providing with plural speakers 103L and 103R and surround-sound speakers 103C and 103S) with the processed audio data through D/A converters and amplifiers. The display processor 106e is placed to perform display control for a not-shown display, while the operation signal generator 106f is placed to create operation signals in response to operation signals from a mouse and a keyboard which are not shown.

Figure 60:
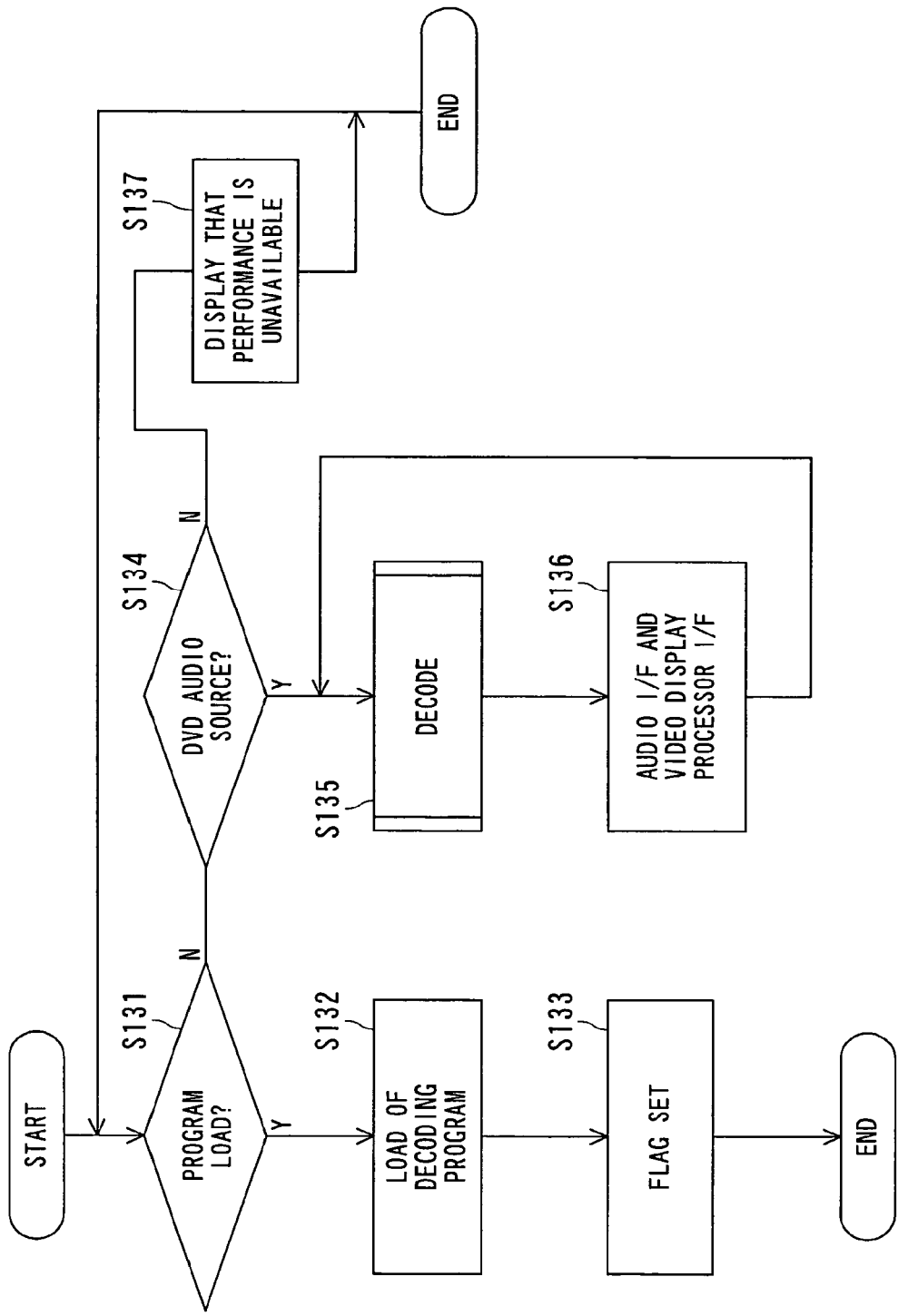
FIG. 60 is a flowchart showing the processing carried out by the terminal shown in FIG. 59.

In the above configuration of the data-reception-side terminal 106, the CPU 106a operates on a series of procedures shown in FIG. 60. To be specific, the CPU 106a, which is now ready for reception of the foregoing decoding program, is able to receive a program loading instruction (i.e., command) via the not-shown keyboard, for example (step S131). In response to this instruction, the CPU 106a loads its internal memory (RAM) with the decoding program (step S132), and after completion of the load operation, sets a program loading flag (step S133), before ending the processing. Since the CPU 106a is MMX compatible, the processing for a high-speed communication is possible.

Further, the CPU 106a, which is now ready for receiving an audio source, is able to respond to a play command via the not-shown keyboard. In other words, the first track is accessed to read out a disk identifier indicative of the type of a disk to be reproduced and it is determined whether or not the disk identifier is "audio source." (step S134). When the determination is YES in step S134, the decoding processing is executed (step S135), whereby the processed audio data and video data are sent to the audio interface (I/F) 106d and the display processor 106e, respectively (step S136). The processing is then returned to step S135 to perform the decoding processing in a repeated manner. This processing allows the user to reproduce signals such as audio signals that have been received using the recording medium or the communication medium.

Incidentally, when it is determined at step S134 that there is no DVD-Audio source on the disk to be reproduced, a massage showing "performance unavailable" is displayed on the not-shown display (step S137), before finishing the processing. If required, the data on the disk may be encoded instead of such a display operation.

Figure 61:
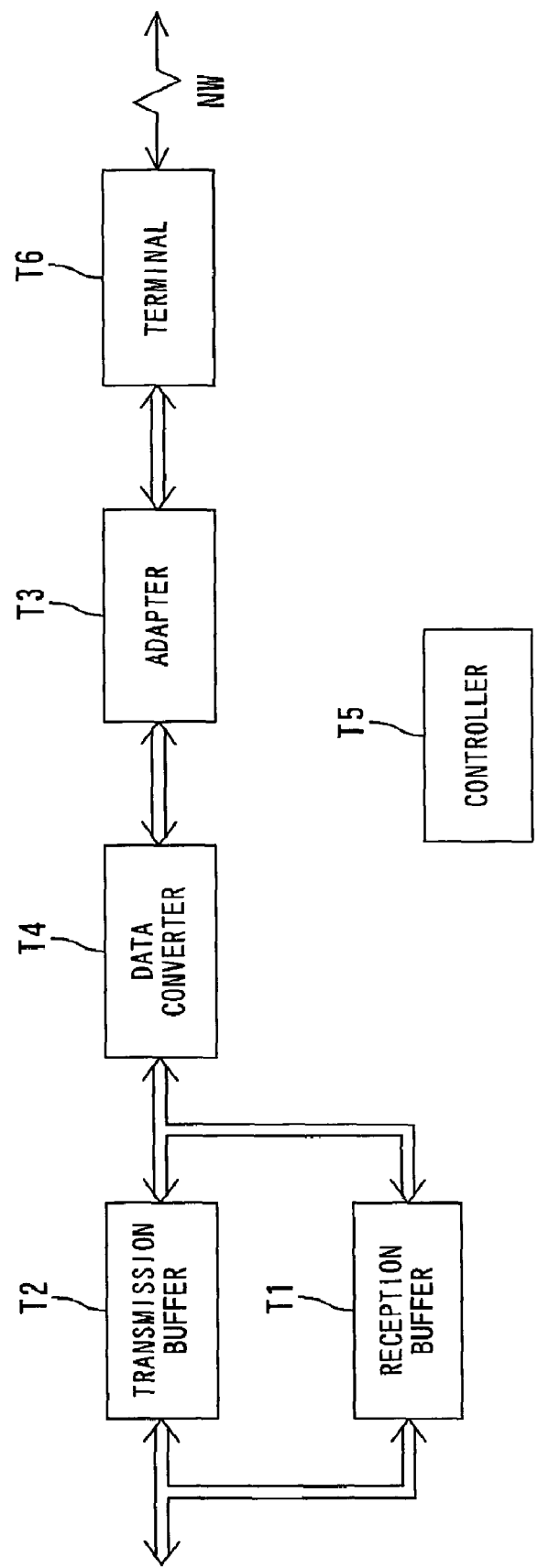
FIG. 61 is a block diagram detailing a network terminal mounted in the terminal shown in FIG. 59.
Figure 63:
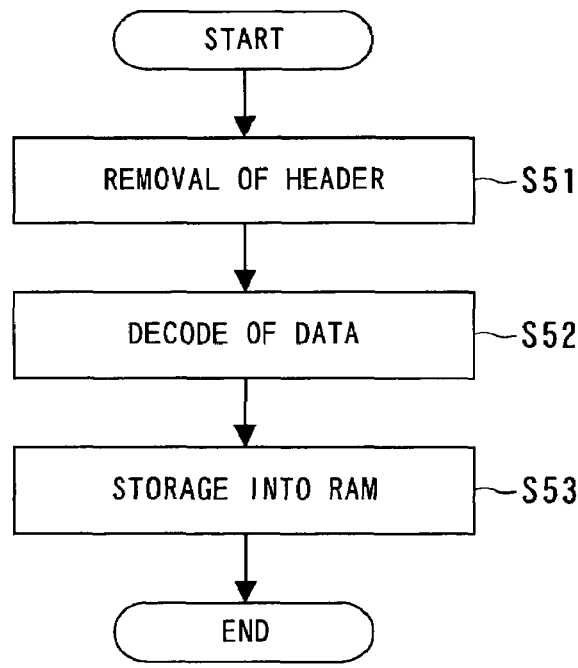
FIG. 63 is a flowchart showing the processing in a data converter on the data reception side.
Figure 64:
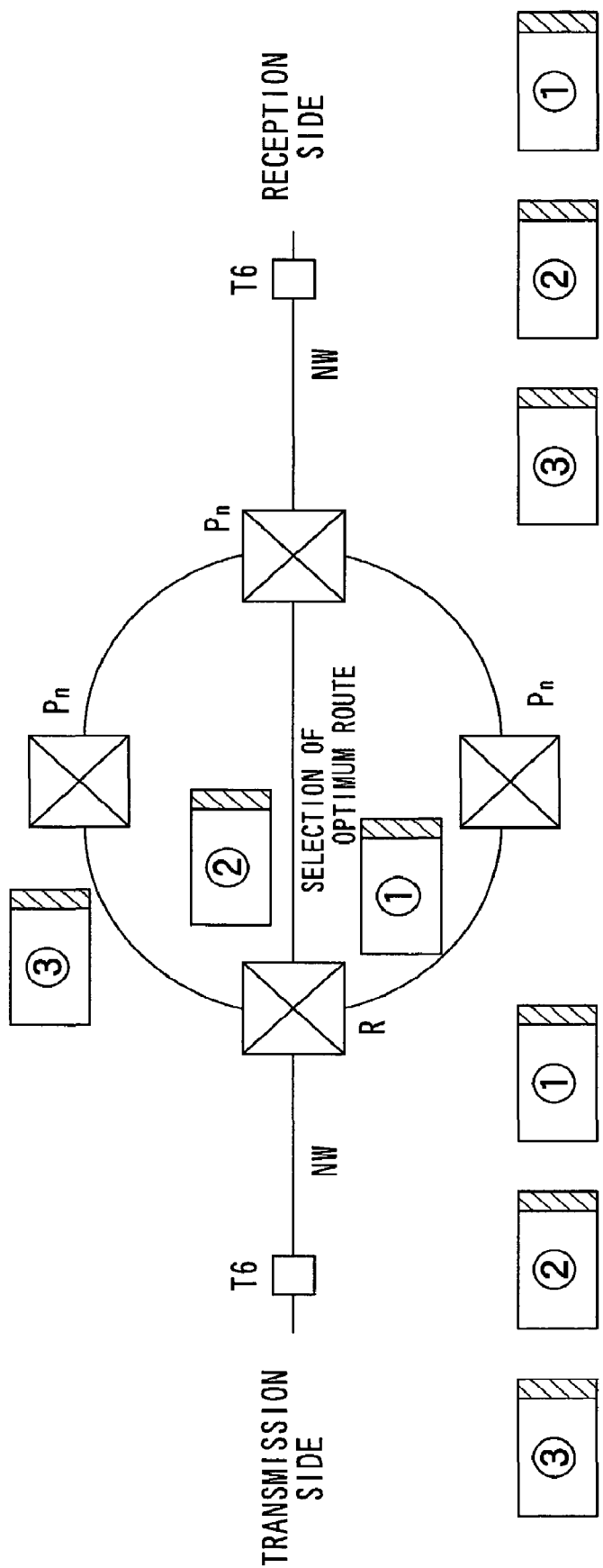
FIG. 64 depicts an example of a communication network.

The digital audio signals processed with the above decoding program as well as the decoding program can be transmitted to another terminal via a communication network. FIG. 61 details a network terminal 105 within the terminal 106 (i.e., personal computer) shown in FIG. 59. Processing carried out by a data converter in FIG. 61 is shown as flowcharts in FIGS. 62 and 63. The communication network is illustrated in FIG. 64 and the processing of packets on the network shown in FIG. 64 is illustrated in FIGS. 65A and 65B. The present network terminal 105, which is incorporated in both of the terminals 106 on the data transmission and reception sides, is provided with a reception buffer T1, transmission buffer T2, data converter T4, adaptor T3 serving as a communication interface, terminal device T6, and controller T5, which are all connected to an internal bus of the terminal 106.

Figure 62:
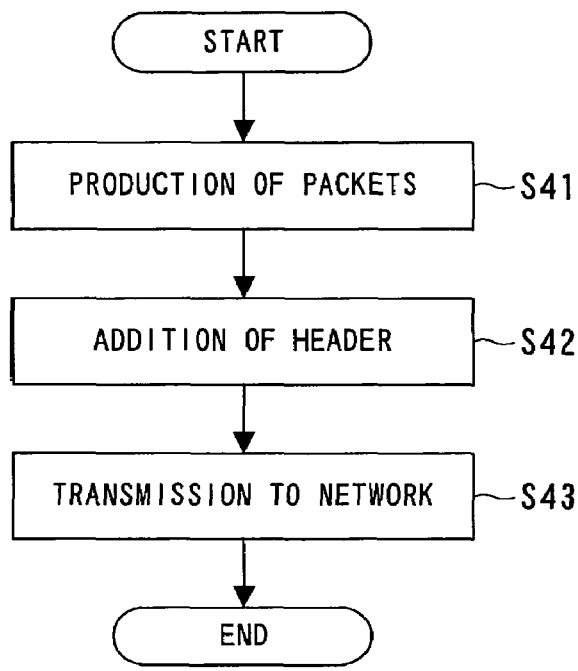
FIG. 62 is a flowchart showing the processing in a data converter on the data transmission side.

As shown in FIG. 62, the data coveter T4 on the data transmission side divides data to be transmitted, which is stored in a transmission buffer T2, into packets each having a predetermined data length (step S41). The data converter T4 then attaches a header to the head of each packet, the header including a destination address to which the packet should be sent (step S42), and provides the packet on the network NW via the adapter T3 and terminal device T6 (step S43). Meanwhile, as shown in FIG. 63, the data converter T4 on the data reception side receives each packet via the terminal device T6 and adapter T3 and removes the header from the received packet (step S51). The data converter T4 operates to decode data from the remaining part of each packet (step S52), and then causes the decoded data to be transferred to the internal RAM 106b shown in FIG. 59, via the reception buffer T1 (step S53).

Both terminal devices T6 on both the data transmission and reception sides are connected to each other via a network NW, for example, as illustrated in FIG. 64. The network NW is for instance a CATV (Cable TV) line or the Internet using a protocol called TCP/IP (Transmission Control Protocol/Internet Protocol), through which data are transmitted packet by packet. That is, packets expressed by encircled numbers 1, 2 and 3 are handled in turn such that the packets outputted by the data transmission system are subjected to the packet-basis selection of a suitable route performed by a router on the network NW, as shown in FIGS. 64-65A and 65B. Namely each packet is separated to be sent on an independent selected route. The separated packets are in sequence sent to the terminal 106 on the data reception side through exchangers Pn (n=1 to k).

Accordingly, the data-reception-side terminal 106 (personal computer) is able to decode the received audio source on basis of the decoding program in the program RAM 106b. This means that it is possible for the personal computer's user to reproduce an audio source without using an audio disk as a medium.

There is provided a further medication, in which a recording medium such as HD (hard disk) is placed for the recording and reproduction executed under the control of the CPU 106a. In this case, the recording medium is controlled to temporarily record therein an audio source received, and then to reproduce the temporarily recorded audio source. This is able to give a user an impression which is as close as directly reproducing the audio source on an audio disk.

Second Embodiment

A second embodiment of the present invention will now be described.

The second embodiment relates to the format of an audio disk, in which there are prepared audio data in the group of tracks for bonus music. This management of the bonus music in the compressed audio (CA) data can therefore be simplified. For example, the tracks with no compressed audio data in the format shown in FIG. 32 are tracks for bonus music mapped as ATS<m>.

Third Embodiment

A third embodiment of the present invention will now be described.

The third embodiment also relates to the format of an audio disk illustrated as in FIG. 66. That is, the DVD-Audio recording region serving as the first audio zone is disposed as a radially inner circular region on the disk, whilst the compressed audio recording region serving as the second audio zone is disposed as a radially outer ring-shaped region juxtaposed to the radially inner circular region on the disk, This disposal of the regions makes it possible that the data on the disk can be accessed at higher speed.

Fourth Embodiment

A fourth embodiment of the present invention will now be described.

The fourth embodiment relates to an example of recording data on the disk according to the foregoing first and second examples in the first embodiment to a recording medium to which data is copied. Such recording mediums include a memory card, a compact hard disk HDD, or others mounted in a portable player.

Figure 67:
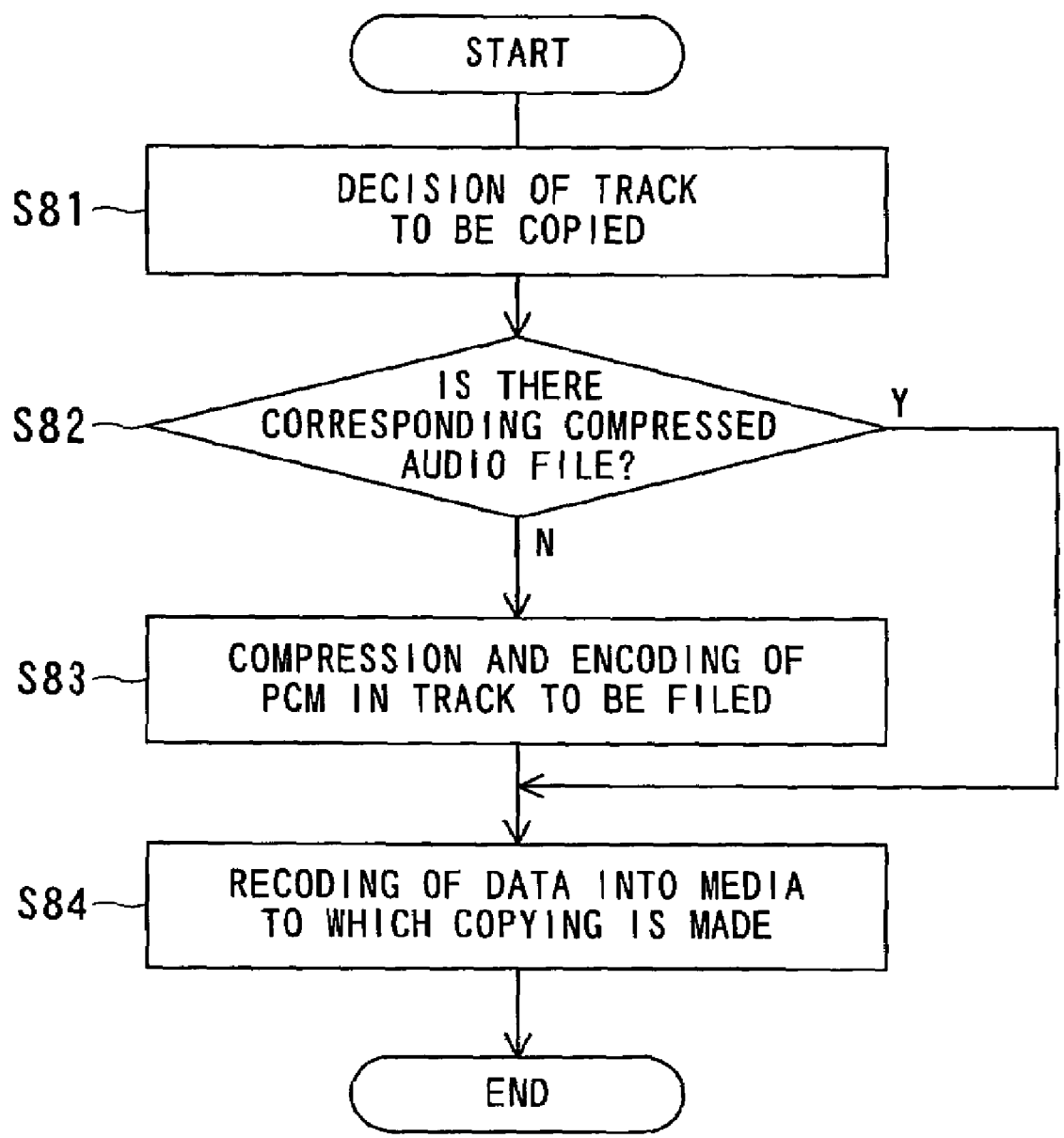
FIG. 67 is a flowchart showing recording processing of data to a recording medium to which data is copied, which is explained for a further embodiment of the present invention.

How to record the data according to this embodiment is explained in FIG. 67, which is controlled by, for example, the controller 63 shown in the reproduction apparatus shown in FIG. 51A.

As shown in FIG. 67, through an interactive communication with a user, it is decided which track in a disk should be copied (step S81). It is then determined whether or not there is a compressed audio file produced using a compression technique available in the player with a recording medium to be targeted (step S82). If there is a desired compressed audio file available in the player (YES in step S82), the file is copied to the recording medium of the player (step S84). In contrast, however, when there is no compressed audio file produced using a compression technique available in the player (NO in step S82), the PCM data of a track to be copied is subjected to compression and encoding under a specified compression technique which is still available in the player to be targeted (step S83). The compressed and encoded audio data is then recorded on the recording medium to be targeted (step S84).

As a modification of this fourth embodiment, there is provided a method of recording data on a disk according to the first and second examples to a recording medium of, for example, a portable player to which the copy is desired. This modification is explained with FIG. 68, of which processing is controlled in a mutually cooperative manner by, for example, the controller 63 shown in the reproduction apparatus shown in FIG. 51A and a CPU of the portable player.

Figure 68:
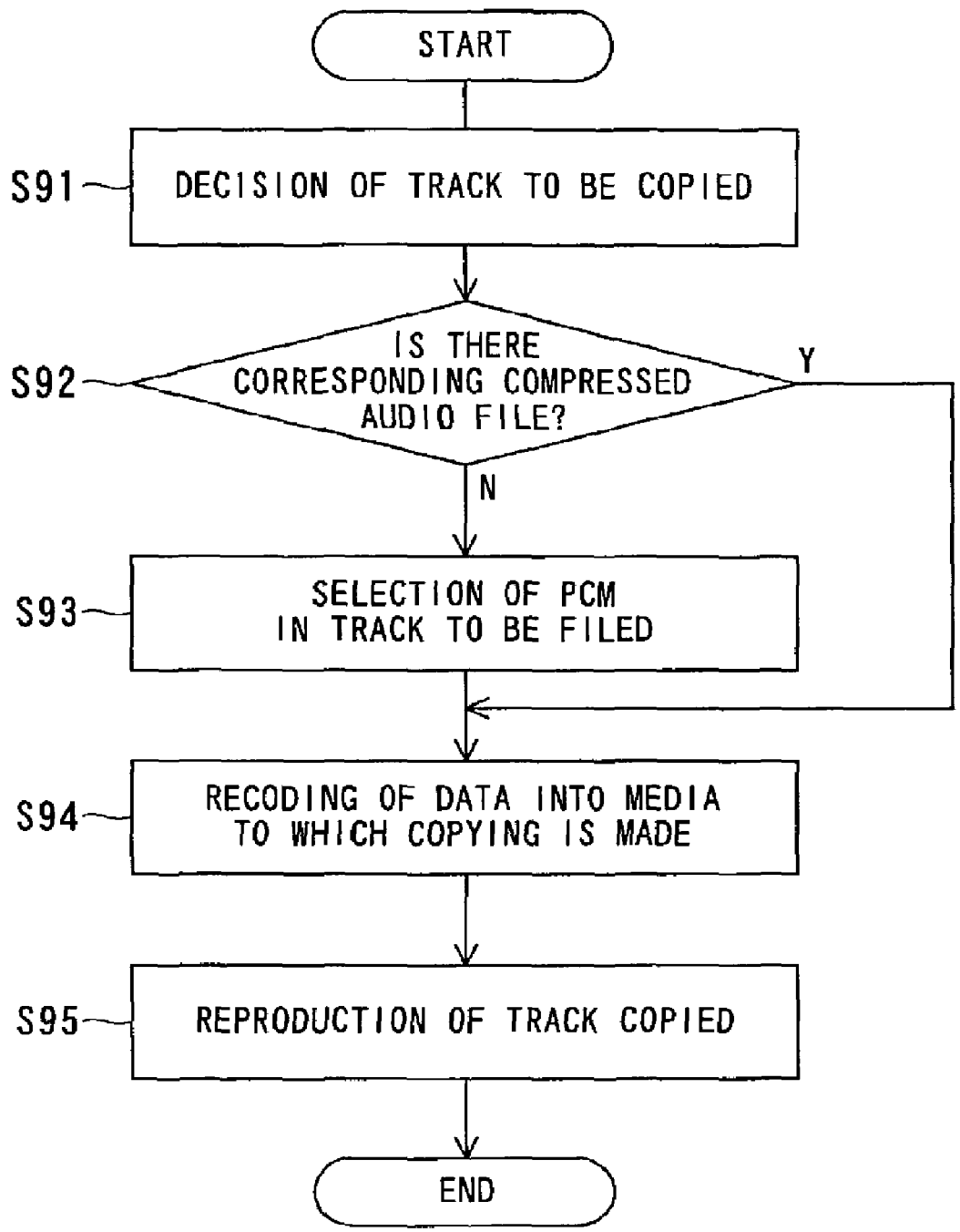
FIG. 68 is a flowchart showing recording/reproducing processing of data to and from a recording medium to which data is copied, which is explained for a modification of the further embodiment shown in FIG. 67.

As shown in FIG. 68, through an interactive communication with a user, it is decided which track in a disk should be copied (step S91). It is then determined whether or not there is a compressed audio file produced using a compression technique available in the player with a recording medium to be targeted (step S92). If there is a desired compressed audio file available in the player (YES in step S92), the file is copied to the recording medium of the player (step S94), In contrast, however, when there is no compressed audio file produced using a compression technique available in the player (NO in step S92), the PCM data of a track to be copied is selected (step S93), and then recorded on the recording medium to be targeted (step S94). After this, the data of the track copied to the player is subjected to the reproduction thereof (step S95).

In the processing in step S93, the PCM data of a track to be copied may be subjected to compression and encoding under a desired compression technique which is still available in the player to be targeted.

In the foregoing, when the PCM data is recorded on the recording medium, the number of permitted copies for a user is managed by the management information (i.e., "audio copy permission" and "audio copy number") for limiting the copy of data on the foregoing audio pack (A-pack). Meanwhile in cases where audio data is recorded from a compressed audio file to the recording medium, both "audio copy permission" and "audio copy number" owned by the copy control information mapped in the compressed audio file information (CAFI) is in charge of managing the number of times of copying permitted for a user.

Therefore, as descried, the audio data on an audio disk can be reproduced for convenience, recorded on another recording medium to which data copy is desired, and recorded on another recording medium for reproduction of the recorded audio data.

The present invention may be embodied in other specific forms without departing from the spirit or essential characteristics thereof. The present embodiments and modifications are therefore to be considered in all respects as illustrative and not restrictive, the scope of the present invention being indicated by the appended claims rather than by the foregoing description and all changes which come within the meaning and range of equivalency of the claims are therefore intended to be embraced therein.

What is claimed is:

1. A recording method, comprising;
preparing an audio disk comprising
a first audio zone which is an area for recording therein both of a plurality of tracks each including a single piece of music and first management information including first control information for allowing each track to be reproduced, wherein the plurality of tracks are recorded in a group, the music is composed of a signal based on either a linear PCM (Pulse Code Modulation) signal or a signal produced by applying lossless compression to the linear PCM signal, the linear PCM signal is an audio signal subjected to quantization at both a sampling frequency and the number of quantization bits on a DVD-Audio specification, and the first control information includes group information in relation to the group, and
a second audio zone which is an area for recording therein music composed of audio signal produced under lossy compression; and
recording onto the second audio zone a plurality of files each storing therein a signal of a single piece of music subjected to the lossy compression and second management information including second control information for allowing each file to be reproduced, wherein each piece of music stored in each file corresponds to the music included in any one of the tracks in the first audio zone, the plurality of files are recorded in a group corresponding to the group in the first audio zone, and the second control information includes group information in relation to the group in the second audio zone;
wherein the plurality of files recorded in the second audio zone each have storing therein a signal produced by applying each of a plurality of types of lossy compression each serving as the lossy compression to the music corresponding to each of the tracks in the first audio zone, the plurality of files being given with the same file name having an extension which is different from one another depending on each of the plurality of types of lossy compression.

2. A recording method, comprising;
preparing an audio disk comprising
a first audio zone which is an area for recording therein both of a track including a single piece of music and first management information including first control information for allowing the track to be reproduced are recorded, wherein the track is recorded in a group, the music is composed of audio data produced from either a linear PCM (Pulse Code Modulation) signal or a signal produced by applying lossless compression to the linear PCM signal, the linear PCM signal is an audio signal subjected to quantization at both a sampling frequency and the number of quantization bits on a DVD-Audio specification, and the first control information includes group information in relation to the group, and
a second audio zone which is an area for recording therein music composed of audio signal produced under lossy compression; and
recording onto the second audio zone both of a file storing therein a signal produced by applying to the lossy compression to the music corresponding to the single track in the first audio zone and second management information including second control information for allowing the file to be reproduced, wherein the file is recorded in a group corresponding to the group in the first audio zone and the second control information includes group information in relation to the group in the second audio zone;
wherein the file recorded in the second audio zone has a plurality of files each storing wherein a signal produced by applying each of a plurality of types of lossy compression each serving as the lossy compression to the music corresponding to each of the tracks in the first audio zone, the plurality of files being given with the same file name having an extension which is different from ne another depending on each of the plurality of types of lossy compression.

3. A recording method, comprising;
preparing an audio disk comprising
a first audio zone which is an area for recording therein both of a plurality of tracks each including a single piece of music and first management information including first control information for allowing each track to be reproduced, wherein the plurality of tracks are recorded in a group, the music is composed of a signal based on either a linear PCM (Pulse Code Modulation) signal or a signal produced by applying lossless compression to the linear PCM signal, the linear PCM signal is an audio signal subjected to quantization at both a sampling frequency and the number of quantization bits on a DVD-Audio specification, and the first control information includes group information in relation to the group, and a second audio zone which is an area for recording therein music composed of audio signal produced under lossy compression; and recording onto the second audio zone a plurality of files each storing therein a signal of a single piece of music subjected to the lossy compression, second management information including second control information for allowing each file to be reproduced, and text information concerns with each piece of music stored in each file, wherein each piece of music stored in each file corresponds to the music included in any one of the tracks in the first audio zone, the plurality of files are recorded in a group corresponding to the group in the first audio zone, and the second control information includes group information in relation to the group in the second audio zone;

wherein the plurality of files recorded in the second audio zone each have storing therein a signal produced by applying each of a plurality of types of lossy compression each serving as the lossy compression t the music corresponding to each of the tracks in the first audio zone, the plurality of files being given with the same file name having an extension which is different from one another depending on each of the plurality of types of lossy compression.

4. A recording method, comprising;

preparing an audio disk comprising a first audio zone which is an area for recording therein both of a track including a single piece of music and first management information including first control information for allowing the track to be reproduced are recorded, wherein the track is recorded in a group, the music is composed of audio data produced from either a linear PCM (Pulse Code Modulation) signal or a signal produced by applying lossless compression to the linear PCM signal, the linear PCM signal is an audio signal subjected to quantization at both a sampling frequency and the number of quantization bits on a DVD-Audio specification, and the first control information includes group information in relation to the group, and a second audio zone which is an area for recording therein music composed of audio signal produced under lossy compression; and recording onto the second audio zone a file storing therein a signal produced by applying to the lossy compression to the music corresponding to the single track in the first audio zone, second management information including second control information for allowing the file to be reproduced, and text information concerns with the music, wherein the file is recorded in a group corresponding to the group in the first audio zone and the second control information includes group information in relation to the group in the second audio zone;

wherein the file recorded in the second audio zone has a plurality of files each storing therein a signal produced by applying each of a plurality of types of lossy compression each serving as the lossy compression to the music corresponding to each of the tracks in the first audio zone, the plurality of files being given with the same file name having an extension which is different from one another depending on each of the plurality of types of lossy compression.

* * * * *